US008923659B2

(12) United States Patent
Sekiguchi

(10) Patent No.: US 8,923,659 B2
(45) Date of Patent: Dec. 30, 2014

(54) OPTICAL SWITCHING APPARATUS AND METHOD

(71) Applicant: Fujitsu Limited, Kawasaki-shi (JP)

(72) Inventor: Shigeaki Sekiguchi, Zama (JP)

(73) Assignee: Fujitsu Limited, Kawasaki (JP)

( * ) Notice: Subject to any disclaimer, the term of this patent is extended or adjusted under 35 U.S.C. 154(b) by 52 days.

(21) Appl. No.: 13/754,927

(22) Filed: Jan. 31, 2013

(65) Prior Publication Data

US 2013/0243365 A1    Sep. 19, 2013

(30) Foreign Application Priority Data

Mar. 19, 2012    (JP) .................................. 2012-61658

(51) Int. Cl.
| | |
|---|---|
| *G02F 1/035* | (2006.01) |
| *G02F 1/025* | (2006.01) |
| *G02F 1/313* | (2006.01) |
| *H04Q 11/00* | (2006.01) |

(52) U.S. Cl.
CPC .............. *G02F 1/025* (2013.01); *G02F 1/3136* (2013.01); *H04Q 2011/0049* (2013.01)
USPC .................... 385/3; 385/16; 385/24

(58) Field of Classification Search
USPC ....................................... 385/3, 24
See application file for complete search history.

(56) References Cited

U.S. PATENT DOCUMENTS

| | | | |
|---|---|---|---|
| 5,892,864 A * | 4/1999 | Stoll et al. ....................... 385/17 |
| 6,347,168 B1 * | 2/2002 | Shimomura et al. ............ 385/19 |
| 6,597,830 B1 | 7/2003 | Nakabayashi et al. |
| 7,974,502 B2 * | 7/2011 | Mino et al. ........................ 385/4 |
| 2009/0238574 A1 * | 9/2009 | Sone ............................... 398/139 |

FOREIGN PATENT DOCUMENTS

| | | |
|---|---|---|
| CA | 2331970 A1 | 7/2002 |
| JP | 2000-19569 A | 1/2000 |
| JP | 2001-36182 A | 2/2001 |

OTHER PUBLICATIONS

Komatsu et al, "4x4 GaAs/AlGaAs Optical Matrix Switches with Uniform Device Characteristics Using Alternating delta beta Electrooptic Guided-Wave Directional Couplers", Jul. 1991, Journal of Lightwave Technology, vol. 9, No. 7.*
Tanemura, Takuo et al., "Wavelength-multiplexed optical packet switching using InP phased-array switch", Optics Express, vol. 17 No. 11, May 2009, pp. 9454-9459.
Li, Baojun et al., "1.55 μm reflection-type optical waveguide switch based on SiGe/Si plasma dispersion effect", Applied Physics Letters, vol. 75 No. 1, pp. 1-3 (Jul. 1999).

(Continued)

*Primary Examiner* — Ellen Kim
(74) *Attorney, Agent, or Firm* — Fujitsu Patent Center

(57) ABSTRACT

An optical switching apparatus includes an optical switch element which includes an input port and an output port, and to which a switch control signal is supplied to modulate and output signal light which enters the input port depending on a level of the switch control signal; and an optical gate element which is connected to the output port of the optical switch element and to which a gate control signal is supplied to switch an output of the signal light depending on a level of the gate control signal, wherein the optical switch element varies intensity of the signal light which is output from the output port depending on the switch control signal controlled based on magnitude of a light intensity signal of the optical gate element.

14 Claims, 38 Drawing Sheets

(56) References Cited

OTHER PUBLICATIONS

Sugama, Akio et al., "Electro-Optic Beam-Deflection Switch for Photonic Burst Switching", Conf. Proc. 30th European Conference on Optical Communication (ECOC '04), Mo 4.6.3, Sep. 5-9, 2004.

Goh, Takashi et al., "High-Extinction Ratio and Low-Loss Silica-Based 8 × 8 Strictly Nonblocking Thermooptic Matrix Switch", Journal of Lightwave Technology, vol. 17, No. 7, Jul. 1999, pp. 1192-1199.

Shoji, Yuya et al., "Low-crosstalk 2 × 2 thermo-optic switch with silicon wire waveguides", Optics Express, vol. 18 No. 9, Apr. 2010, pp. 9071-9075.

Park, Sungbong et al., "All-silicon and in-line integration of variable optical attenuators and photodetectors based on submicrometer rib waveguides", Optics Express, vol. 18 No. 15, Jul. 2010 pp. 15303-15310.

\* cited by examiner (c)

OPTICAL SWITCHING APPARATUS AND METHOD

CROSS-REFERENCE TO RELATED APPLICATION

This application is based upon and claims the benefit of priority of the prior Japanese Patent Application No. 2012-61658, filed on Mar. 19, 2012, the entire contents of which are incorporated herein by reference.

FIELD

The embodiments discussed herein are related to an optical switching apparatus and a control method therefor.

BACKGROUND

To reduce crosstalk in an optical switch, there has been proposed an optical circuit in which an optical gate is connected to an output port of the optical switch. According to the optical circuit, inter-channel crosstalk is remarkably reduced because crosstalk light is intercepted by the optical gate. (For example, refer to Japanese Laid-Open Patent Publication No. 2000-19569)

SUMMARY

According to an aspect of the embodiments, an optical switching apparatus includes an optical switch element which includes an input port and an output port, and to which a switch control signal is supplied to modulate and output signal light which enters the input port depending on a level of the switch control signal; and an optical gate element which is connected to the output port of the optical switch element and to which a gate control signal is supplied to switch an output of the signal light depending on a level of the gate control signal, wherein the optical switch element varies intensity of the signal light which is output from the output port depending on the switch control signal controlled based on magnitude of a light intensity signal of the optical gate element.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

As described previously, inter-channel crosstalk is remarkably reduced by the optical gate. However, there is a problem in the optical switch with the optical gate that the intensity of the output light largely deviates from a target value because of a slight manufacturing error (incompleteness). This problem markedly appears in an optical switch which utilizes interference of light (in particular, a Mach-Zehnder optical switch which includes arms formed of a semiconductor).

According to the optical switching apparatus of the embodiment, it is possible to make the output light intensity, which deviates from a target value, close to the target value.

Preferred embodiments will be explained with referenced to accompanying drawings. Here, identical symbols are given to corresponding parts even in different drawings, and the description thereof will be omitted.

(Embodiment 1)

(1) Structure

Figure 1:
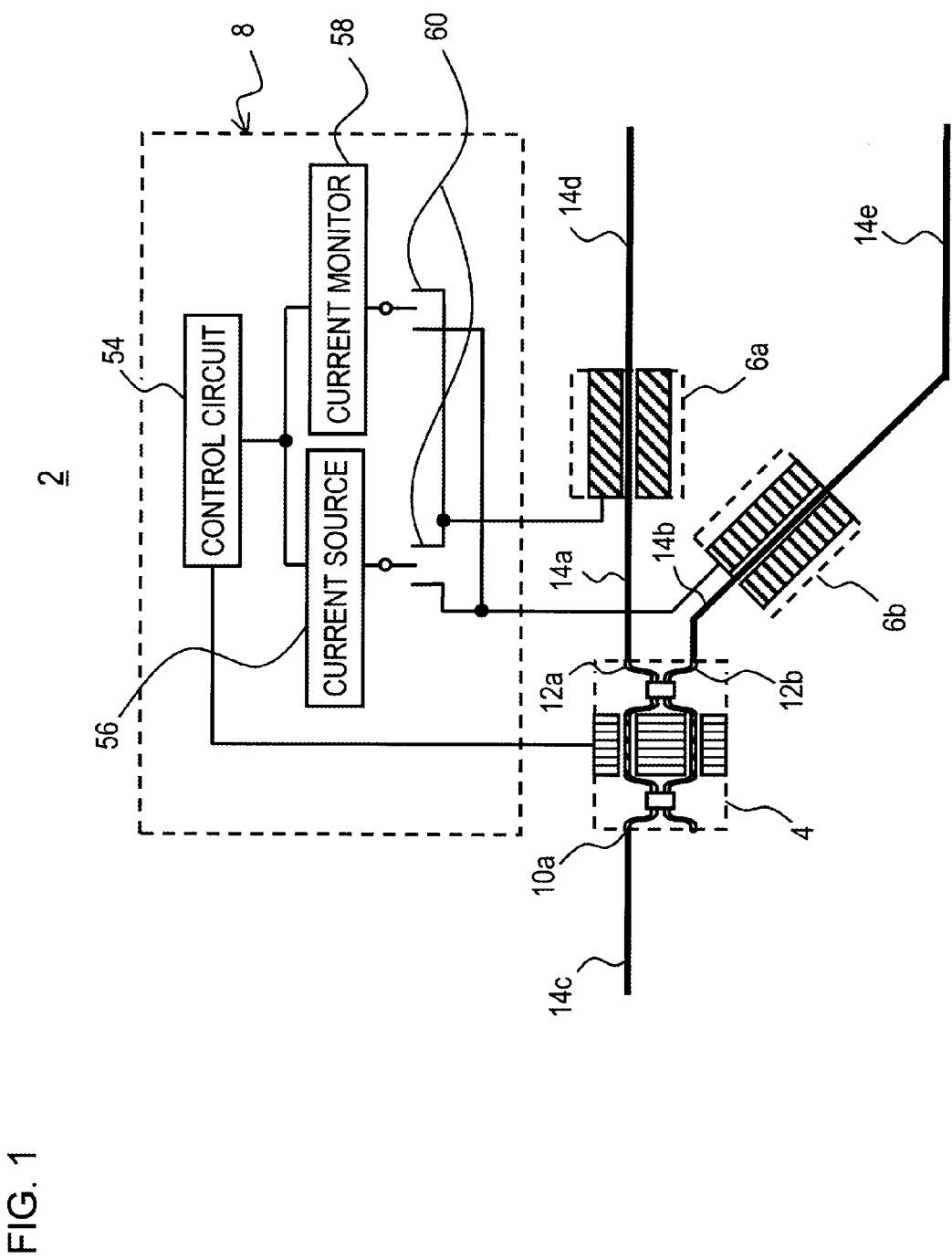
FIG. 1 is a configuration diagram of an optical switching apparatus according to the embodiment 1.

FIG. 1 is a configuration diagram of an optical switching apparatus 2 according to the present embodiment.

As depicted in FIG. 1, the optical switching apparatus 2 includes an optical switch element 4, a first optical gate element 6a, a second optical gate element 6b and a controller 8. The optical switch element 4 is a 1×2 optical switch (one-input two-output optical switch) which includes an input port 10a, a first output port 12a and a second output port 12b.

To the first output port 12a of the optical switch element 4, an input end of the first optical gate element 6a is connected through an optical waveguide 14a. Also, to the second output port 12b, an input end of the second optical gate element 6b is connected through an optical waveguide 14b.

To an input port 10a of the optical switch element 4, a first input waveguide (optical waveguide) 14c is connected. On the other hand, to an output end of the first optical gate element 6a, a first output waveguide (optical waveguide) 14d is connected. Similarly, to an output end of the second optical gate element 6b, a second output waveguide (optical waveguide) 14e is connected.

The optical switching apparatus 2 may share the first input waveguide 14c with another device (for example, another optical switching apparatus), or may include the input waveguide 14c independently. Alternatively, the first input waveguide 14c may be included in another device. The same is applicable to the output waveguides 14d, 14e.

—Optical Switch Element—

Figure 2:
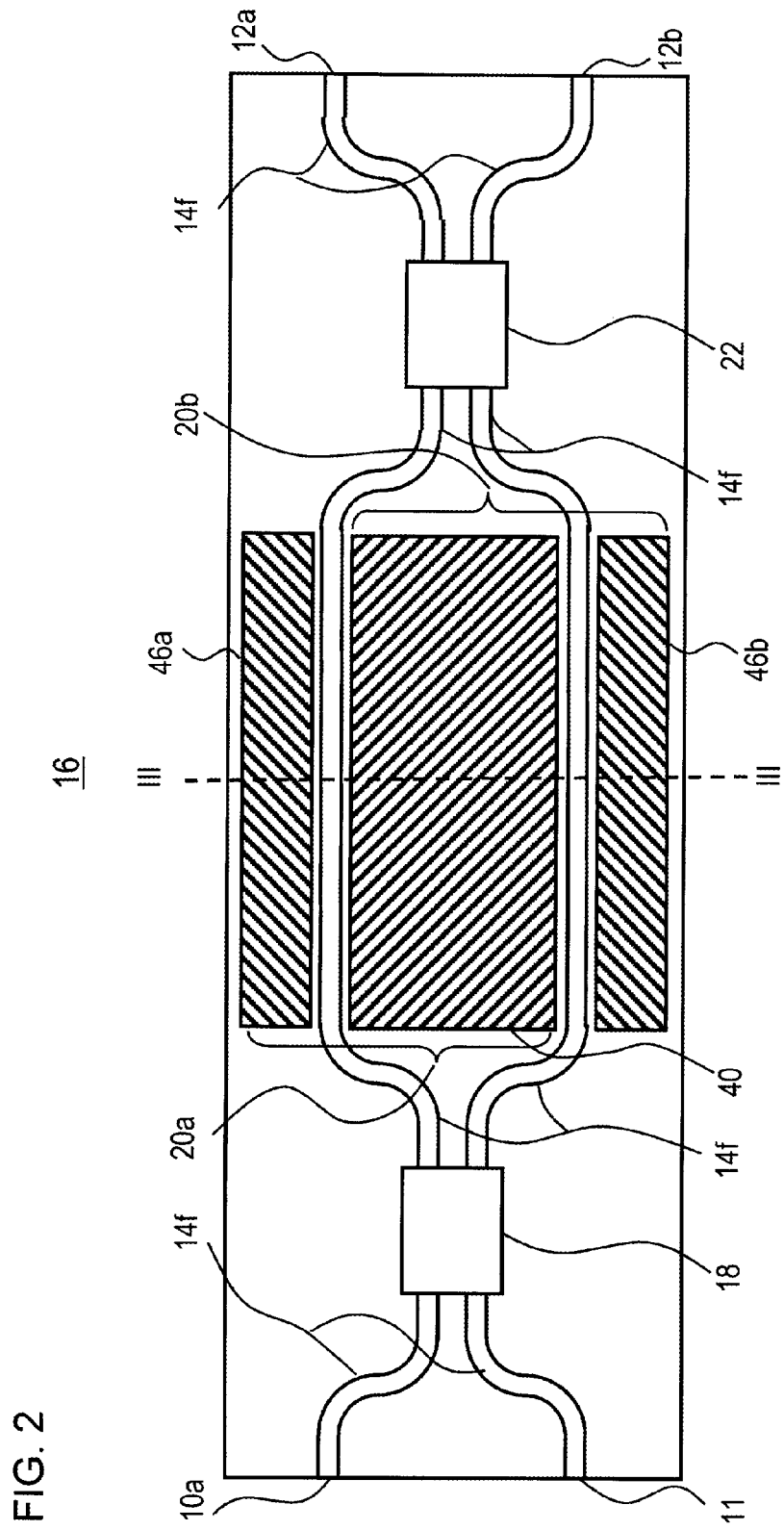
FIG. 2 is a plan view of an MZ optical switch.

The optical switch element 4 is, for example, the Mach-Zehnder optical switch (hereafter referred to as MZ optical switch). FIG. 2 is a plan view of an MZ optical switch 16.

As depicted in FIG. 2, the MZ optical switch 16 includes an input port 10a, a dummy input port 11 and an optical branch unit 18 which makes light entering the input port 10a, branch into first branch light and second branch light.

To the input port 10a, the first input waveguide 14c (refer to FIG. 1) is connected. On the other hand, the dummy input port 11 is open. The optical branch unit 18 is, for example, a two-input two-output multimode interference waveguide (MMI).

Further, the MZ optical switch 16 includes a first phase shifter 20a which the first branch light enters and a second phase shifter 20b which the second branch light enters. The structures of the first phase shifter 20a and the second phase shifter 20b are substantially identical.

Further, the MZ optical switch 16 includes an optical coupler 22 which couples the first branch light exiting from the first phase shifter 20a with the second branch light exiting from the second phase shifter 20b, to generate first coupled light and second coupled light. The optical coupler 22 is, for example, a two-input two-output multimode interference waveguide.

The MZ optical switch 16 further includes a first output port 12a which outputs the first coupled light and a second output port 12b which outputs the second coupled light. Further, the MZ optical switch 16 includes optical waveguides 14f which are connected to the respective optical members (optical branch unit 18, phase shifters 20a, 20b and optical coupler 22).

One arm of the MZ optical switch 16 includes the first phase shifter 20a and optical waveguides 14f connected to both ends thereof. Similarly, the other arm of the MZ optical switch 16 includes the second phase shifter 20b and optical waveguides 14f connected to both ends thereof.

Signal light propagating through the first input waveguide 14c (refer to FIG. 1) is input to (enters) the input port 10a and output from the first output port 12a or the second output port 12b. On the other hand, signal light is not input to the dummy port 11. Accordingly, the MZ optical switch 16 according to Embodiment 1 functions as a 1×2 optical switch element (one-input two-output optical switch element).

Figure 3:
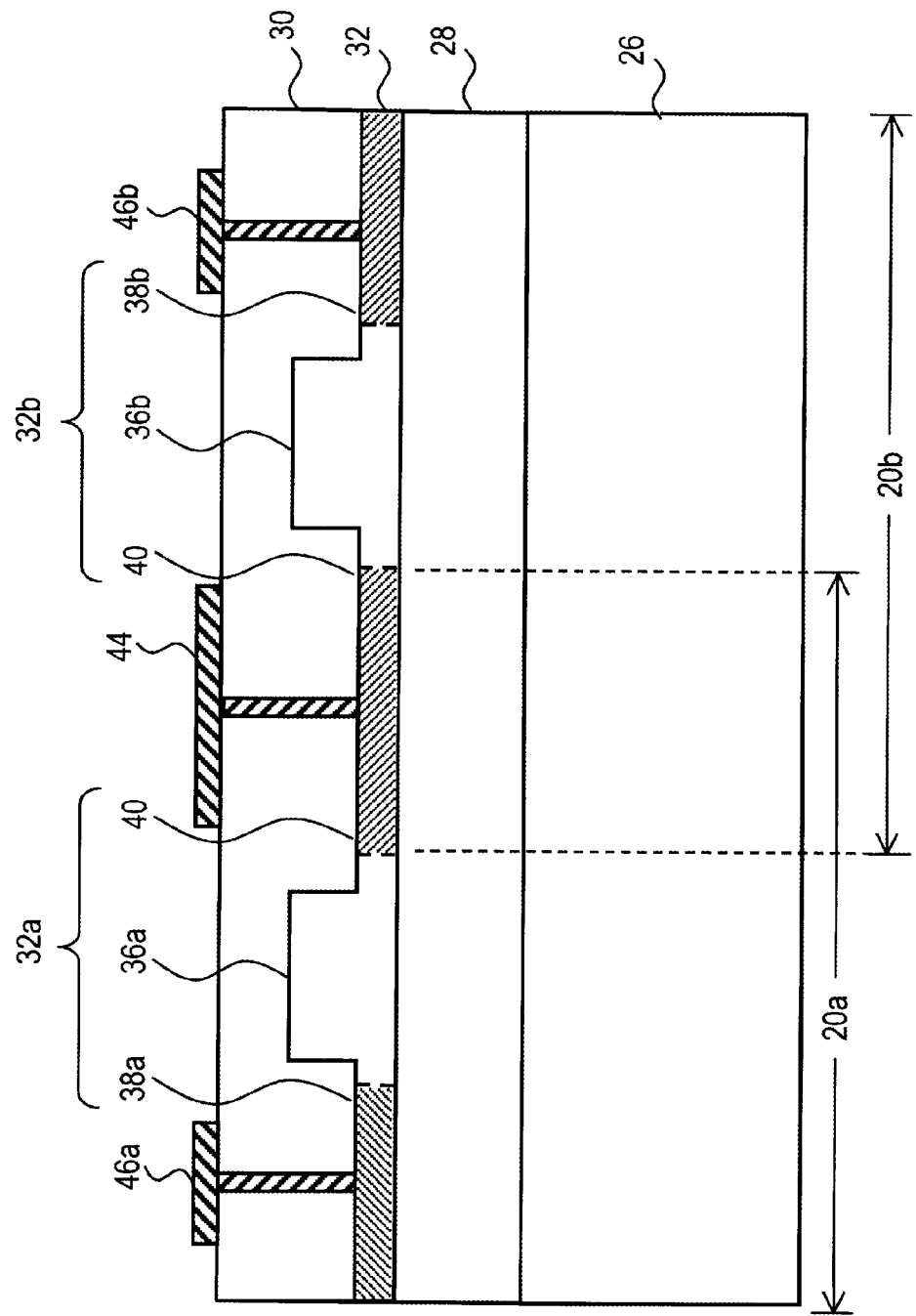
FIG. 3 is a cross sectional view of the first phase shifter and the second phase shifter along the III-III line depicted in FIG. 2.

FIG. 3 is a cross sectional view of the first phase shifter 20a and the second phase shifter 20b along the III-III line depicted in FIG. 2.

As depicted in FIG. 3, the first phase shifter 20a and the second phase shifter 20b share a first clad layer 28 provided on a substrate (for example, Si substrate) 26 and a second clad layer 30. The first clad layer 28 and the second clad layer 30 are insulators (such as $SiO_2$).

Further, the first phase shifter 20a includes a first optical waveguide layer (semiconductor layer) 32a. Similarly, the second phase shifter 20b includes a second optical waveguide layer (semiconductor layer) 32b. The first optical waveguide layer 32a and the second optical waveguide layer 32b are portions of a semiconductor layer (for example, single crystal Si layer) 32 sandwiched between the first clad layer 28 and the second clad layer 30.

The first optical waveguide layer 32a includes a first ridge portion 36a (refer to FIG. 3) which is an i-type region extending to one direction (in FIG. 2, a direction from the optical branch unit 18 toward the optical coupler 22). Similarly, the second optical waveguide layer 32b includes a second ridge portion 36b which is an i-type region extending to the above-mentioned one direction. In short, the first optical waveguide layer 32a and the second optical waveguide layer 32b are rib optical waveguides.

The first optical waveguide layer 32a includes a first p-type region 38a disposed on one side of the first ridge portion 36a, and an n-type region 40 disposed on the other side of the first ridge portion 36a.

Similarly, the second optical waveguide layer 32b includes a second p-type region 38b disposed on one side of the second ridge portion 36b, and an n-type region 40 disposed on the other side of the second ridge portion 36b.

The first p-type region 38a, the n-type region 40 and the first ridge portion 36a sandwiched between the first p-type region 38a and the n-type region 40 form a first p-i-n junction. Similarly, the second p-type region 38b, the n-type region 40 and the second ridge portion 36b sandwiched between the second p-type region 38b and the n-type region 40 form a second p-i-n junction.

The first clad layer 28, the second clad layer 30 and the semiconductor layer 32 are transparent at an operating wavelength (for example, 1.55 μm). The refractive index of the semiconductor layer 32 is higher than each refractive index of the first clad layer 28 and the second clad layer 30. Therefore, the first branch light which enters the first phase shifter 20a propagates through the first ridge portion 36a of the semiconductor layer 32. Similarly, the second branch which enters the second phase shifter 20b propagates through the second ridge portion 36b of the semiconductor layer 32.

The first phase shifter 20a and the second phase shifter 20b include a common electrode 44 which is disposed on the second clad layer 30 and connected to the n-type region 40. Further, the first phase shifter 20a includes a first electrode 46a which is disposed on the second clad layer 30 and connected to the first p-type region 38a. Similarly, the second phase shifter 20b includes a second electrode 46b which is disposed on the second clad layer 30 and connected to the second p-type region 38b.

For example, the common electrode 44 and the second electrode 46b are grounded. Between the first electrode 46a and the common electrode 44, a switch control signal is supplied.

The switch control signal supplied between the first electrode 46a and the common electrode 44 is a current injected into the first p-i-n junction. When carriers are accumulated in the p-i-n junction by the current injection, the refractive index of the first ridge portion 36a is reduced by the plasma effect, so that the phase of light propagating through the first phase shifter 20a is varied.

When a phase difference between the first branch light which enters the optical coupler 22 after propagating through the first phase shifter 20a and the second branch light which enters the optical coupler 22 after propagating through the second phase shifter 20b, that is, a phase difference of branch light in the optical coupler 22, is 0 or π (rad) multiplied by an even number, signal light is output from the second output port 12b. When the current injected into the first p-i-n junction increases to produce the phase difference between the first branch light and the second branch light equal to π (rad) multiplied by an odd number, signal light is output from the first output port 12a.

To the MZ optical switch 16, there is supplied a current (switch control signal) which produces the above phase difference approximately equal to 0 or π (rad) multiplied by an even number, or a current (switch control signal) which produces the above phase difference approximately equal to π (rad) multiplied by an odd number. In many cases, to obtain a phase difference approximately equal to π (rad) multiplied by an odd number, a second current larger than a first current, which produces the phase difference approximately equal to 0 or π (rad) multiplied by an even number, is supplied to the MZ optical switch 16. Following description will be given according to the above-mentioned case. However, because the phase difference periodically varies relative to the injected current, the magnitude of the first current and the second current may be reversed.

Accordingly, when the above current (switch control signal) is in a high level, the MZ optical switch 16 outputs the signal light from the first output port 12a, while when the above current (switch control signal) is in a low level, the MZ optical switch 16 does not output signal light from the first output port 12a. Further, when the signal light is not output from the first output port 12a, the MZ optical switch 16 outputs the signal light from the second output port 12b. In the above description, the high level signifies a level corresponding to signal intensity stronger than the other signal intensity when two levels exist in regard to signal intensity.

Now, there is considered a case that the MZ optical switch 16 is supplied with a high-level switch control signal to output signal light from the first output port 12a. When a current injected into the first p-i-n junction gradually increases (or gradually decreases), the phase of the first branch light entering the optical coupler 22 gradually decreases (or gradually increases). Then a phase difference between the first branch light and the second branch light varies.

In the case that the above variation makes the above phase difference farther from π (rad) multiplied by an odd number, the signal light output from the first output port 12a decreases. To the contrary, in the case that the above variation makes the phase difference nearer to π (rad) multiplied by an odd number, the signal light output from the first output port 12a increases.

On the other hand, when a low-level control signal is supplied to the MZ optical switch 16, signal light output from the second output port 12b increases or decreases depending on the magnitude of the low-level control signal.

As such, the MZ optical switch 16 is an optical switch element which varies signal light intensity output from the first output port 12a (or the second output port 12b) depending on the magnitude of the switch control signal (i.e. an optical switch element which modulates signal light).

In the above-mentioned example, a portion of the first ridge portion 36a not sandwiched between the first p-type region 38a and the n-type region 40, as well as a portion of the second ridge portion 36b not sandwiched between the second p-type region 38b and the n-type region 40, is composed of single crystal Si, similar to other portions of the semiconductor layer 32. However, the above-mentioned portions may be composed of $Si_{1-x}Ge_x$ (where x is more than 0, and less than or equal to 0.3).

The band gap of $Si_{1-x}Ge_x$ is narrower than the band gap of Si. Therefore, when a current is injected to the first ridge portion 36a (or the second ridge portion 36b), carriers are confined into a $Si_{1-x}Ge_x$ portion not sandwiched between the first p-type region 38a and the n-type region 40 (or between the second p-type region 38b and the n-type region 40). As a result, carrier density confined in the first ridge portion 36a (or the second ridge portion 36b) increases, and the refractive index of the first ridge portion 36a (or the second ridge portion 36b) varies more largely.

Further, the semiconductor layer 32 may be, for example, a single crystal GaAs layer or a single crystal InP layer, instead of the Si layer. In that case, a portion of the first ridge portion 36a not sandwiched between the first p-type region 38a and the n-type region 40, as well as a portion of the second ridge portion 36b not sandwiched between the second p-type region 38b and the n-type region 40, may be a single crystal InGaAs layer or a single crystal InGaAsP layer, for example.

The above-mentioned deformation examples may be applied to the structure of the optical gate element 6a described later.

In the above examples, the second electrode 46b is grounded. Accordingly, the second phase shifter 32b may neither include the second p-type region 38b nor the n-type region 40. In other words, only one arm of the MZ optical switch 16 may include a semiconductor layer which includes the first ridge portion 36a, the p-type region 38a disposed on one side of the first ridge portion 36a and the n-type region 40 disposed on the other side of the first ridge portion 36a.

Cross sectional structures of optical members other than the phase shifters 20a, 20b (optical branch unit 18, optical coupler 22 and optical waveguide 14f) are almost identical to the cross sectional structures of the phase shifters 20a, 20b described by reference to FIG. 3. However, the n-type region 40, the p-type regions 38a, 38b and electrodes attached to these regions are not provided in the above optical members. Also, in the above optical members, the widths of the ridge portions are determined according to functions of the respective optical members.

Additionally, electronic circuits (for example, a control device 8) may be provided on the substrate 26.

—Optical Gate Element—

Figure 4:
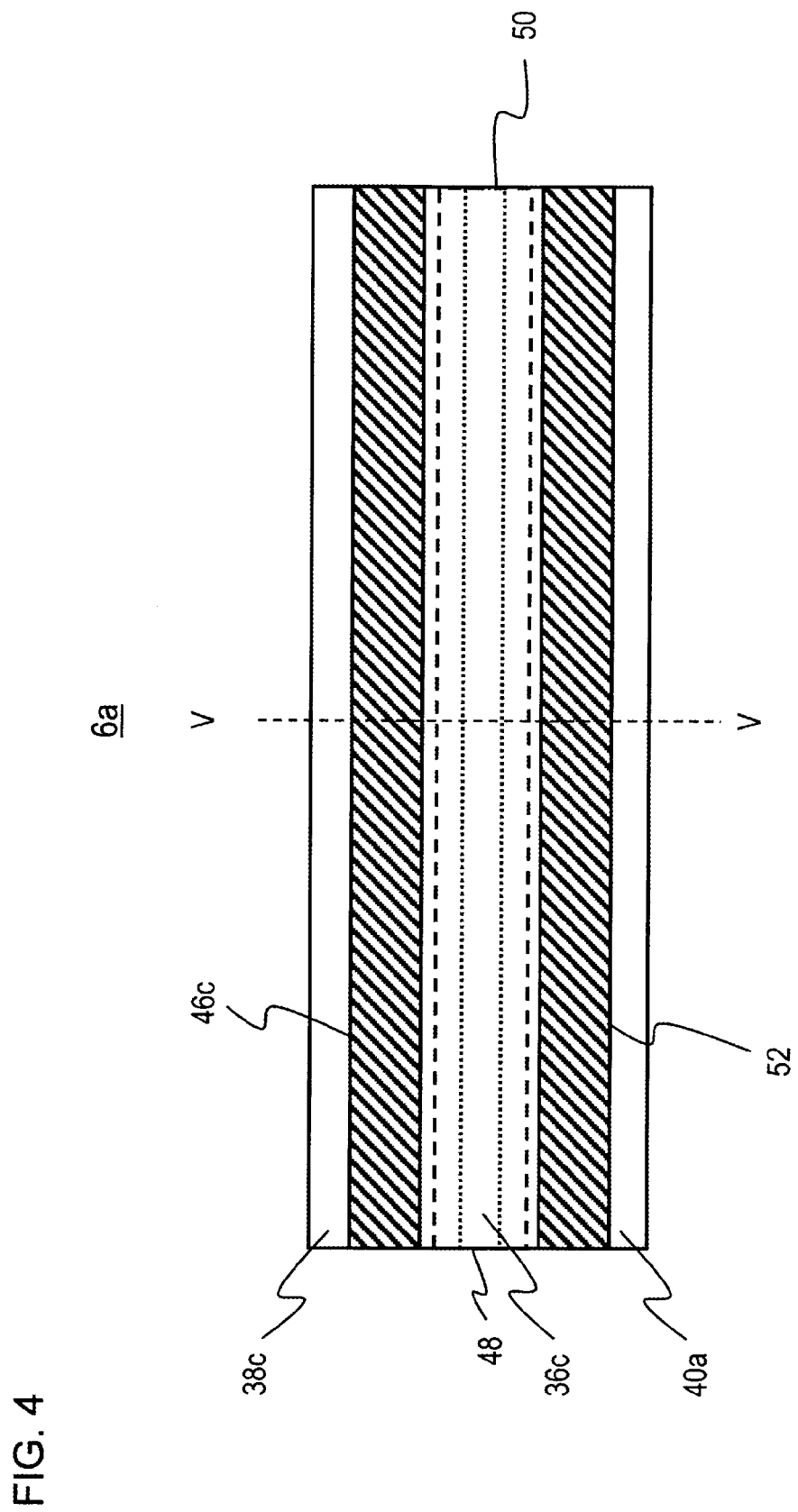
FIG. 4 is a plan view of the first optical gate element.
Figure 5:
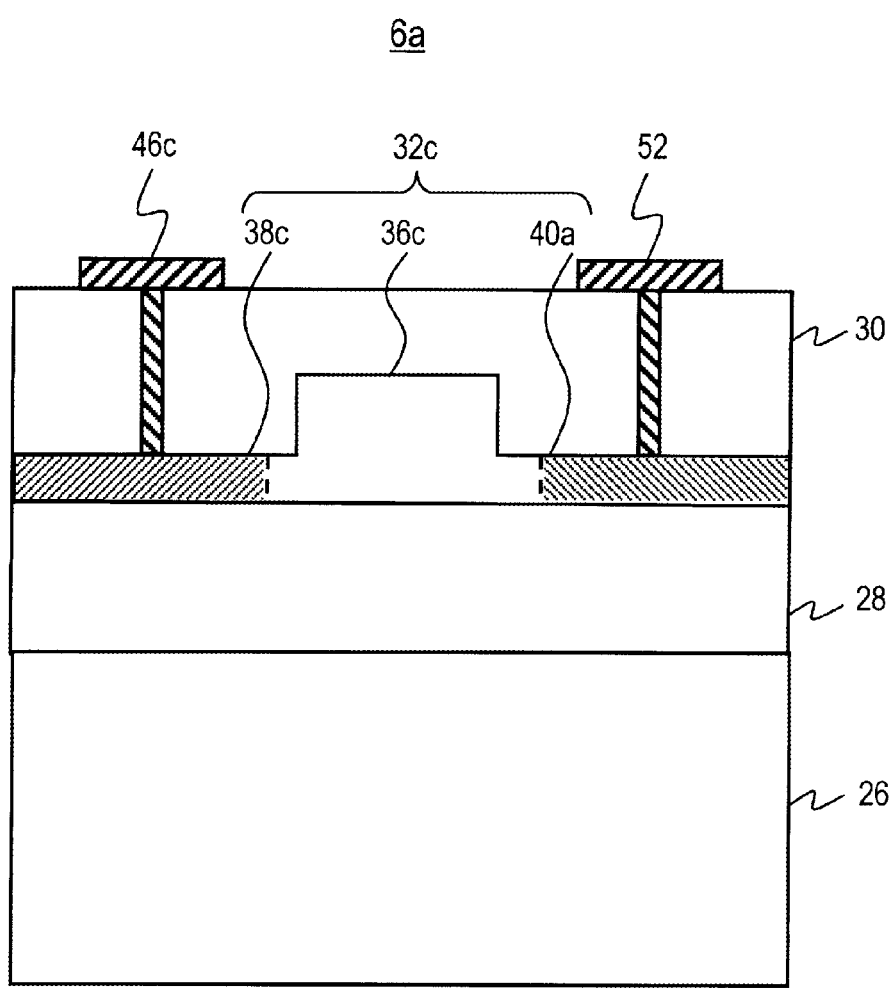
FIG. 5 is a cross sectional view along the V-V line of FIG. 4.

FIG. 4 is a plan view of the first optical gate element 6a. FIG. 5 is a cross sectional view along the V-V line of FIG. 4. As depicted in FIGS. 4 and 5, the structure of the first optical gate element 6a is substantially identical to the first phase shifter 20a (excluding an element length). Therefore, descriptions about common parts with the first phase shifter 20a will be omitted.

As depicted in FIG. 4, the first optical gate element 6a includes an input end 48 connected to the first output port 12a of the optical switch element 4 and an output end 50 connected to the first output waveguide 14d. In FIG. 4, a ridge portion 36c etc. described below are depicted with broken lines.

As depicted in FIG. 5, the first optical gate element 6a includes an optical waveguide layer (semiconductor layer) 32c which includes a ridge portion 36c which is an i-type region, a p-type region 38c disposed on one side of the ridge portion 36c, and an n-type region 40a disposed on the other side of the ridge portion 36c. The ridge portion 36c extends to one direction (a direction from the incident end toward the output end). Incident light entering the incident end 48 mainly propagates through the above ridge portion 36c. Namely, the optical waveguide layer 32c is a rib optical waveguide whose cross sectional structure is substantially identical to those of the first optical waveguide layer 32a and the second optical waveguide layer 32b depicted in FIG. 3.

The first optical gate element 6a includes a third electrode 46c connected to the p-type region 38c and a ground electrode 52 connected to the n-type region 40a. A gate control signal is supplied between the third electrode 46c and the ground electrode 52. The ground electrode 52 is grounded.

The gate control signal is a current injected into a p-i-n junction which includes the p-type region 38c, the n-type region 40a and the i-type ridge portion 36c. When carriers are accumulated in the p-i-n junction by the current injection, a loss coefficient (optical loss coefficient) of the ridge portion 36c increases by the plasma effect. As a result, the incident light entering (inputting from) the input end 48 attenuates during its propagation through the optical waveguide layer 32c.

Additionally, in the phase shifters 20a, 20b of the MZ optical switch 16, the loss coefficient increases by the current injection. However, signal light hardly attenuates in the MZ optical switch 16 because the phase shifters 20a, 20b are short in length. On the other hand, because the element length of the first optical gate element 6a is long, the incident light is efficiently absorbed, and is hardly output from the output end 50. Each phase shifters 20a, 20b is approximately 100 µm in length, for example. In contrast, the first optical gate element 6a is approximately 250 µm, for example.

Figure 6:
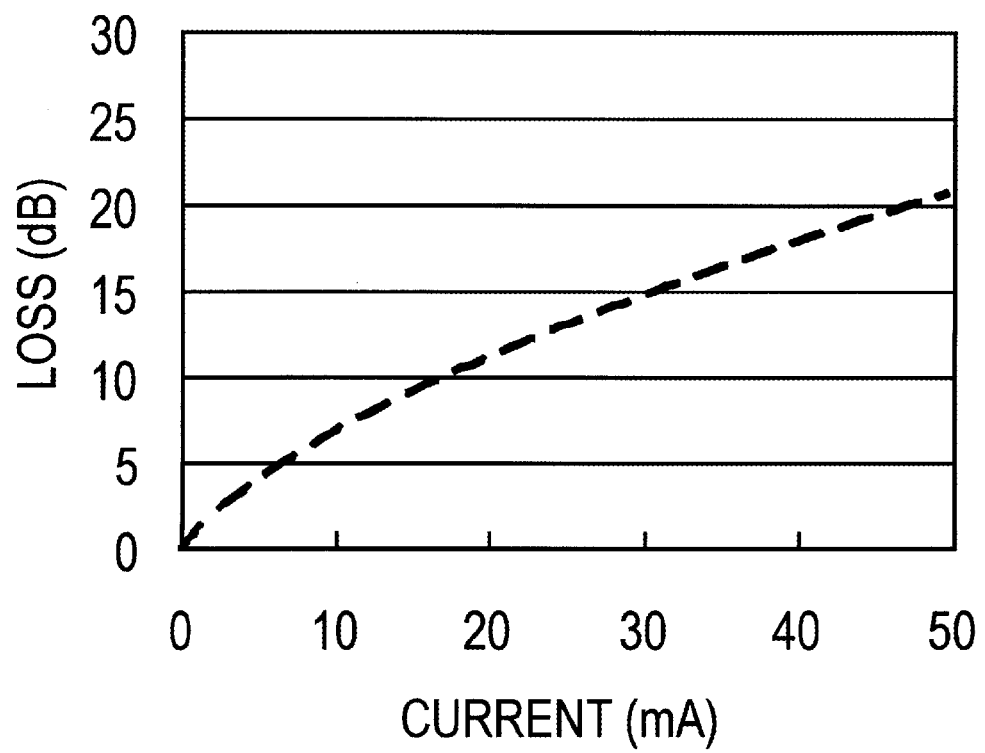
FIG. 6 illustrates one example of relationship between the injection current and the loss in regard to the first optical gate element.

FIG. 6 illustrates one example of relationship between the injection current and the loss in regard to the first optical gate element 6a. The horizontal axis denotes the injection current. The vertical axis denotes the loss of incident light (a ratio between exiting light power and incident light power). The length of the optical gate element used in the measurement is 250 µm, and the thicknesses of the p-type region and the n-type region are 50 nm, respectively. The height and the width of the ridge portion 36c are 250 nm and 500 nm, respectively. The optical waveguide layer 32 is composed of silicon single crystal.

As depicted in FIG. 6, if the current injected into the p-i-n junction (injection current) is 0 mA, the loss is approximately 0 dB. Therefore, the incident light is output from the output end 50 with little attenuation. On the other hand, if a current of 50 mA is injected into the p-i-n junction, the loss increases to approximately 20 dB, and the incident light is hardly output.

To the first optical gate element 6a, a current of 0 mA (low-level gate control signal) and a current of 50 mA (high-level gate control signal) are supplied, for example. When the level of the switch control signal is high and the level of the gate control signal is high, the incident light is output (that is, transmitted) from the first output port 12a, and the incident light is not output (that is, intercepted) from the first optical gate element 6a according to above current levels. Namely, the first optical gate element 6a is connected to the output port 12a, so as to switch the output level of the signal light which is modulated by the optical switch element 4, according to the level of the gate control signal.

Further, as depicted in FIG. 6, the loss in the first optical gate element 6a gradually increases with a increase of the injection current. Therefore, the first optical gate element 6a also functions as an optical variable attenuator.

Figure 7:
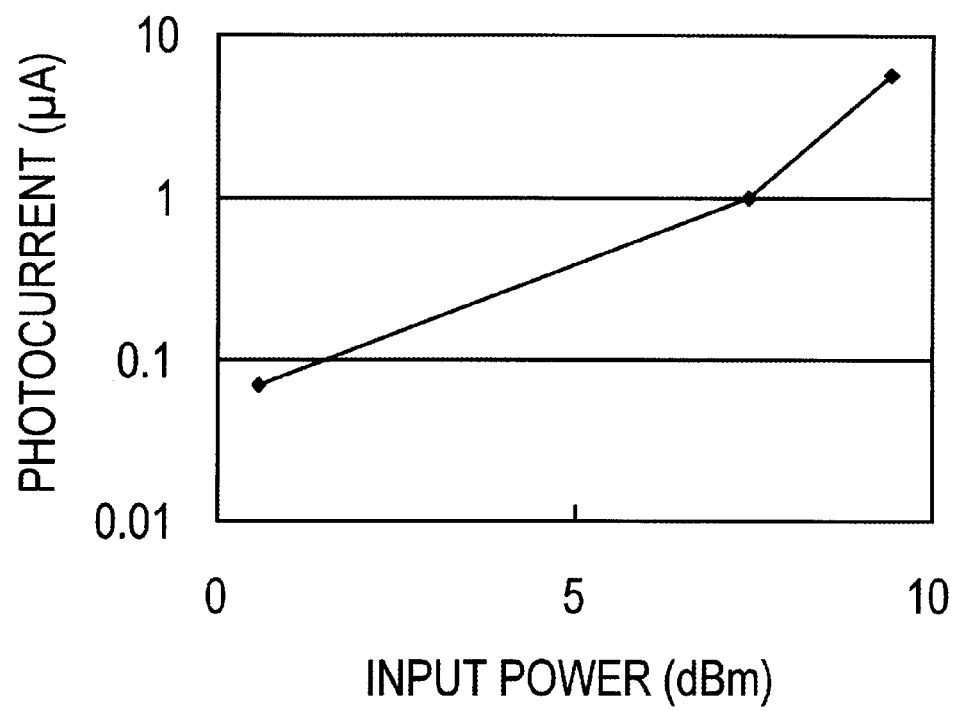
FIG. 7 illustrates one example of relationship between incident light power and photocurrent in regard to the first optical gate element.

FIG. 7 illustrates one example of relationship between incident light power and photocurrent in regard to the first optical gate element 6a. The horizontal axis denotes incident light power (input power). The vertical axis denotes magnitude of photocurrent generated by the first optical gate element 6a. The optical gate element used in the measurement is identical to the element used in the measurement of FIG. 6. A voltage applied to the p-i-n junction is 0 V, and the wavelength of the incident light is approximately 1.55 µm.

The band gap wavelength of Si is approximately 1.1 µm. Therefore, it is considered that incident light with the wavelength 1.55 µm is not absorbed, and a photocurrent does not to flow. However, as depicted in FIG. 7, there is a photocurrent flow, though it is small.

The reason is considered that the incident light is absorbed due to a defect level etc. in the forbidden band of Si, so that photo-carriers are generated.

While 0 V or an reverse bias is applied to the p-i-n junction of the first optical gate element 6a, no current is injected into the p-i-n junction, and therefore, the first optical gate element 6a transmits the incident light. At this time, the first optical gate element 6a generates a photocurrent corresponding to the power (light intensity) of incident light which is being transmitted. This photocurrent (optical current) is a light intensity signal generated by the p-i-n junction in response to the incident light. Namely, when transmitting the incident light, the first optical gate element 6a generates the light intensity signal corresponding to the incident light which is being transmitted.

Now, a signal light input to the optical switching apparatus 2 is modulated by 1-100 GHz, for example. Therefore, the modulation period (time per bit) of the signal light is 10 ps to 1 ns, for example. A response time to the generation of the light intensity signal by the first optical gate element 6a in response to the incident light, is sufficiently larger (for example, 10 ns to 1 sec inclusive) than the above modulation period. Accordingly, the light intensity signal (photocurrent) generated by the first optical gate element 6a corresponds to an average value of the incident light intensity. Here, the response time signifies a time which lapses before the light intensity signal reaches 63% of its maximum value in response to stepwise incident light, for example.

If a small quantity of inert gas ions are implanted into the ridge portion 36c, a crystal defect is introduced and thereby the photocurrent increases. Therefore, ion implantaion to the ridge portion 36c is preferable to improve the detection sensitivity of incident light. On the other hand, an optical loss increases by the introduced crystal defect. Therefore, ion implantaion to the ridge portion 36c is not preferable to obtain a low loss in the optical switching apparatus. Accordingly, when it is not important to obtain a low-loss optical switching apparatus, it may be possible to implant inert gas ions into the ridge portion 36c.

The structure and the characteristic of the second optical gate element 6b are substantially identical to those of the first optical gate element 6a. Therefore, the description of the second optical gate element 6b will be omitted (the same is applicable to a third to a sixth optical gate element 6c-6f described later).

Additionally, in the optical switch element and the optical gate element described by reference to FIGS. 3 to 5, current is injected into the p-i-n junction from a horizontal direction (lateral direction) relative to the substrate 26. However, by providing of a p-type semiconductor layer and an n-type semiconductor layer on the upper side and the lower side of the ridge portions 36a-36c respectively, it may also be possible to inject current to the ridge portions 36a-36c (i-type semiconductor) from a vertical direction (a perpendicular direction) relative to the substrate 26.

—Controller—

The controller 8 supplies switch control signals to the optical switch element 4. Further, the controller 8 supplies gate control signals to the first optical gate element 6a and the second optical gate element 6b respectively.

As depicted in FIG. 1 for example, the controller 8 includes a control circuit 54, a current source 56, a current monitor 58 and a switch element 60. The control circuit 54 supplies switch control signals to the optical switch element 4, and controls the current source 56, the current monitor 58 and the switch element 60. For the above control, the control circuit 54 supplies control signals to the switch element 60 through a signal line (not depicted) which connects the control circuit 54 to the switch element 60 (the same is applicable to control circuits and switch elements described later).

The control circuit 54 is a logic circuit such as FPGA (field programmable gate array). The control circuit 54 may be a circuit including CPU (central processing unit) and a memory. In that case, programs to enable the CPU to perform the functions of the control circuit 54 are recorded in the memory.

(2) Operation

The controller 8 is operated in a first connection mode (hereafter referred to as a first 1×2 connection mode) and a second connection mode (hereafter referred to as a second 1×2 connection mode).

(i) First 1×2 Connection Mode

Figure 8:
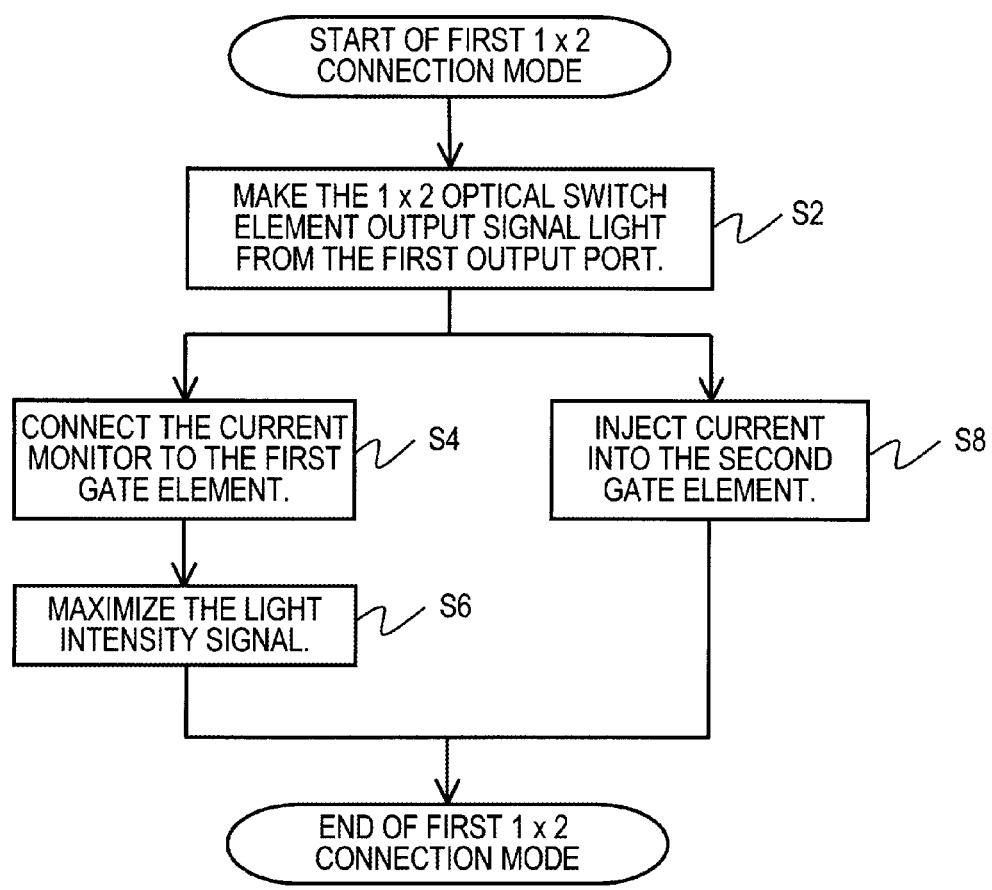
FIG. 8 is a flowchart of a first 1×2 connection mode.
Figure 9:
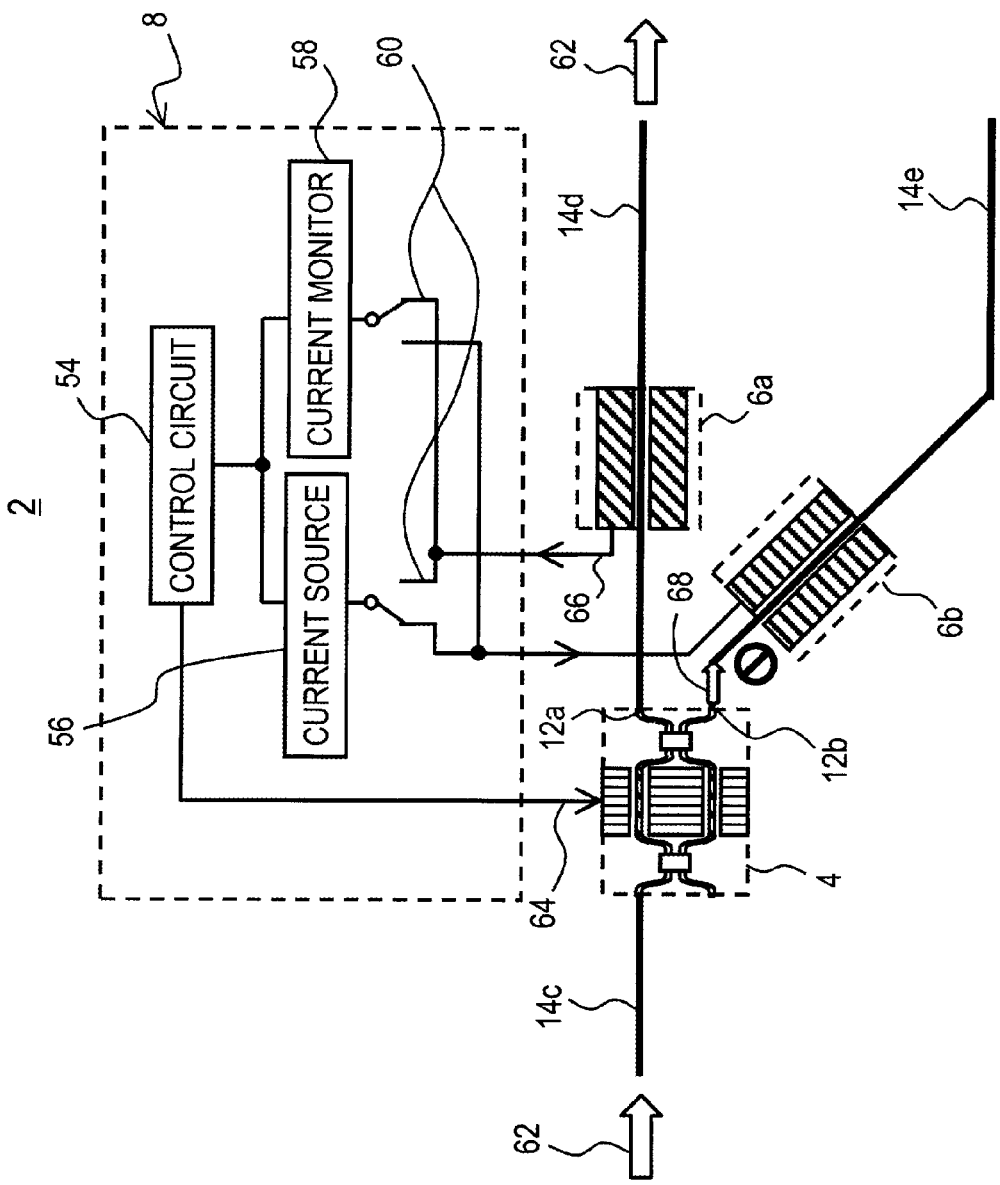
FIG. 9 is an operation diagram in the first 1×2 connection mode.

FIG. 8 is a flowchart of a first 1×2 connection mode. FIG. 9 is an operation diagram in the first 1×2 connection mode.

—Step 2—

As depicted in FIG. 9, it is assumed that signal light (for example, light which is modulated based on certain information) 62 propagates through the first input waveguide 14c and enters the optical switch element (1×2 optical switch element) 4.

In this state, as depicted in FIG. 9, the controller 8 supplies a switch control signal 64 to the optical switch element 4, to output the signal light from the first output port 12a (S2).

By the switch control signal supplied at this time (initial value), a current (high-level switch control signal), which is estimated to produce a phase difference between the first branch light and the second branch light equal to π (rad) multiplied by an odd number, is injected between the first electrode 46a and the common electrode 44 of the optical switch element 4, for example.

It is not easy to measure element-by-element a current which produces the phase difference between the first branch light and the second branch light equal to π (rad). Therefore, in step S2, a current which is estimated to produce the phase difference between the first branch light and the second branch light equal to π (rad) multiplied by an odd number is supplied to the optical switch element 4.

For example, by use of a plurality of elements whose structures are substantially identical to the optical switch element 4, currents which produce each phase difference equal to π (rad) multiplied by an odd number are measured. Then, an average of the measured values is used as an initial value of the switch control signal. By using the above average value for other optical switching apparatus 2, it is possible to omit work to determine switch control signals on an element-by-element basis. The same is applicable to a low-level switch control signal. Also, the same is applicable to Embodiments 2-6.

—Step 4—

Next, the control circuit 54 controls the switch element 60 to connect the current monitor 58 to the third electrode 46c of the first optical gate element 6a (S4).

The current monitor 58 applies 0 V or an reverse bias voltage (negative voltage) to the first optical gate element 6a. An injection current from the current monitor 58 is approximately 0 mA. Thus, by step S4, a low-level gate control signal is supplied to the p-i-n junction of the first optical gate element 6a. As a result, signal light is transmitted by the first optical gate element 6a and is output to the first output waveguide 14d (refer to FIG. 1).

By steps S2 and S4, the controller 8 makes the optical switch element 4 output signal light 62 from the first output port 12a, while making the first optical gate element 6a transmit the signal light, so as to output the signal light 62 to the first output waveguide 14d (S2, S4).

—Step 6—

When the current monitor 58 is connected to the first optical gate element 6a, the current monitor 58 detects a light intensity signal (photocurrent) 66 generated by the first optical gate element 6a, and sends the current value thereof to the control circuit 54.

Now, a dither signal is superposed on the optical switch control signal 64 supplied to the optical switch element 4. The dither signal is a signal (current, for example) which fluctuates periodically. The period of the dither signal is sufficiently longer than the modulation period of the signal light (for example, 10 times more than the modulation period).

The control circuit 54 compares the timings at which the dither signal fluctuates with the timings at which the light intensity signal 66 fluctuates. If the dither signal fluctuates almost simultaneously with the light intensity signal (that is, in-phase), the control circuit 54 increases the switch control signal (injection current). On the other hand, if the timing at which the dither signal fluctuates is shifted by a half period from the timing at which the light intensity signal fluctuates (that is, anti-phase), the control circuit 54 decreases the switch control signal (injection current).

The control circuit 54 continues the above adjustment operation until fluctuation of the light intensity signal 66 falls below a predetermined threshold (for example, 1/10 of the average value of the light intensity signal 66). By this, the light intensity signal comes to have a substantially local maximum value (S6).

Thus, by the functions of the control circuit 54 and the current monitor 58, the controller 8 adjusts the magnitude of the switch control signal 64 supplied to the optical switch element 4, in a manner to maximize optical intensity signal generated by the first optical gate element 6a (S6). Generally, the maximization process may be achieved by adding a fluctuation, which is proportional to the gradient of a curve, to the switch control signal whereby the switch control signal converges at a point in which the gradient of the curve becomes approximately zero. Therefore, in place of a method using the dither signal, it may be possible to adopt any control procedure performing such control.

Further, during the performance of such control, there may be a case that the current value for the switch control signal falls below zero. In such a case, it is possible to consider the current to the phase shifter on the opposite side, that is, the current between the second electrode 46b and the common electrode 44, as the negative current.

Now, in the optical switch element, there is a problem that output light intensity may largely deviate from a target value due to a small manufacturing error. This problem is remarkable particularly in such optical switch elements utilizing optical interference (for example, the MZ optical switch having been explained by reference to FIGS. 2, 3).

On the other hand, according to the optical switching apparatus 2, it is possible to obtain output light intensity almost equal to the target value (i.e. insertion loss almost equal to a target value is obtained) because the optical signal intensity is fed back to the optical switch element 4.

—Step 8—

In parallel to step S4 and step S6, the control circuit 54 controls the switch element 60 to connect the current source 56 to the second gate element 6b. The current source 56 supplies a current (high-level gate control signal) which produces a loss (optical attenuation factor) of approximately 20 dB in the second gate element 6b, for example, to the p-i-n junction of the second gate element 6b.

When an output light (signal light) output from the first output port 12a is maximized in step S6, signal light leaked out of the second output port 12b decreases. However, signal light (crosstalk light 68) is also output from the second output port 12b, though the amount thereof is small. The above crosstalk light is intercepted by the second gate element 6b to which the current is supplied. By this, the crosstalk of the optical switching apparatus 2 becomes remarkably small.

For example, in the case that the crosstalk of the optical switch element 4 is 20 dB and the loss of the second optical gate element 6b is 20 dB, the crosstalk of the optical switching apparatus 2 becomes 40 dB (=20 dB+20 dB).

As such, by the functions of the control circuit 54 and the current source 56, the controller 8 makes the second optical gate element 6b intercept signal light (crosstalk light) leaked out of the second output port 12b (S8).

In the example described above, steps S4, S6 are executed in parallel to step S8. However, it may also be possible to execute steps S4, S6 before or after step S8.

(ii) Second 1×2 Connection Mode

Figure 10:
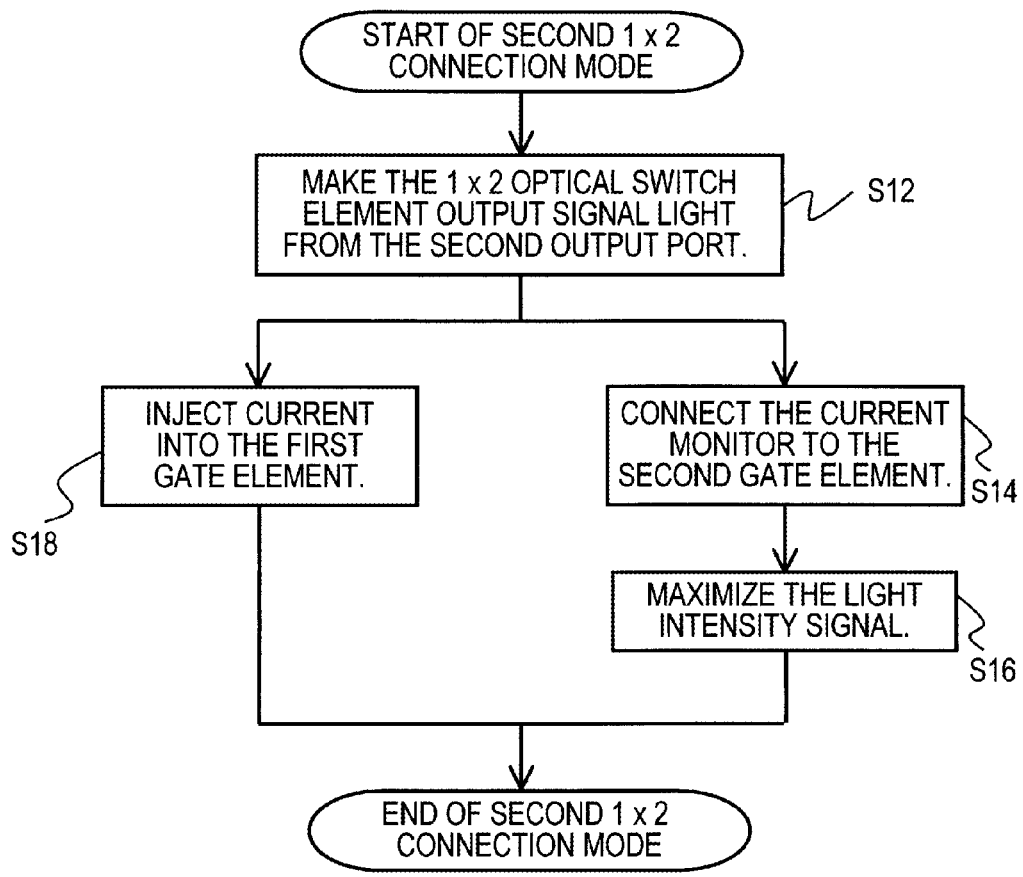
FIG. 10 is a flowchart of a second 1×2 connection mode.
Figure 11:
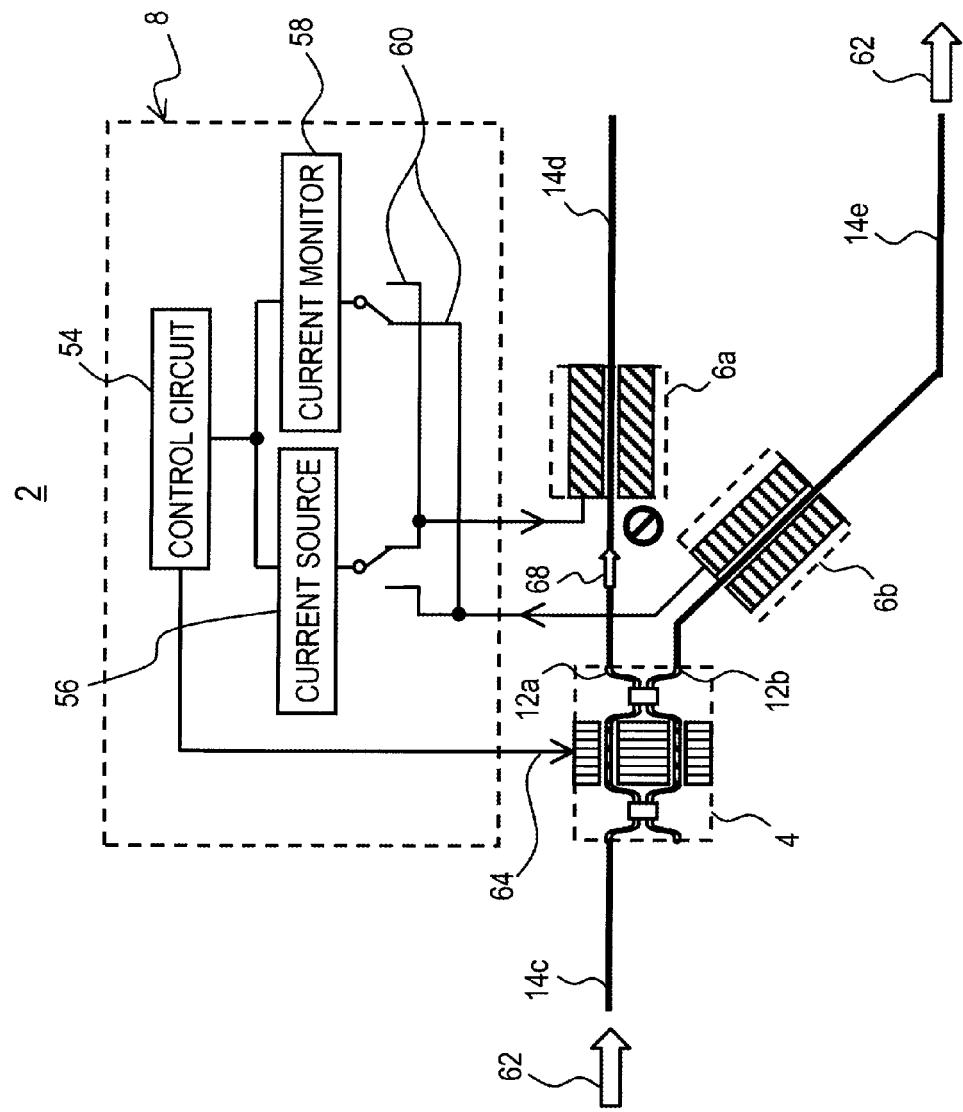
FIG. 11 is an operation diagram in the second 1×2 connection mode.

FIG. 10 is a flowchart of a second 1×2 connection mode. FIG. 11 is an operation diagram in the second 1×2 connection mode. The second 1×2 connection mode resembles the first 1×2 connection mode. Therefore, descriptions about common parts with the first 1×2 connection mode will be omitted.

As depicted in FIG. 11, it is assumed that signal light 62 propagates through the first input waveguide 14c and enters the optical switch element 4.

First, the controller 8 supplies a low-level switch control signal (initial value) 64 to the optical switch element 4, to output the signal light from the second output port 12b (S12).

Next, the controller 8 connects the current monitor 58 to the second optical gate element 6b (S14).

Thus, the controller 8 makes the optical switch element 4 output signal light 62 from the second output port 12b, while making the second optical gate element 6b transmit the above signal light (S12, S14).

Then, based on a light intensity signal (photocurrent) detected by the current monitor 58, the control circuit 54 maximizes the light intensity signal (S16). Namely, the controller 8 adjusts the magnitude of the switch control signal supplied to the optical switch element 4, in a manner to maximize the light intensity signal output from the second optical gate element 6b.

In parallel to step S14 and step S16, the controller 8 connects the current source 56 to the first gate element 6a. For example, the current source 56 supplies a gate control signal (high level signal), which produces the loss of approximately 20 dB in the first gate element 6a, to the first gate element 6a (S18). By the above step S18, the controller 8 makes the first optical gate element 6a intercept signal light (crosstalk light) leaked out of the first output port 12a.

Thus, the second 1×2 connection mode is completed.

The above-mentioned operation is summarized as follows.

The controller 8 operates in the first 1×2 connection mode (first mode) and the second 1×2 connection mode (second mode).

Here, the first 1×2 connection mode is a mode in which the controller 8 makes the optical switch element 4 output the signal light 62 from the first output port 12a while making the first optical gate element 6a transmit the signal light which is output from the first output port 12a, and the controller 8 makes the second optical gate element 6b intercept the signal light leaked from the second output port 12b.

The second 1×2 connection mode is a mode in which the controller 8 makes the optical switch element 4 output signal light from the second output port 12b while making the second optical gate element 6b transmit the signal light which is output from the second output port 12b, and the controller 8 makes the first optical gate element 6a intercept the signal light leaked from the first output port 12a.

In the first connection mode, the controller 8 adjusts the magnitude of the switch control signal 64 in a manner to increase the light intensity signal generated by the first optical gate element 6a (i.e. in a manner to obtain a large light intensity signal), so as to maximize the light intensity signal 66. Also, in the second connection mode, the controller 8 adjusts the magnitude of the switch control signal 64 in a manner to maximize the light intensity signal generated by the second optical gate element 6b. However, it may also be possible to simply increase the magnitude of the light intensity signal without maximization. By increasing of the light intensity signal, the output light intensity of the optical switching apparatus 2 approaches a target value.

Now, when attention is paid to the first output port 12a, the first connection mode is an output mode in which the optical switch element 4 is made to output the signal light 62 from the first output port 12a, while the first optical gate element 6a is made to transmit the output signal light. In this output mode, the magnitude of the switch control signal is adjusted in a manner to maximize (increase) the light intensity signal generated by the optical gate element 6a.

On the other hand, the second connection mode is an interception mode in which the first gate element 6a is made to intercept the signal light (crosstalk light) leaked from the first output port 12a, without making the optical switch element 4 output the signal light 62 from the first output port 12a.

The optical switching apparatus 2 according to the embodiment 1 includes the controller 8, as depicted in FIG. 1. However, the optical switching apparatus 2 may not include the controller 8. In that case, the switch control signal and the gate control signal are supplied externally.

As described above, the first optical switch element 4 is an element which outputs or does not output the signal light (input light) to the output port, in response to the switch control signal.

Here, to make signal light (input light) be output to an output port (for example, the first output port 12a) signifies to make most portion (preferably equal to or higher than 50%, and more preferably equal to or higher than 75%) of the signal light (input light), which enters an input port (for example, the first input port 10a), be output to the output port (for example, the first output port 12a). On the other hand, to make signal light (input light) not be output to an output port (for example, the first output port 12a) signifies to make most portion (preferably equal to or higher than 90%, and more preferably equal to or higher than 99%) of the signal light (input light), which enters an input port (for example, the first input port 10a), not be output to the output port (for example, the first output port 12a). The same is applicable to the embodiments described later.

Also, to make the optical gate elements 6a, 6b transmit incident light signifies to make the insertion loss of the incident light be equal to or lower than a predetermined value (for example, 1 dB). Also, to make the optical gate elements 6a, 6b intercept incident light signifies to make the insertion loss of the incident light be equal to or higher than a predetermined value (for example, 10 dB). The same is applicable to the embodiments described later.

(3) Manufacturing Method

FIGS. 12A-12C and FIGS. 13A-13C are process cross sections illustrating the manufacturing method of the optical switching apparatus 2 excluding the controller 8. In FIGS. 12A through 13C, the cross sections of the first optical gate element 6a are depicted.

Figure 12A:
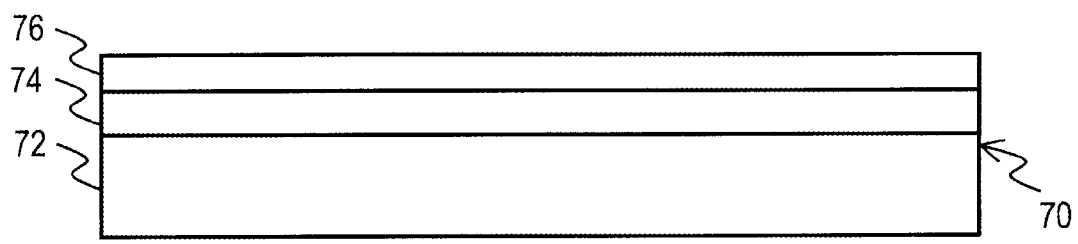
FIGS. 12A-12C are process cross sections illustrating the manufacturing method of the optical switching apparatus excluding the controller.

First, as depicted in FIG. 12A, a wafer-shaped SOI (silicon on insulator) substrate 70 is prepared. The SOI substrate 70 includes Si substrate 72, BOX layer (buried oxide layer) 74 and SOI (silicon on insulator) layer 76. The BOX layer 74 is a $SiO_2$ layer with a thickness of, for example, around 3 μm, which becomes the first clad layer 28. The SOI layer 76 is a single crystal Si layer with a thickness of, for example, around 250 nm.

Figure 12B:
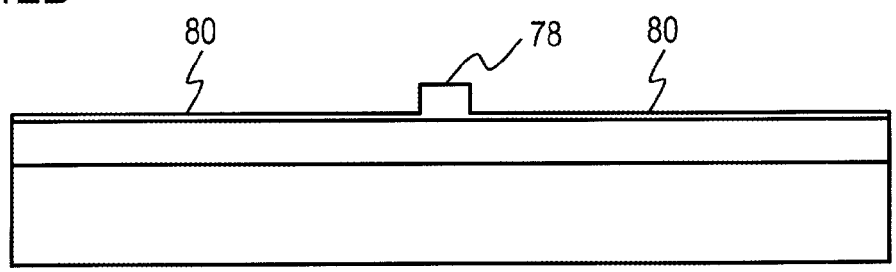

Next, as depicted in FIG. 12B, by use of the photolithography technique and the dry etching technique, SOI layer 76 is etched to form each ridge portion 78 of optical members (the optical switch element 4, the first optical gate element 6a, the second optical gate element 6b and the optical waveguides 14a, 14b, etc.). On both sides of the ridge portion 78, each slab region 80 is formed with a thickness of around 50 nm.

Figure 12C:
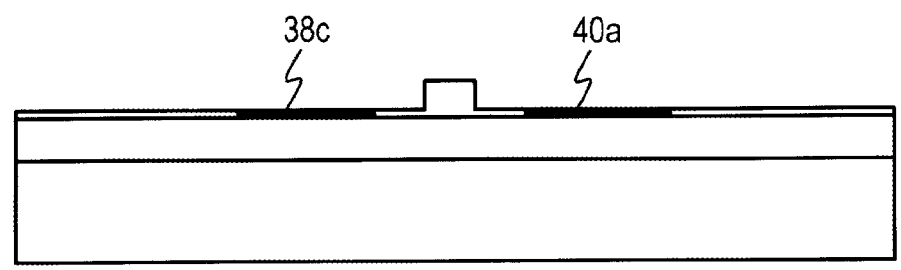

Next, to each formation position of the p-type regions 38a, 38b, 38c, a p-type dopant (for example, boron) is ion-implanted. Similarly, to each formation position of the n-type regions 40, 40a, an n-type dopant (for example, phosphor) is ion-implanted. Thereafter, thermal treatment is performed to activate implanted impurities, so as to form the p-type region 38a, 38b, 38c and the n-type region 40, 40a as depicted in FIG. 12C.

The dose of the ion implantation is set to be a value to make carrier concentration of each region be, for example, $5 \times 10^{18}$ $cm^{-3}$ to $5 \times 10^{19}$ $cm^{-3}$ (preferably $1 \times 10^{19}$ $cm^{-3}$). If the carrier concentration is decreased to be lower than the above-mentioned range (from $5 \times 10^{18}$ $cm^{-3}$ to $5 \times 10^{19}$ $cm^{-3}$), the number of carriers accumulated in the p-i-n junction by current injection decreases too much, and the variation of the refractive index decreases too much. On the other hand, if the carrier concentration is increased to be higher than the range, light absorption by the p-type regions 38a, 38b, 38c and the n-type regions 40, 40a increases, and the propagation loss of the signal light 62 becomes not negligible.

Figure 13A:
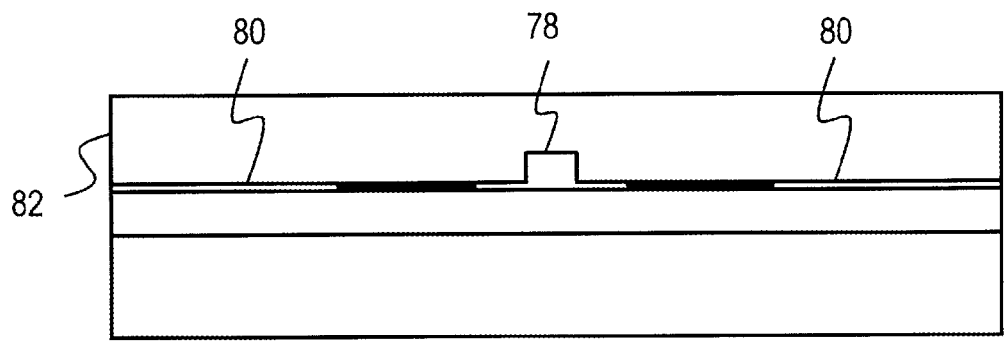
FIGS. 13A-13C are process cross sections illustrating the manufacturing method of the optical switching apparatus excluding the controller.

Next, as depicted in FIG. 13A, a $SiO_2$ film 82 with a thickness of around 1 μm is deposited on the surfaces of the slab region 80 and the ridge portion 78 by the CVD (chemical vapor deposition) method, for example. The $SiO_2$ film becomes the second clad layer 30.

Figure 13B:
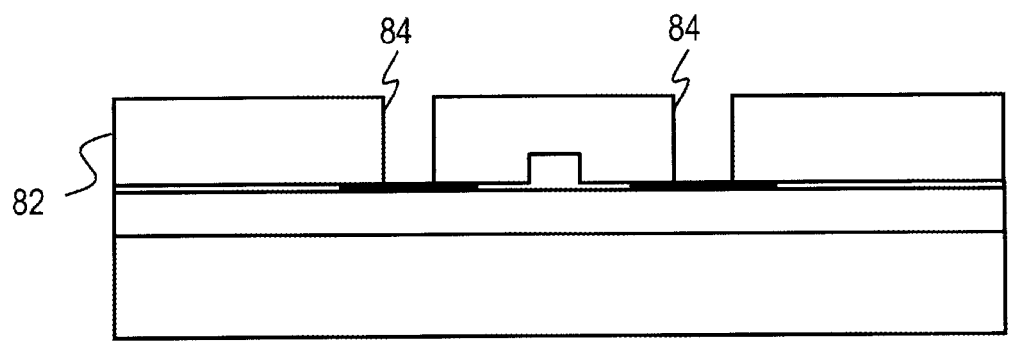
Figure 13C:
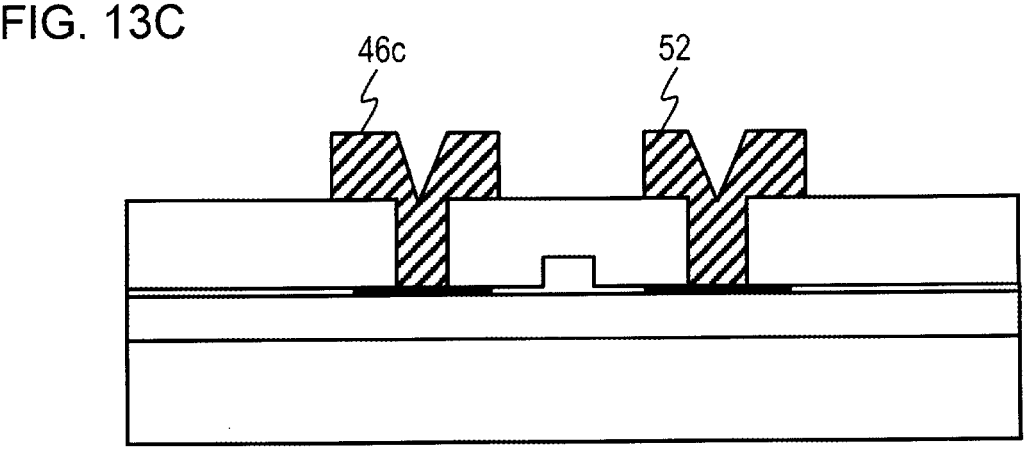

As depicted in FIG. 13B, by etching the $SiO_2$ film 82, there are formed contact holes 84 which reach the p-type regions 38a, 38b, 38c and the n-type regions 40, 40a.

Thereafter, a conductor film (for example, an Al film) is deposited on the $SiO_2$ film 82, and the conductor film outside the formation position of each electrode is removed. By this, the first to third electrodes 46a, 46b, 46c, the common electrode 44, and ground electrode 52 are formed.

Thereafter, by dividing of the SOI substrate 70, a chip-shaped optical switching apparatus 2 is formed.

Preferably, the sizes of the ridge portions 36a, 36b, 36c and the size of the slab region 80 are determined to make a transverse mode of waveguide light be a single mode.

(4) Deformation Example 1

In the aforementioned example, the second electrode 46b of the optical switch element 4 is grounded. However, similar to the first electrode 46a, it is possible to supply a switch control signal also to the second electrode 46b.

For example, in the first 1×2 connection mode, by injecting current into the first electrode 46a without injection of current into the second electrode 46b, a phase difference between the first branch light and the second branch light is made to be approximately π multiplied by an odd number. On the other hand, in the second 1×2 connection mode, by injecting current into the second electrode 46b without injection of current into the first electrode 46a, a phase difference between the first branch light and the second branch light is made to be approximately π multiplied by an even number.

Also, as described earlier, in the first electrode 46a and the second electrode 46b, phase directions as phase shifters are mutually opposite. By using this, it is possible to perform continuous control by distributing each phase control signal, including a positive and a negative, to the first electrode 46a when it is positive and to the send electrode 46b when it is negative.

(5) Deformation Example 2

In the aforementioned example, the optical switch element 4 is an MZ optical switch utilizing the plasma effect. However, as the optical switch element 4, it may also be possible to use optical switches other than the MZ optical switch utilizing the plasma effect. For example, it is possible to use an MZ optical switch utilizing a thermo-optic effect (Yuya Shoji et al., "Low-crosstalk 2×2 thermo-optic switch with silicon wire waveguide", Optics Letters, Vol. 18 pp. 9071-9075, 2010).

It is possible to alternatively use a 1×N phased-array switch (Takuo Tanemura et al., "Wavelength-multiplexed optical packet switching using InP phased-array switch", Optics Letters, Vol. 17 pp. 9454-9459, 2009).

It is also possible to alternatively use a reflection-type optical waveguide switch (Baojun Li et al., "1.55 μm reflection-type optical waveguide switch based on SiGe/Si plasma dispersion effect", Applied Physics Letters, Vol. 75, pp. 1-3, 1999).

Further, it is possible to alternatively use an N×N beam-deflection switch (Akio Sugama et al., "Electro-Optic Beam-Deflection Switch for Photonic Burst Switching", Conf. Proc. 30th European Conference on Optical Communication (ECOC '04), 2004: Sep. 5-9, Mo 4.6.3).

(6) Deformation Example 3

As described earlier, the optical switching apparatus 2 is a 1×2 optical switch.

However, the optical switching apparatus 2 may be a 1×1 optical switch. Such an optical switching apparatus may be used as an optical modulator, for example.

Now, it is assumed that neither the optical waveguide 14b nor the second gate element 6b is connected to the second output port 12*b* of the optical switch element 4 (refer to FIG. 1). To such an optical switching apparatus 2, stationary light with constant intensity relative to time variation is input.

In the above state, the controller 8 makes the optical switch element 4 output stationary light from the first output port 12*a*, while making the optical gate element 6*a* transmit signal light. Further, the controller 8 adjusts the magnitude of the switch control signal 64 in a manner to maximize (or increase) a light intensity signal generated by the optical gate element 6*a*. At this time, the controller 8 superimposes a modulation signal (electric signal corresponding to certain information) upon the switch control signal 64 to modulate the stationary light.

Then, the controller 8 adjusts the switch control signal in a manner to maximize (or increase) the output light intensity of the optical switch element 4, while modulating the input light (stationary light). Thus, it is possible to obtain a large modulation degree substantially equal to a target value.

(Embodiment 2)

(1) Structure

Figure 14:
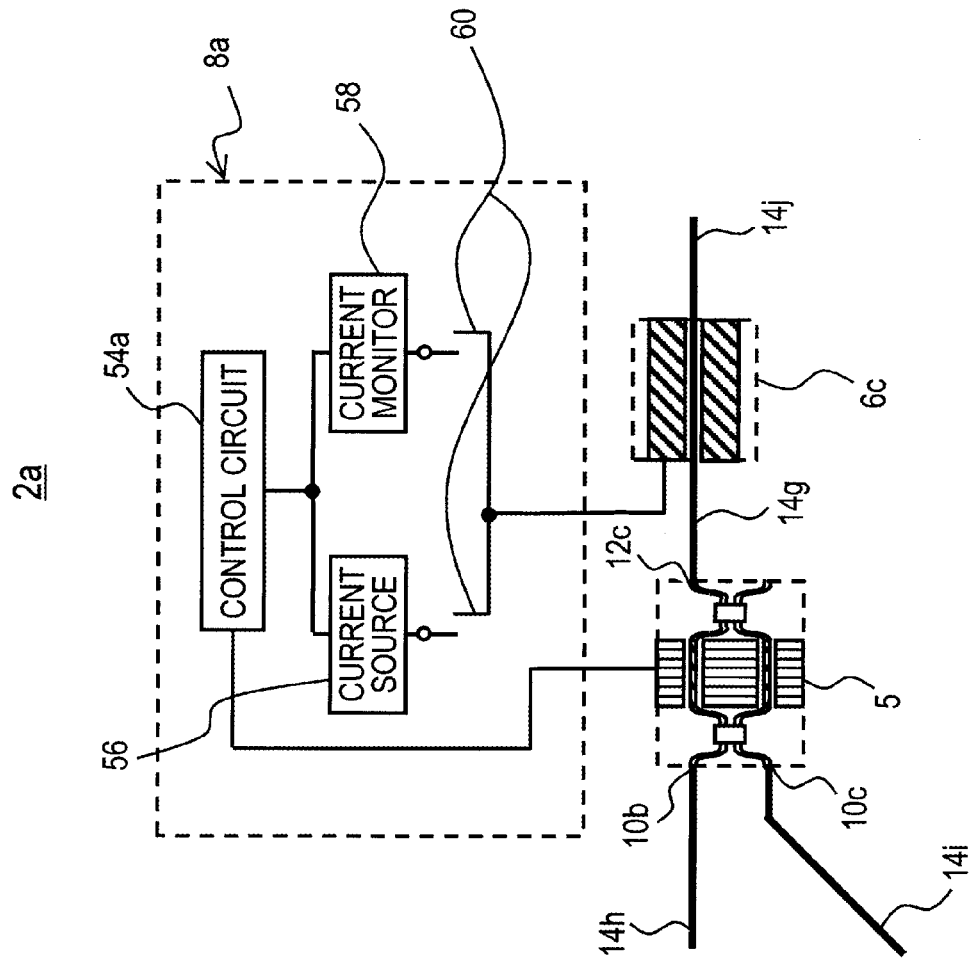
FIG. 14 is a configuration diagram of an optical switching apparatus according to the embodiment 2.

FIG. 14 is a configuration diagram of an optical switching apparatus 2*a* according to the present embodiment. As depicted in FIG. 14, the configuration of the optical switching apparatus 2*a* resembles that of the optical switching apparatus 2 according to Embodiment 1. Therefore, descriptions about common parts with the optical switching apparatus 2 of Embodiment 1 will be omitted.

As depicted in FIG. 14, the optical switching apparatus 2*a* includes an optical switch element 5, an third optical gate element 6*c* and a controller 8*a* which supplies a switch control signal to the optical switch element 5, and also supplies a gate control signal to the third optical gate element 6*c*.

The optical switch element 5 is a 2×1 optical switch element which includes a first input port 10*b*, a second input port 10*c* and a output port 12*c*.

According to Embodiments 3 and 4 described later, the first input port 10*b* and the second input port 10*c* are designated as a second input port and a third input port, respectively. Therefore, to avoid confusion, the designations used in Embodiments 3 and 4 will be used in the description hereafter. Namely, hereafter, the first input port 10*b* will be designated as a second input port, and the second input port 10*c* will be designated as a third input port. For the same reason, the output port 12*c* will be designated as a third output port.

The optical switch element 5 is an optical switch element which outputs or does not output first signal light, which enters a second input port 10*b*, from a third output port 12*c* depending on the level of a switch control signal. Further, when first signal light entering the second input port 10*b* is not output, the optical switch element 5 is an element which outputs second signal light, which enters a third input port 10*c*, from the third output port 12*c*.

The optical switch element 5 is, for example, an MZ optical switch 16 described by reference to FIG. 2. For example, the second input port 10*b* of the optical switch element 5 corresponds to the first input port 10*a* of the MZ optical switch 16. The third input port 10*c* corresponds to the dummy port 11 of the MZ optical switch 16, for example. A second output port 12*b* of the MZ optical switch 16 is used as a dummy port which is not connected to other optical members.

The third gate element 6*c* is an optical gate element which is substantially identical to the first gate element 6*a* of Embodiment 1. The gate element 6*c* is connected to the third output port 12*c* of the optical switch element 5 as depicted in FIG. 14, and transmits or intercepts incident light depending on level of a gate control signal.

To the second input port 10*b* and the third input port 10*c* of the optical switch element 5, a second input waveguide 14*h* and a third input waveguide 14*i* are connected, respectively.

As depicted in FIG. 14, the third output port 12*c* of the optical switch element 5 is connected to the input end of the third optical gate element 6*c* through an optical waveguide 14*g*. To the output end of the third optical gate element 6*c*, a third output waveguide 14*j* is connected.

The optical switching apparatus 2*a* may share the input waveguides 14*h*, 14*i* and the output waveguide 14*j* with different devices (for example, another optical switching apparatus). Alternatively, the optical switching apparatus 2*a* may include the input waveguides 14*h*, 14*i* and the output waveguide 14*j* independently.

The controller 8*a* includes a control circuit 54*a*, a current source 56, current monitor 58 and a switch element 60, for example, as depicted in FIG. 14.

(2) Operation

The controller 8*a* is operated in four modes described below.

—First 2×1 Connection Mode—

Figure 15:
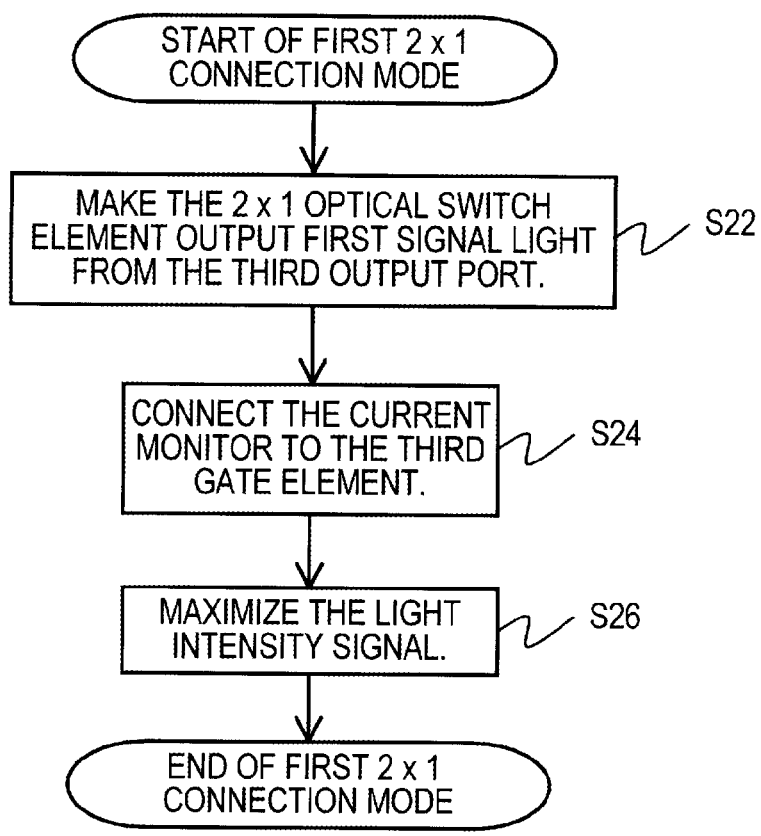
FIG. 15 is a flowchart of a first 2×1 connection mode.
Figure 16:
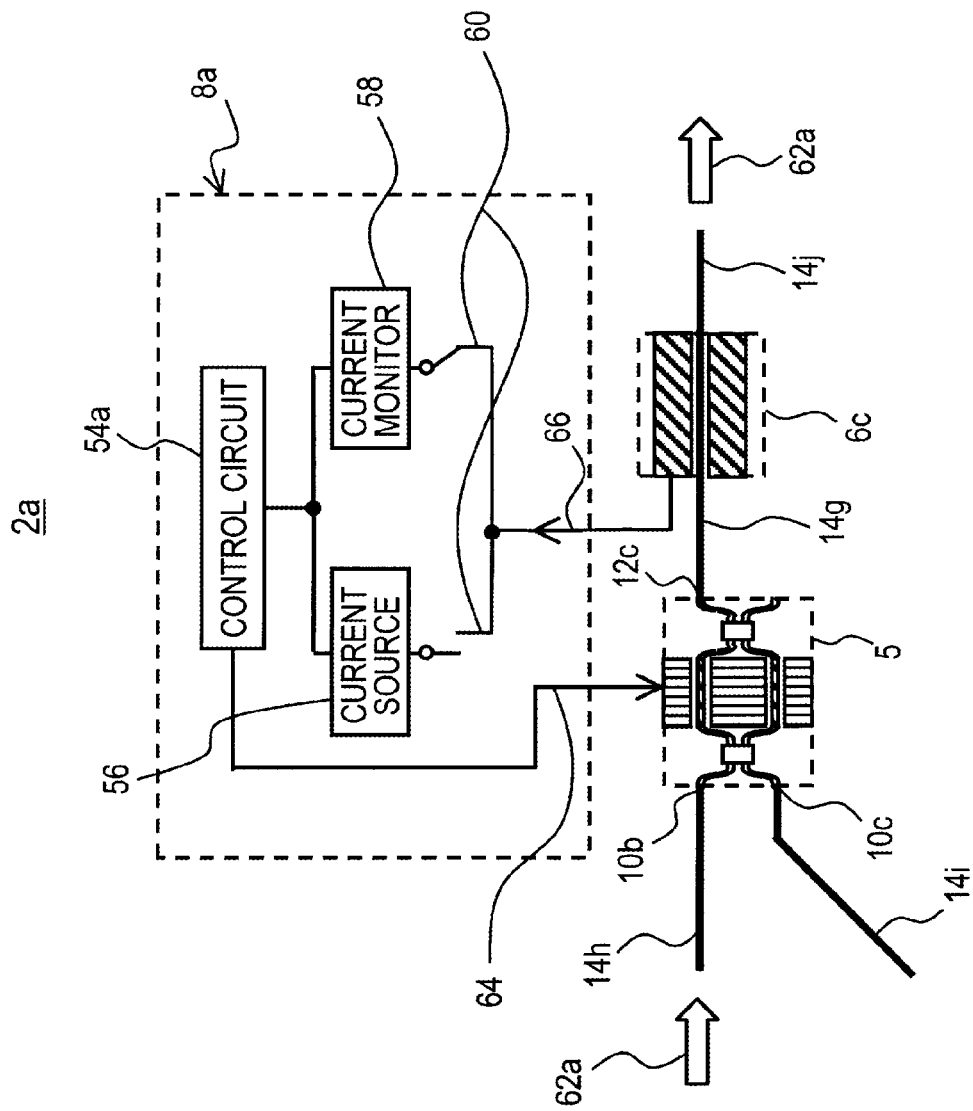
FIG. 16 is an operation diagram in the first 2×1 connection mode.

FIG. 15 is a flowchart of a first 2×1 connection mode. FIG. 16 is an operation diagram in the first 2×1 connection mode.

As depicted in FIG. 16, it is assumed that first signal light 62*a* propagates through the second input waveguide 14*h* and enters the optical switch element 5.

The control circuit 54*a* supplies a switch control signal (for example, high level signal) 64 to the optical switch element 5, so that the first signal light 62*a* is output from the third output port 12*c* (S22). This step is substantially identical to step S2 in the first 1×2 connection mode of Embodiment 1 (refer to FIG. 8).

Next, as depicted in FIG. 16, the control circuit 54*a* connects the current monitor 58 to the third optical gate element 6*c* (S24). This step is substantially identical to step S4 in the first 1×2 connection mode (refer to FIG. 8).

The control circuit 54*a* measures a light intensity signal 66 generated by the third gate element 6*c* using the current monitor 58, and adjusts the magnitude of the switch control signal in a manner to maximize the light intensity signal 66 (S26). This step is substantially identical to step S6 in the first 1×2 connection mode (refer to FIG. 8).

As such, by means of the control circuit 54*a*, the controller 8*a* makes the optical switch element 5 output the signal light 62*a*, which enters the second input port 10*b*, from the third output port 12*c*, while making the third optical gate element 6*c* transmit the signal light which is output from the third output port 12*c*. At this time, the controller 8*a* adjusts the magnitude of the switch control signal in a manner to maximize (or increase) the light intensity signal generated by the third optical gate element 6*c*.

Thus, the reduction of output light of the optical switch element 5 caused by a manufacturing error is suppressed, and output light intensity close to a target value is obtained. The same is applicable to a second 2×1 connection mode described below.

—Second 2×1 Connection Mode—

Figure 17:
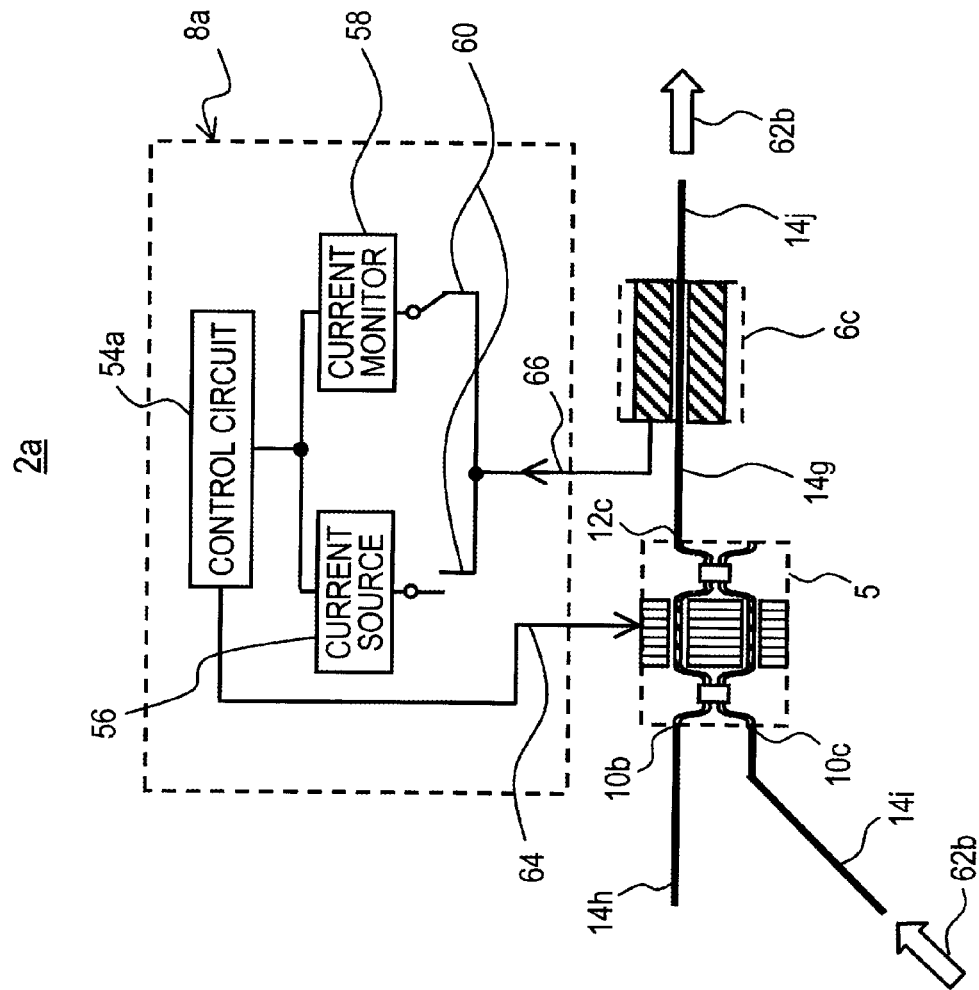
FIG. 17 is an operation diagram in a second 2×1 connection mode.

FIG. 17 is an operation diagram in a second 2×1 connection mode.

As depicted in FIG. 17, it is assumed that second signal light 62*b* propagates through the third input waveguide 14*i* and enters the optical switch element 5.

As depicted in FIG. 17, the control circuit 54*a* supplies a switch control signal (for example, low level signal) 64 to the optical switch element 5, so that the second signal light 62*b* is output from the third output port 12*c*. Here, the switch control signal supplied to the optical switch element 5 is, for example, the switch control signal supplied to the optical switch element 4 in the second 1×2 connection mode of Embodiment 1 (refer to FIG. 10).

Next, the control circuit 54*a* connects the current monitor 58 to the third gate element 6*c*, as depicted in FIG. 17.

The control circuit 54*a* measures a light intensity signal 66 generated by the third gate element 6*c*, using the current monitor 58, and adjusts the magnitude of the switch control signal so that the light intensity signal 66 is maximized. The adjustment method of the switch control signal is substantially identical to the adjustment method of step S26 in the first 2×1 connection mode (refer to FIG. 15), for example.

As such, by means of the control circuit 54*a*, the controller 8*a* makes the optical switch element 5 output the second signal light 62*b*, which enters the third input port 10*c*, from the third output port 12*c*, while making the third optical gate element 6*c* transmit the second signal light 62*b*. At this time, the controller 8*a* adjusts the magnitude of the switch control signal in a manner to maximize (or increase) the light intensity signal generated by the third optical gate element 6*c*.

—First 2×1 Interception Mode—

Figure 18:
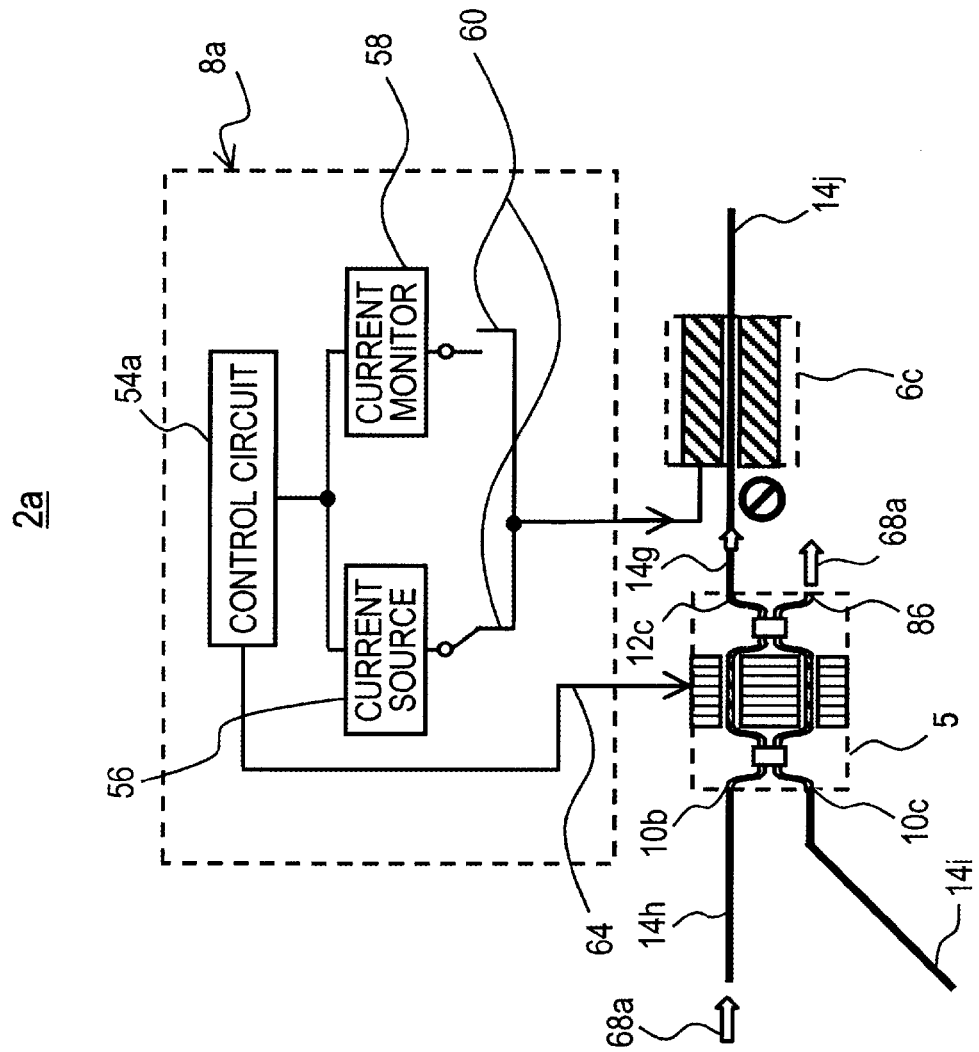
FIG. 18 is an operation diagram in a first 2×1 interception mode.

FIG. 18 is an operation diagram in a first 2×1 interception mode.

As depicted in FIG. 18, it is assumed that crosstalk light (input light) 68*a* from another optical switching apparatus propagates through the first input waveguide 14*h* and enters the optical switch element 5.

The control circuit 54*a* supplies a switch control signal (for example, low level signal) 64 to the optical switch element 5, so that the crosstalk light 68*a* is output from a dummy output port 86.

Next, the control circuit 54*a* connects the current source 56 to the third gate element 6*c*, so that incident light (light entering the optical gate element 6*c*, that is, crosstalk light 68*a*) is intercepted. At this time, a gate control signal supplied to the third gate element 6*c* is substantially identical to the gate control signal supplied to the second optical gate element 6*b* in step S8 of the first 1×2 connection mode of Embodiment 1 (refer to FIG. 8).

As depicted in FIG. 18, the crosstalk light 68*a* is output from the dummy output port 86. At this time, a portion of the crosstalk light 68*a* is leaked out of the third output port 12*c*. The leaked portion of the crosstalk light 68*a* is intercepted by the third optical gate element 6*c*.

Thus, according to the first 2×1 interception mode, the crosstalk light generated in another optical switching apparatus etc. is sufficiently removed. The same is applicable to a second 2×1 interception mode described below.

—Second 2×1 Interception Mode—

Figure 19:
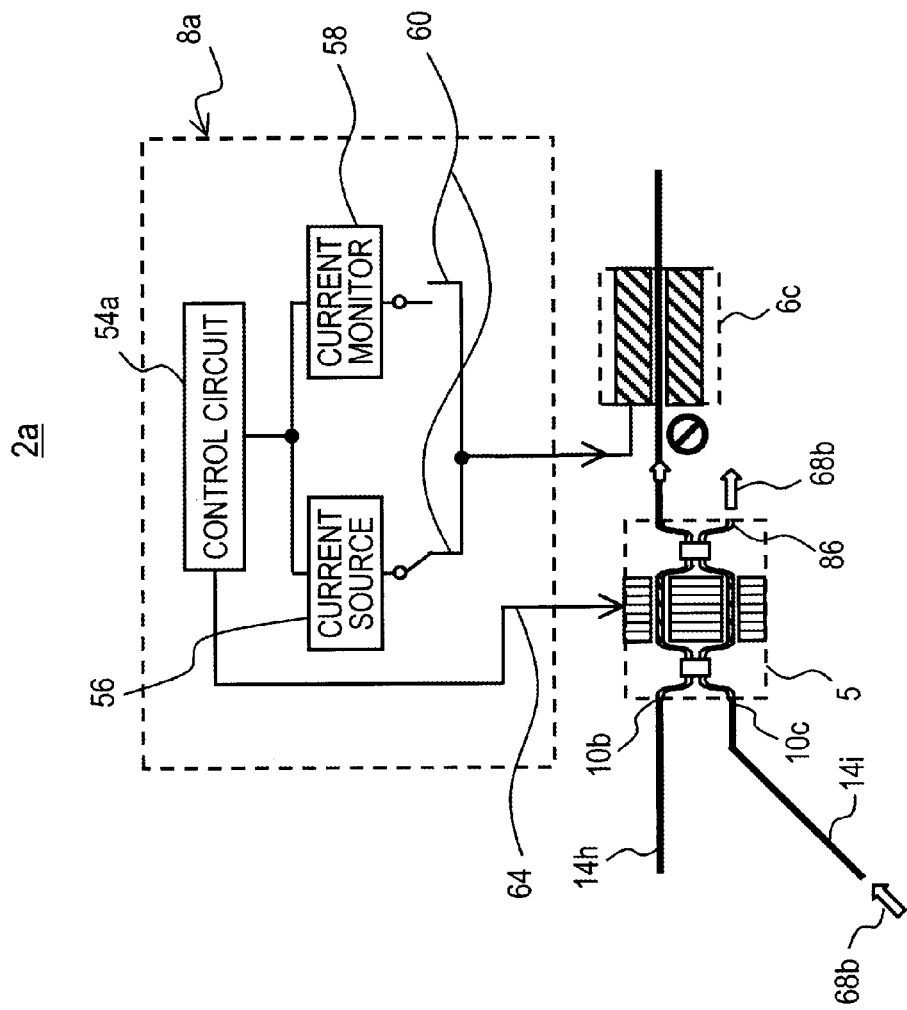
FIG. 19 is an operation diagram in a second 2×1 interception mode.

FIG. 19 is an operation diagram in a second 2×1 interception mode.

The second 2×1 interception mode is substantially identical to the first 2×1 interception mode excluding that crosstalk light 68*b* propagating through the third input waveguide 14*i* is output from the dummy output port 86.

Namely, the control circuit 54*a* supplies a switch control signal (for example, high level signal) 64 to the optical switch element 5, so that the crosstalk light 68*b* is output from the dummy output port 86. Next, the control circuit 54*a* connects the current source 56 to the third gate element 6*c*, so that incident light (crosstalk light 68*b*) is intercepted.

Additionally, for example, when external crosstalk light is not a problem, the optical switching apparatus 2*a* may neither perform the first 2×1 interception mode nor the second 2×1 interception mode.

(Embodiment 3)

(1) Structure

Figure 20:
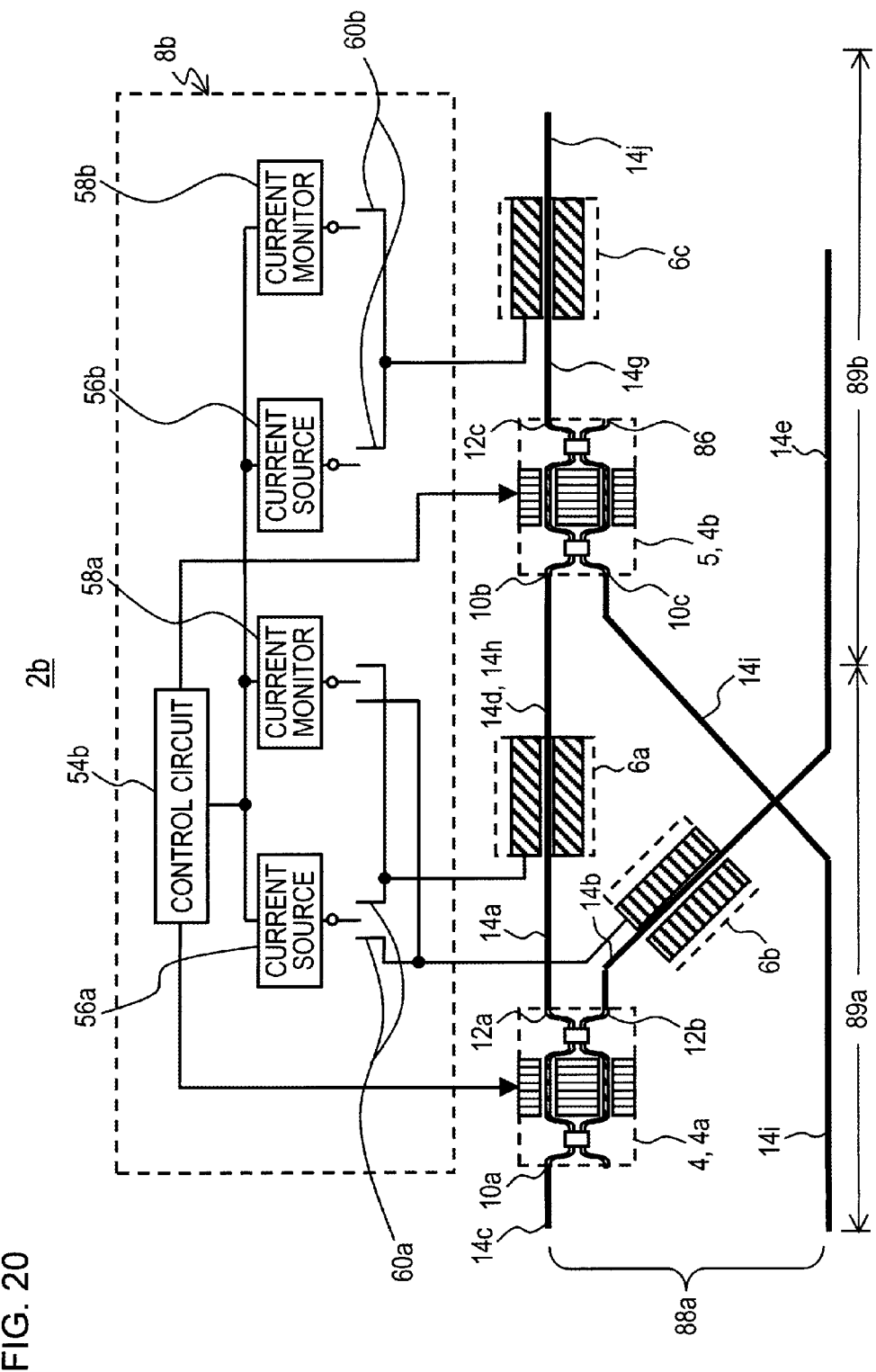
FIG. 20 is a configuration diagram of an optical switching apparatus (2×2 optical switch) according to the present embodiment 3.

FIG. 20 is a configuration diagram of an optical switching apparatus (2×2 optical switch) 2*b* according to the present embodiment.

The optical switching apparatus 2*b* includes common portions with each optical switching apparatus 2, 2*a* in Embodiments 1, 2. Therefore, descriptions about the common portions with Embodiments 1, 2 will be omitted or simplified.

As depicted in FIG. 20, the optical switching apparatus 2*b* includes a first optical circuit 88*a* and a controller 8*b*. The first optical circuit 88*a* includes a first region 89*a* and a second region 89*b*.

The first region 89*a* is a region including a first optical switch element 4*a*, a first optical gate element 6*a*, a second optical gate element 6*b* and optical waveguides 14*a*-14*e* connected to the above elements. The optical circuit in the first region 89*a* corresponds to the optical switching apparatus 2 in Embodiment 1 without the controller 8.

Here, the first optical switch element 4*a* is the optical switch element 4 of Embodiment 1. Hereafter, an input port 10*a* of the first optical switch element 4*a* will be referred to as a first input port.

The second region 89*b* is a region including a second optical switch element 4*b*, a third optical gate element 6*c* and optical waveguides 14*g*-14*j* connected to these elements. The optical circuit in the second region 89*b* corresponds to the optical switching apparatus 2*a* in Embodiment 2 without the controller 8*a*. Here, the second optical switch element 4*b* is the optical switch element 5 in Embodiment 2.

As depicted in FIG. 20, an output end of the first optical gate element 6*a*, which is included in the first region 89*a*, is connected to a second input port 10*b* of the second optical switch element 4*b* which is included in the second region 89*b*. By this, the first region 89*a* is connected to the second region 89*b*.

To the first optical switch element 4*a*, a first switch control signal (the switch control signal in Embodiment 1) is supplied, and also, to the second optical switch element 4*b*, a second switch control signal (the switch control signal in Embodiment 2) is supplied.

A response of the first optical switch element 4*a* to the first switch control signal is the response of the optical switch element 4 to the switch control signal as described in Embodiment 1. Similarly, a response of the second optical switch element 4*b* to the second switch control signal is the response of the optical switch element 5 to the switch control signal as described in Embodiment 2.

To the first to third optical gate elements 6*a*-6*c*, first to third gate control signals (the gate control signals in Embodiments 1 and 2) are supplied, respectively. Responses of the first to third optical gate elements 6*a*-6*c* to the first to third gate control signals are as described in Embodiment 1 or 2.

As depicted in FIG. 20 for example, the controller 8*b* includes a control circuit 54*b*, a first current source 56*a*, a first current monitor 58*a* and a first switch element 60*a*. Further, the controller 8*b* includes a second current source 56*b*, a second current monitor 58*b* and a second switch element 60*b*.

The first current source 56*a* and the second current source 56*b* are the current sources 56 of Embodiments 1, 2, respectively. The current monitor 58*a* and the second current monitor 58*b* are the current monitors 58 of Embodiment 1 and 2, respectively. The first switch element 60*a* and the second switch element 60*b* are the switch elements 60 of Embodiment 1 and 2, respectively.

The control circuit 54b supplies the first switch control signal to the first optical switch element 4a, and also supplies the second switch control signal to the second optical switch element 4b.

(2) Operation

The controller 8b controls the first optical circuit 88a in four modes described below.

—Path Exchange Mode—

Figure 21:
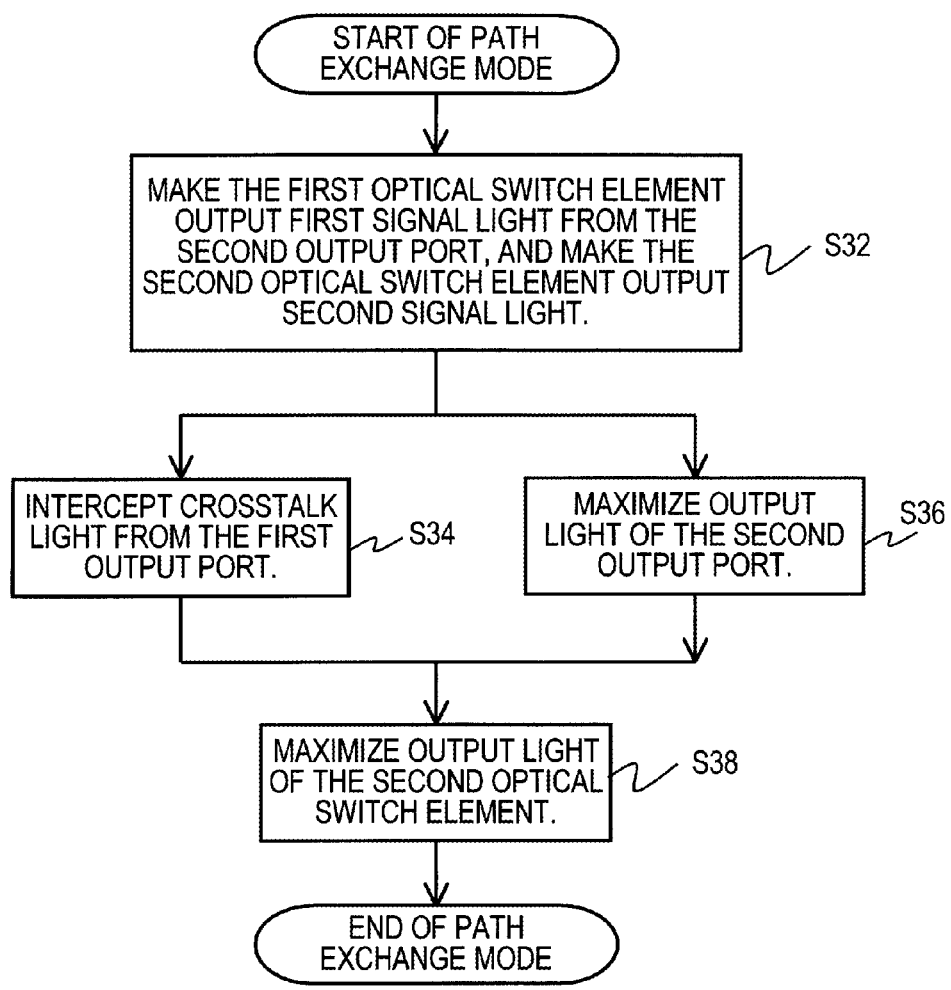
FIG. 21 is a flowchart of a path exchange mode.
Figure 22:
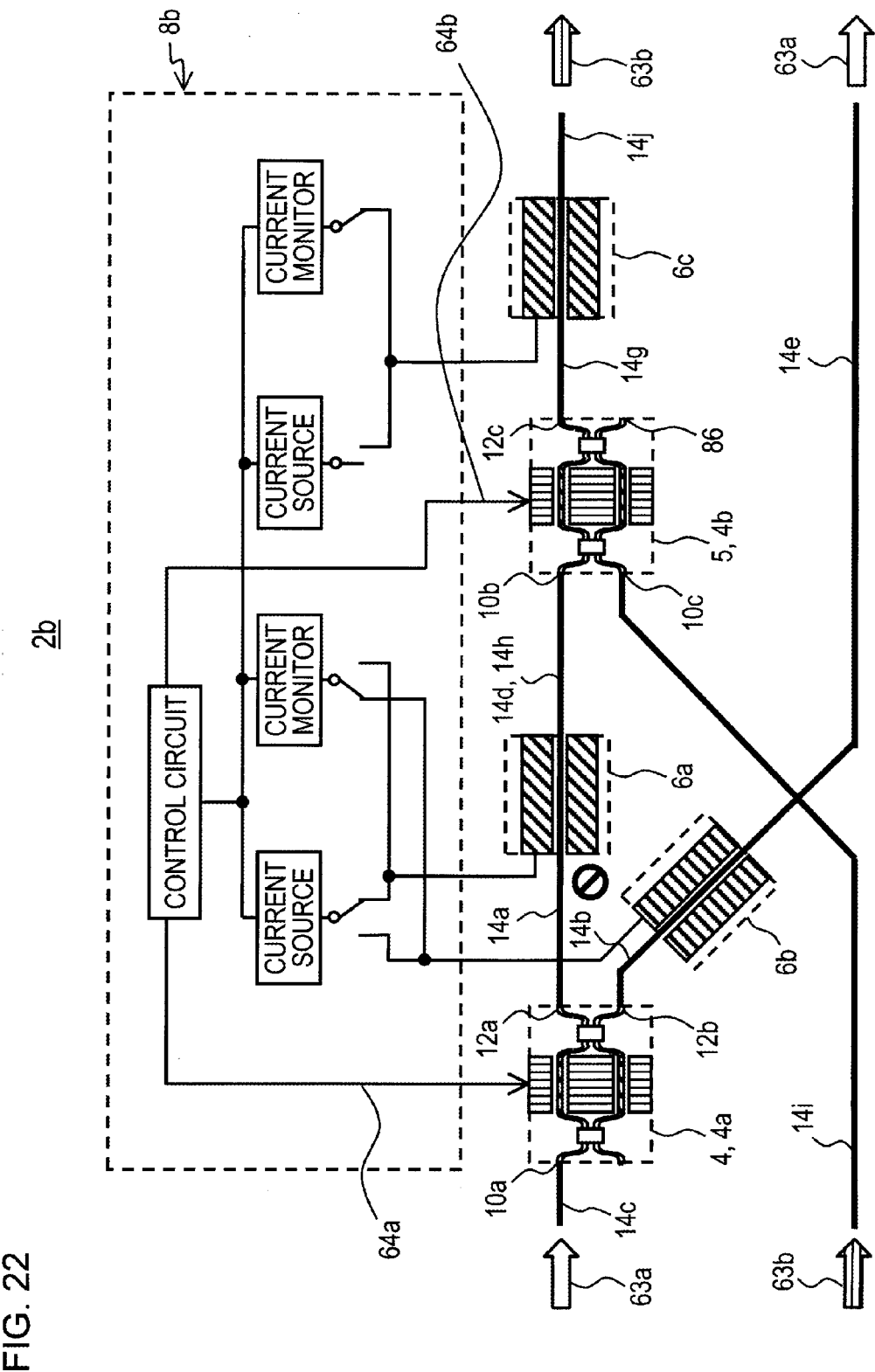
FIG. 22 is an operation diagram in the path exchange mode.

FIG. 21 is a flowchart of a path exchange mode. FIG. 22 is an operation diagram in the path exchange mode.

As depicted in FIG. 22, it is assumed that first signal light 63a propagates through the first input waveguide 14c and enters the first input port 10a of the first optical switch element 4a. Also, it is assumed that second signal light 63b propagates through the third input waveguide 14i and enters the third input port 10c of the second optical switch element 4b. The first signal light 63a and the second signal light 63b are optical signals supplied from the outside of the optical switching apparatus 2b.

The first signal light 63a corresponds to the signal light 62 in Embodiment 1 (refer to FIG. 9). The second signal light 63b corresponds to the second signal light 62b in Embodiment 2 (refer to FIG. 17).

In this state, the controller 8b supplies a first switch control signal (low level signal) 64a to the first optical switch element 4a, to output the first signal light 63a from the second output port 12b (S32). Further, the controller 8b supplies a second switch control signal (low level signal) 64b to the second optical switch element 4b, to output the second signal light 63b from the third output port 12c (S32).

Next, the controller 8b makes the first optical gate element 6a intercept crosstalk light from the first output port 12a (S34), and makes the first optical switch element 4a maximize output light (the first signal light 63a) from the second output port 12b (S36). The above steps are substantially identical to steps S14-S18 in the second 1×2 connection mode of Embodiment 1 (refer to FIG. 10).

Further, the controller 8b makes the second optical switch element 4b maximize the output light thereof (second signal light 63b) (S38). The above step is substantially identical to the maximization step of the second signal light 62b in the second 2×1 connection mode of Embodiment 2 (refer to FIG. 17). Here, the maximization step of the signal light is a step of measuring the light intensity signal generated by the optical gate element and controlling the optical switch element to maximize the light intensity signal which is measured, similar to steps S24 and S26 in the first 2×1 connection mode (refer to FIG. 15).

Thus, the paths of the first signal light 63a and the second signal light 63b are exchanged (crossed), and also the output light (the first signal light 63a and the second signal light 63b) of the optical switching apparatus 2b is maximized.

—Path Non-Exchange Mode—

Figure 23:
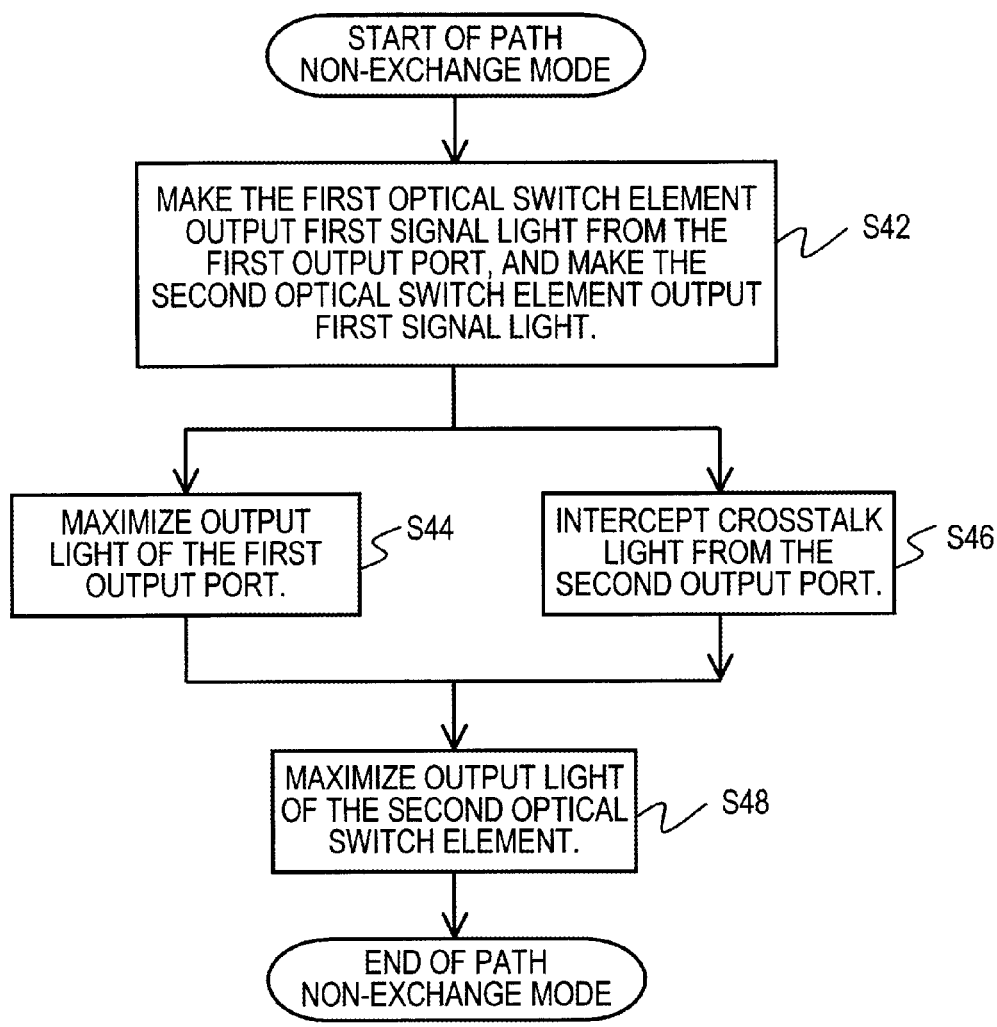
FIG. 23 is a flowchart of a path non-exchange mode.
Figure 24:
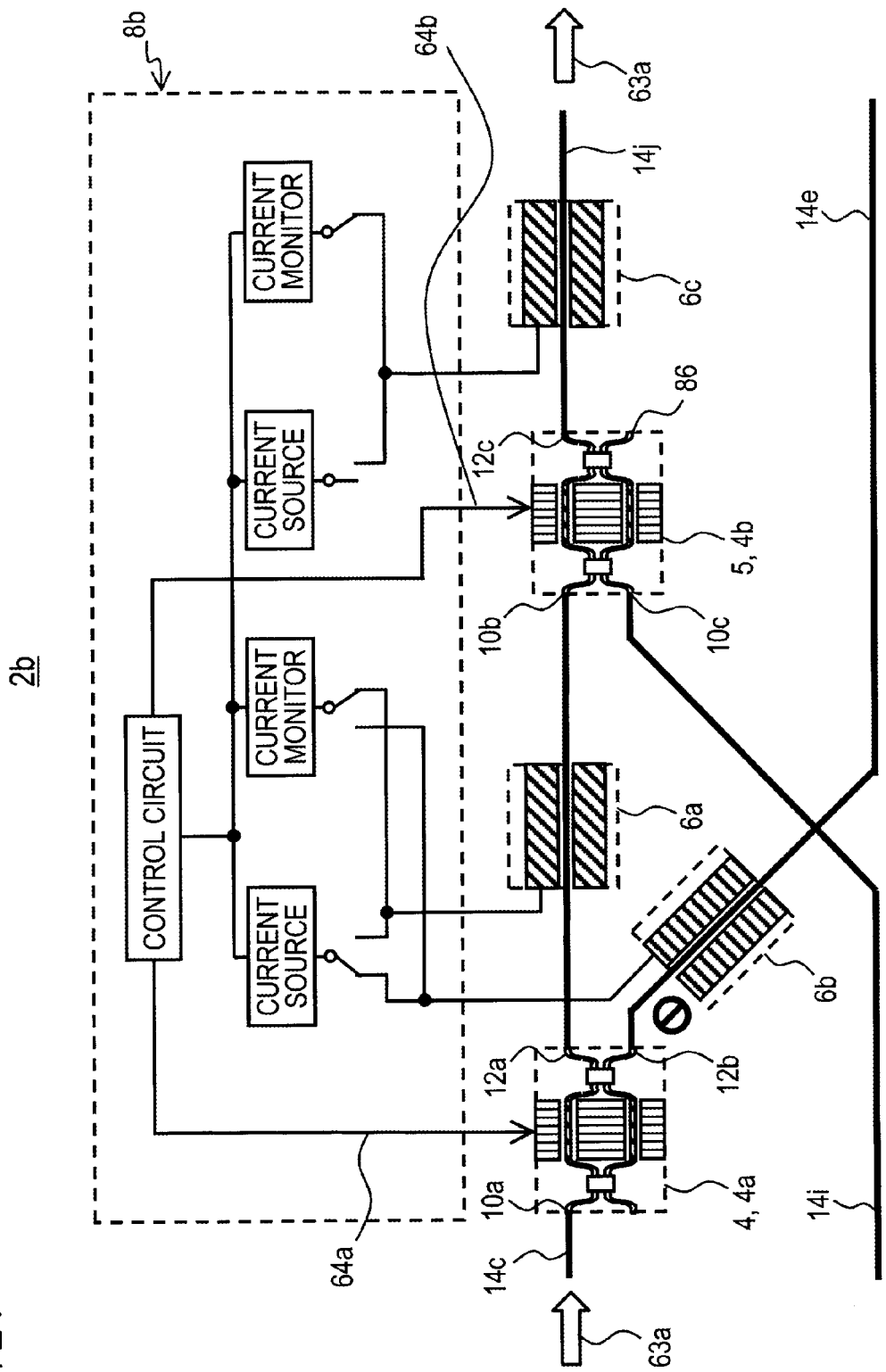
FIG. 24 is an operation diagram in the path non-exchange mode.

FIG. 23 is a flowchart of a path non-exchange mode. FIG. 24 is an operation diagram in the path non-exchange mode.

As depicted in FIG. 24, it is assumed that first signal light 63a propagates through the first input waveguide 14c and enters the first optical switch element 4a.

In this state, as depicted in FIG. 24, the controller 8b supplies a first switch control signal (high level signal) 64a to the first optical switch element 4a, to output the first signal light 63a from the first output port 12a (S42).

Then, the first signal light 63a enters the second optical switch element 4b through the first optical gate element 6a. The controller 8b supplies a second switch control signal (high level signal) 64b to the second optical switch element 4b, to output the first signal light 63a, which enters the second input port 10b, from the third output port 12c (S42).

Next, the controller 8b makes the first optical switch element 4a maximize output light (the first signal light 63a), which is output from the first output port 12a (S44), and makes the second optical gate element 6b intercept crosstalk light leaked out of the second output port 12b (S46). The above steps are substantially identical to steps S4-S8 in the first 1×2 connection mode of Embodiment 1 (refer to FIG. 8).

Further, the controller 8b makes the second optical switch element 4b maximize the output light thereof (the first signal light 63a) (S48). The above step is substantially identical to the maximization steps S24, S26 of the signal light 62a in the first 2×1 connection mode of Embodiment 2 (refer to FIG. 15).

Thus, the first signal light 63a is re-output to the path on which it propagates before entering the optical switching apparatus 2b, and also the output light (the first signal light 63a) of the optical switching apparatus 2b is maximized.

—First Path Switchover Mode—

Figure 25:
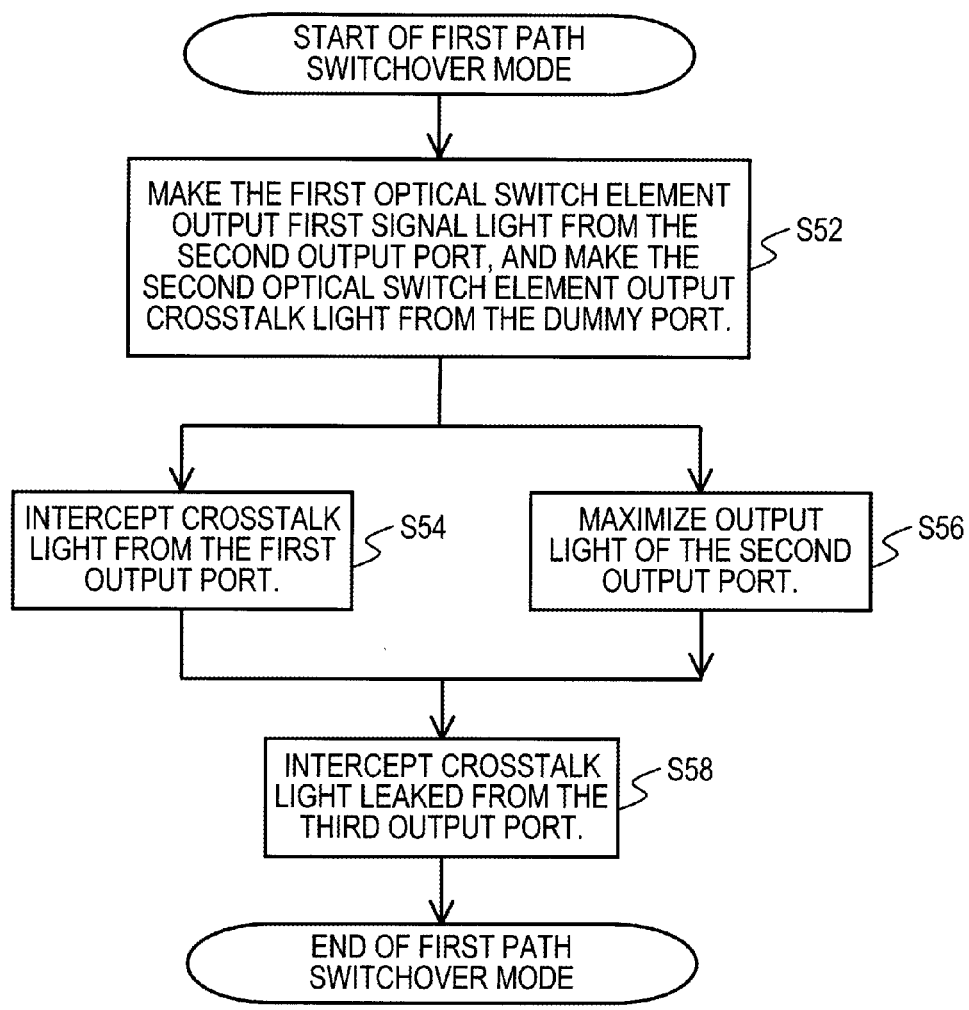
FIG. 25 is a flowchart of a first path switchover mode.
Figure 26:
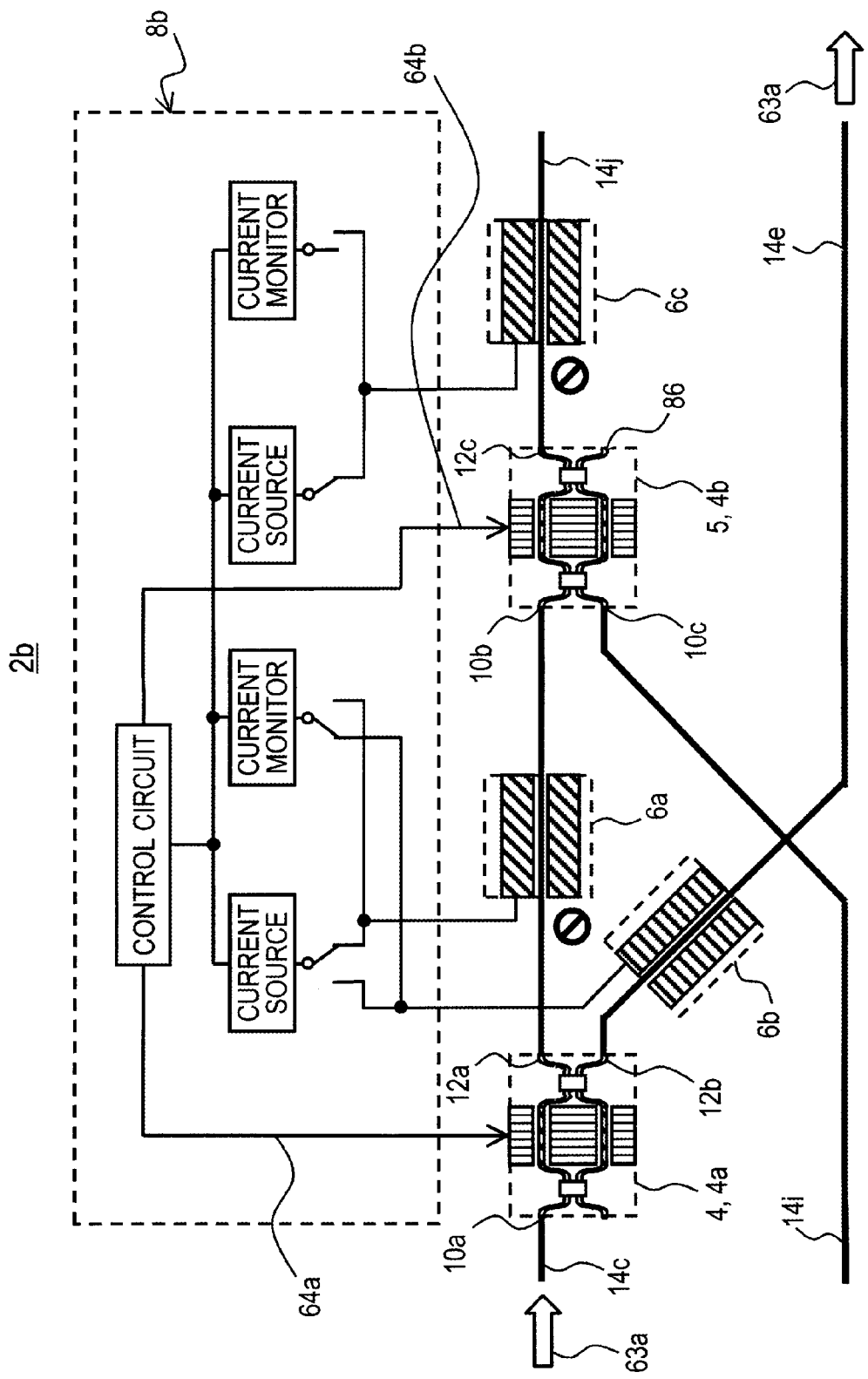
FIG. 26 is an operation diagram in the first path switchover mode.

FIG. 25 is a flowchart of a first path switchover mode. FIG. 26 is an operation diagram in the first path switchover mode.

As depicted in FIG. 26, it is assumed that first signal light 63a propagates through the first input waveguide 14c and enters the first optical switch element 4a.

In this state, the controller 8b supplies a first switch control signal (for example, low level signal) 64a to the first optical switch element 4a, to output the first signal light 63a from the second output port 12b (S52).

Then, crosstalk light of the first signal light 63a is output from the first output port 12a. The above crosstalk light enters the second input port 10b of the second optical switch element 4b through the first optical gate element 6a. The controller 8b supplies a second switch control signal (for example, low level signal) 64b to the second optical switch element 4b, to output the crosstalk light, which enters through the second input port 10b, from the dummy port 86 (S52).

Next, the controller 8b makes the first optical gate element 6a intercept the crosstalk light from the first output port 12a (S54), and makes the first optical switch element 4a maximize output light (the first signal light) from the second output port 12b (S56). The above steps are substantially identical to steps S14-S18 in the second 1×2 connection mode of Embodiment 1 (refer to FIG. 10).

At this time, the crosstalk light output from the first output port 12a is attenuated by the first optical gate element 6a, and is output from the dummy port 86 by the second optical switch element 4b. By this, crosstalk light output from the third output port 12c is remarkably decreased. However, a portion of the crosstalk light is leaked out of the third output port 12c.

The controller 8b supplies a third gate control signal to the third optical gate element 6c, so as to intercept the portion of the crosstalk light, which is leaked out of the third output port 12c (S58). The above step is substantially identical to the case of the first 2×1 interception mode in Embodiment 2 (excluding the initial value set step of the switch control signal) (refer to FIG. 18). Therefore, the crosstalk in the optical switching apparatus 2b becomes exceedingly small.

For example, when crosstalk in the first optical switch element 4a and the second optical switch element 4b is 20 dB, and each optical attenuation factor of the first optical gate element 6a and the third optical gate element 6c is 20 dB, the crosstalk in the optical switching apparatus 2b becomes 80 dB (=20 dB×4).

Thus, the path of the first signal light 63a is switched over and also the first signal light 63a output from the second output waveguide 14e is maximized. Further, the crosstalk light output from the third output waveguide 14j is exceedingly small.

Additionally, although the second output waveguide 14e intersects with the third input waveguide 14i, the crosstalk caused by the intersection of the waveguides is sufficiently suppressed if the intersection angle is set to be sufficiently large.

Also, the second output waveguide 14e and the third input waveguide 14i may be formed in such a manner that respective center portions are positioned sufficiently near without intersection, so that waveguide light in one waveguide is completely coupled (with a coupling factor of approximately 100%) with waveguide light in the other waveguide. Namely, without use of an intersection waveguide, it may be possible to use a directional coupler to make the input light of the optical switching apparatus 2b intersect with the output light thereof.

—Second Path Switchover Mode—

Figure 27:
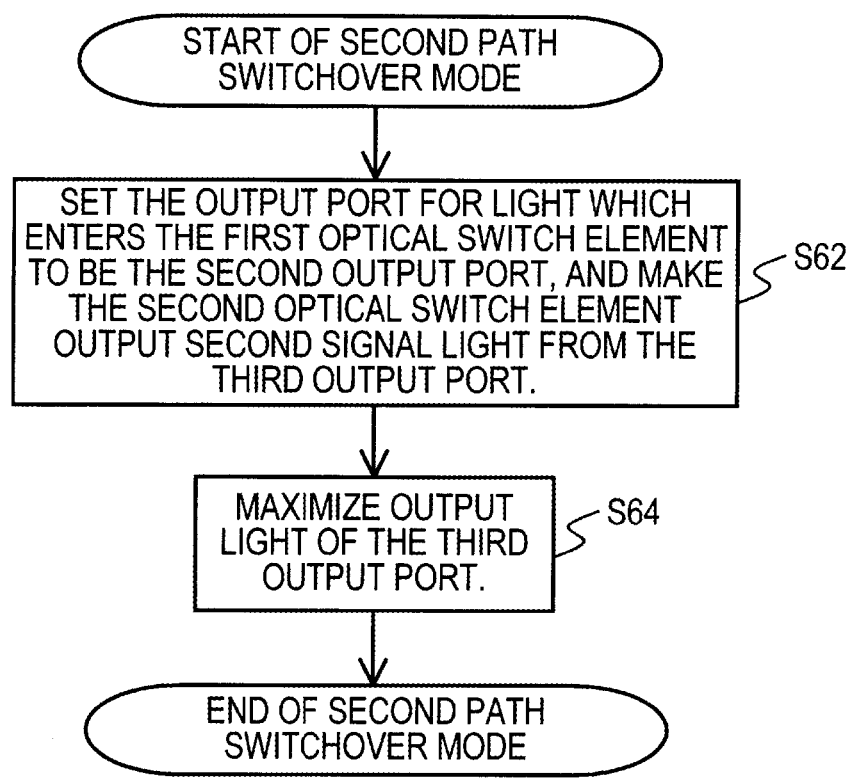
FIG. 27 is a flowchart of a second path switchover mode.
Figure 28:
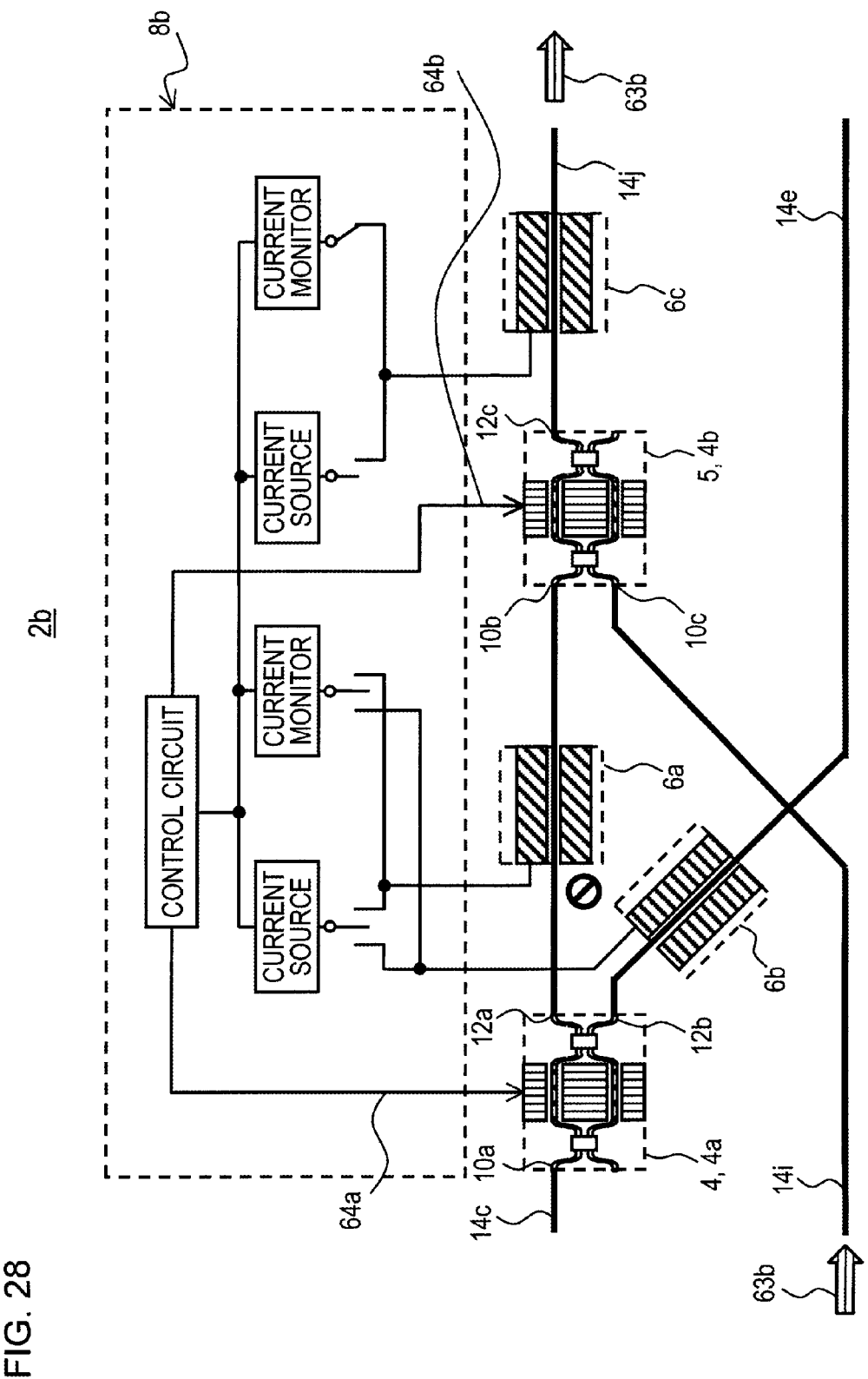
FIG. 28 is an operation diagram in the second path switchover mode.

FIG. 27 is a flowchart of a second path switchover mode. FIG. 28 is an operation diagram in the second path switchover mode.

As depicted in FIG. 28, it is assumed that second signal light 63b propagates through the third input waveguide 14i and enters the second optical switch element 4b.

In this state, the controller 8b supplies a first switch control signal (for example, low level signal) 64a to the first optical switch element 4a, so that light entering the first input port 10a is output from the second output port 12b (S62). Light entering the first input port 10a is crosstalk light generated in another optical switching apparatus, for example (S62). Further, the controller 8b supplies a second switch control signal (for example, low level signal) 64b to the second optical switch element 4b, to output the second signal light 63b from the third output port 12c (S62).

Next, the output light (the second signal light) of the second optical switch element 4b is maximized (S64). This step is substantially identical to the case of the second 2×1 connection mode in Embodiment 2 (excluding the initial value set step of the switch control signal) (refer to FIG. 17).

Thus, the path of the second signal light 63b is switched over, and also the second signal light 63b output from the third output waveguide 14j is maximized.

In each mode described above, the controller 8b adjusts the magnitude of either one or both of the first and second switch control signals so as to maximize (or increase) the light intensity signal generated by each optical gate element, which transmits the first or second signal light 63a or 63b, among the first to third optical gate elements 6a-6c. Thus, the output light of the optical switching apparatus 2b is maximized, and the reduction of output light from the first and second optical switch elements 4a, 4b caused by a manufacturing error etc. is prevented.

Also, by the interception of crosstalk light by an optical gate element, which the crosstalk light enters, among the first to third optical gate elements 6a-6c, crosstalk may be remarkably reduced. Here, the crosstalk as a whole in the optical switching apparatus 2b is sufficiently reduced even without the interception of the crosstalk light by the first to third optical gate elements 6a-6c, because the crosstalk light generated in the first optical switch element 4a is output from the dummy port by the second optical switch element 4b. The same is applicable to an optical switching apparatus 2c of Embodiment 4 described below.

Additionally, it may be considered that the first and second optical switch elements 4a, 4b is controlled based on monitoring the intensities of output light from the second output waveguide 14e and the third output waveguide 14j using an external photo-detector. However, by the above method, it is not easy to maximize the output light of the optical switching apparatus 2b, because the outputs of the first optical switch element 4a and the second optical switch element 4b are not directly monitored. It is also the same in an optical switching apparatus of Embodiment 4.

(Embodiment 4)

(1) Structure

Figure 29:
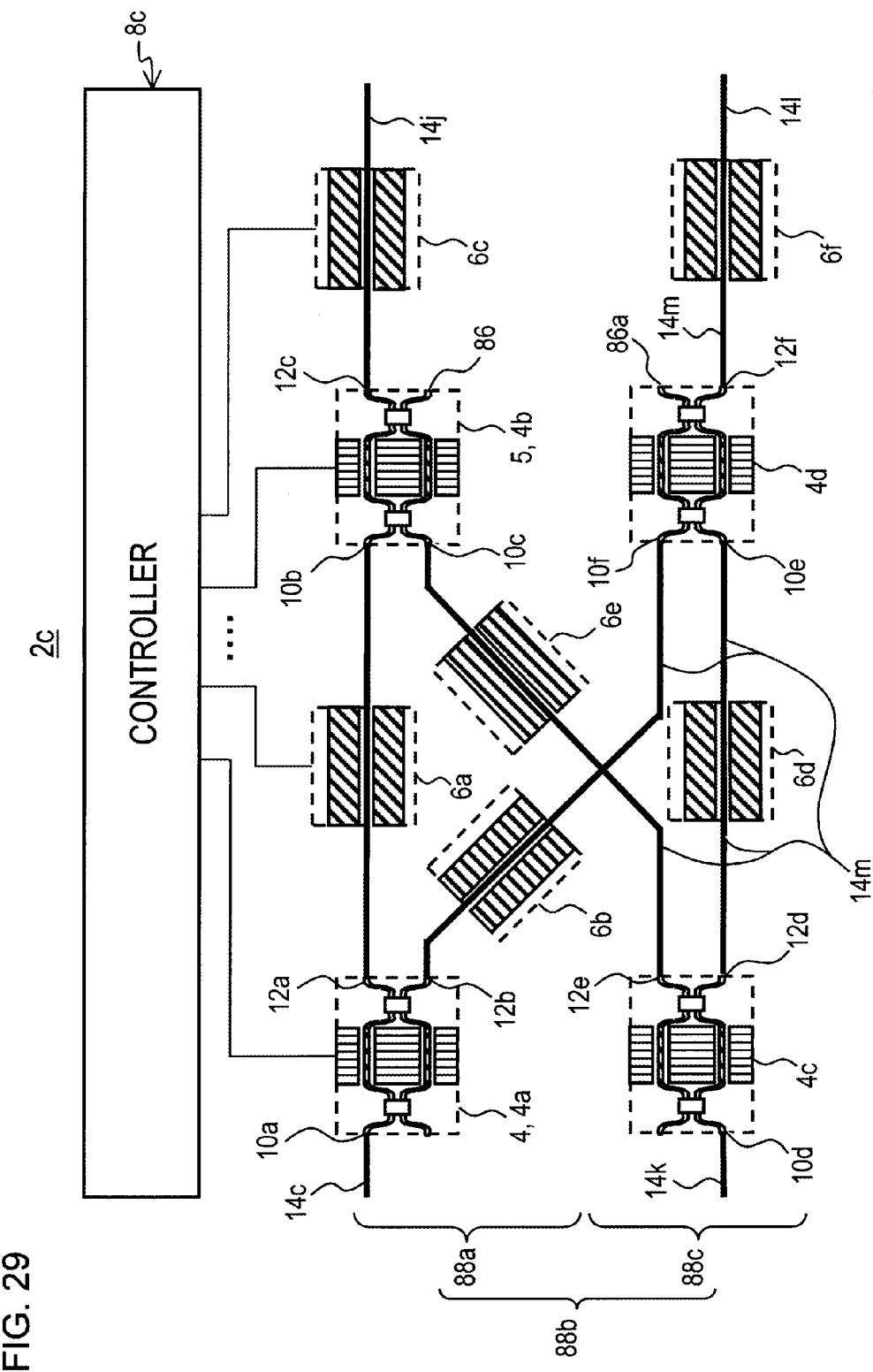
FIG. 29 is a configuration diagram of an optical switching apparatus (2×2 optical switch) according to the embodiment 4.

FIG. 29 is a configuration diagram of an optical switching apparatus (2×2 optical switch) 2c according to the present embodiment.

The optical switching apparatus 2c includes a second optical circuit 88b and a controller 8c. The second optical circuit 88b includes the first optical circuit 88a of Embodiment 3 and a third optical circuit 88c whose structure is substantially identical to the first optical circuit 88a. Therefore, descriptions about common parts with Embodiment 3 will be omitted or simplified.

The third optical circuit 88c includes a third and a fourth optical switch element 4c, 4d, a fourth to a sixth optical gate element 6d-6f, and optical waveguides 14k, 14l, 14m connected to the above elements. The structure and functions of the third optical circuit 88c are substantially identical to those of the first optical circuit 88a.

The third optical switch element 4c corresponds to the first optical switch element 4a, and includes fourth input port 10d, fourth output port 12d and fifth output port 12e. The fourth input port 10d corresponds to the first input port 10a. The fourth output port 12d corresponds to the first output port 12a. The fifth output port 12e corresponds to the second output port 12b.

The fourth optical gate element 6d corresponds to the first optical gate element 6a. The fifth optical gate element 6e corresponds to the second optical gate element 6b.

The fourth optical switch element 4d corresponds to the second optical switch element 4b, and includes fifth input port 10e, sixth input port 10f and sixth output port 12f. The fifth input port 10e corresponds to the second input port 10b. The sixth input port 10f corresponds to the third input port 10c. The sixth output port 12f corresponds to the third output port 12c.

The sixth optical gate element 6f corresponds to the third optical gate element 6c.

To the third optical switch element 4c, a third switch control signal (the switch control signal in Embodiment 1) is supplied. To the fourth optical switch element 4d, a fourth switch control signal (the switch control signal in Embodiment 2) is supplied. To the fourth to sixth optical gate elements 6d-6f, a fourth to a sixth gate control signal (the gate control signals in Embodiments 1 and 2) are supplied, respectively.

To the third input port 10c of the second optical switch element 4b included in the first optical circuit 88a, there is connected an output end of the fifth gate element 6e included in the third optical circuit 88c. Further, to the sixth input port 10f of the fourth optical switch element 4d included in the third optical circuit 88c, there is connected an output end of the second gate element 6b included in the first optical circuit 88a. Thus, the first optical circuit 88a is connected to the third optical circuit 88c.

The controller 8c includes, for example, a control circuit (not depicted) and also, current sources and current monitors (not depicted) respectively corresponding to the first to sixth optical gate elements 6a-6f. Further, the controller 8c includes switch elements (not depicted) respectively corresponding to the first to sixth optical gate elements 6a-6f.

The control circuit in the controller 8c provides functions of both the control circuit 54 of Embodiment 1 and the control circuit 54a of Embodiment 2. These functions are used to control both the first optical circuit 88a and the third optical circuit 88c. Each current source and each current monitor are the current source 56 and the current monitor 58 of Embodiment 1 or 2, respectively. The switch elements are the switch elements 60 of Embodiment 1 or 2.

The controller 8c supplies first to fourth switch control signals to the first to fourth optical switch elements 4a-4d. Also, the controller 8c supplies first to sixth gate control signals to the first to sixth optical gate elements 6a-6f. Here, in FIG. 29, some of signal lines for the connection between the controller 8c and each element are omitted.

(2) Operation

The controller 8c controls the second optical circuit 88b in four modes described below.

—Path Exchange Mode—

Figure 30:
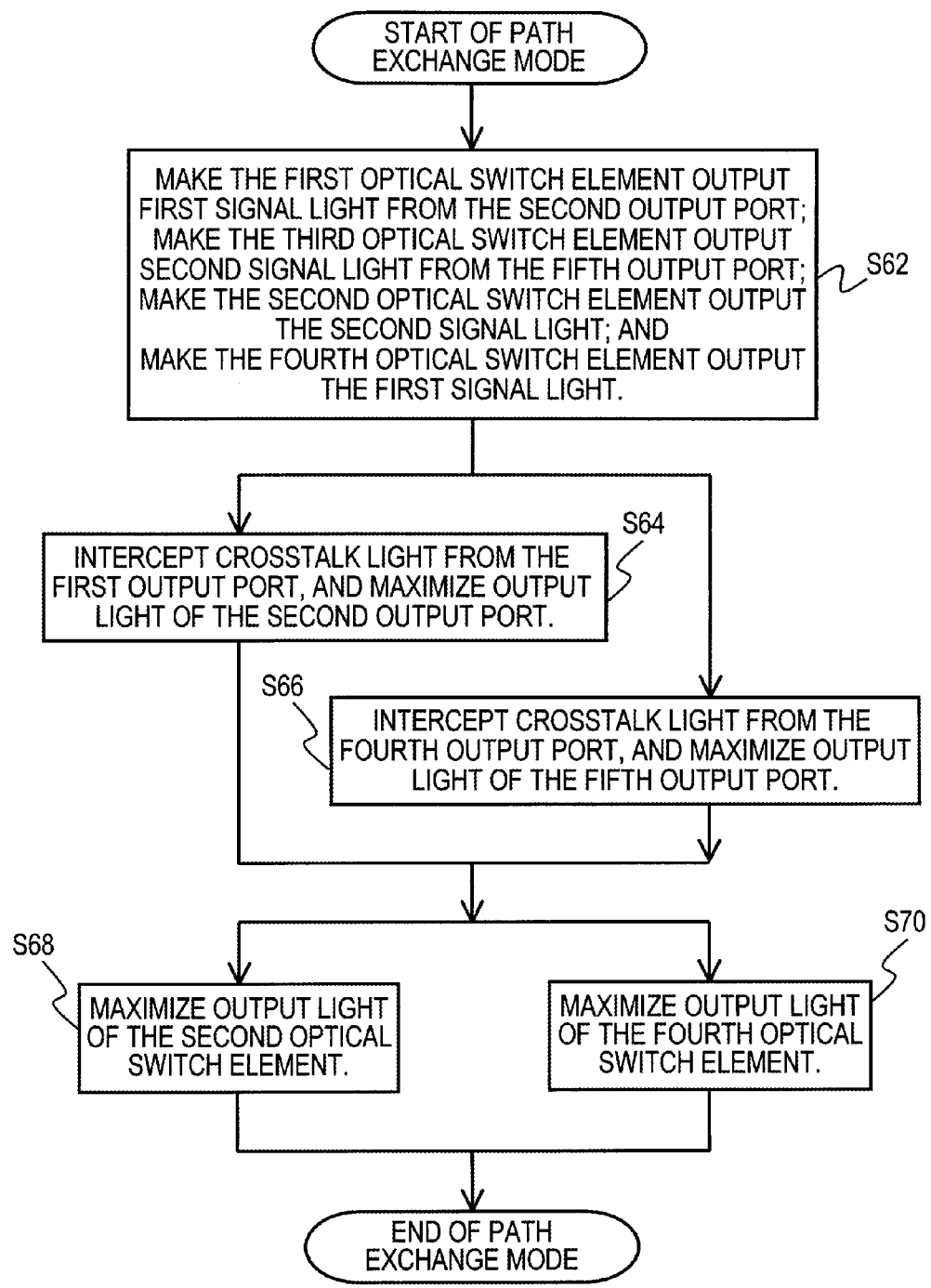
FIG. 30 is a flowchart of a path exchange mode.

FIG. 30 is a flowchart of a path exchange mode.

Now, it is assumed that first signal light propagates through the first input waveguide 14c and enters the first optical switch element 4a. Also, second signal light propagates through the fourth input waveguide 14k and enters the third optical switch element 4c. The first signal light and the second signal light are optical signals supplied from outside the third optical switching apparatus 2c.

In this state, the controller 8c supplies a first switch control signal to the first optical switch element 4a to output the first signal light from the second output port 12b. Also, the controller 8c supplies a third switch control signal to the third optical switch element 4c to output the second signal light from the fifth output port 12e. Further, the controller 8c supplies a second switch control signal to the second optical switch element 4b to output the second signal light from the third output port 12c. Further, the controller 8c supplies a fourth switch control signal to the fourth optical switch element 4d to output the first signal light from the sixth output port 12f (S62).

Next, the controller 8c makes the first optical gate element 6a intercept crosstalk light from the first output port 12a, and also makes the first optical switch element 4a maximize output light (the first signal light) from the second output port 12b (S64). The above steps are substantially identical to steps S14-S18 in the second 1×2 connection mode of Embodiment 1 (refer to FIG. 10).

Similarly, the controller 8c makes the fourth optical gate element 6d intercept crosstalk light from the fourth output port 12d, and makes the third optical switch element 4c maximize output light (the second signal light) from the fifth output port 12e (S66).

Next, the controller 8c makes the second optical switch element 4b maximize the output light thereof (the second signal light) (S68). This step is substantially identical to the maximization step of the signal light 62b in the second 2×1 connection mode of Embodiment 2 (refer to FIG. 17).

Similarly, the controller 8c makes the fourth optical switch element 4d maximize the output light thereof (the first signal light) (S70).

Thus, the paths of the first signal light and the second signal light are exchanged (intersected), and also the first signal light and the second signal light which are output from the optical switching apparatus 2c are maximized.

—Path Non-Exchange Mode—

Figure 31:
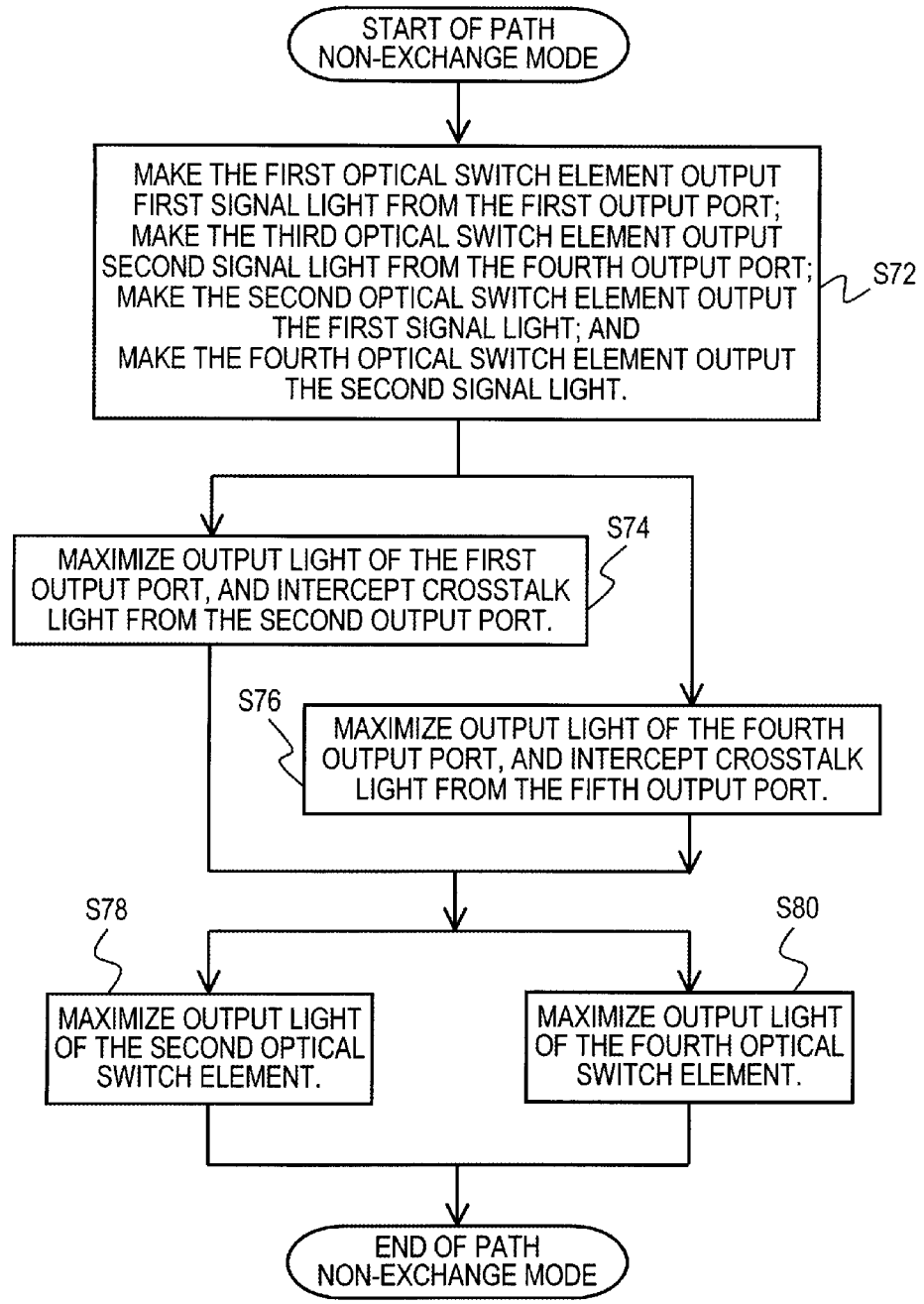
FIG. 31 is a flowchart of a path non-exchange mode.

FIG. 31 is a flowchart of a path non-exchange mode.

Now, it is assumed that first signal light propagates through the first input waveguide 14c and enters the first optical switch element 4a. Also, second signal light propagates through the fourth input waveguide 14k and enters the third optical switch element 4c.

In this state, the controller 8c supplies a first switch control signal to the first optical switch element 4a, to output the first signal light from the first output port 12a. Also, the controller 8c supplies a third switch control signal to the third optical switch element 4c to output the second signal light from the fourth output port 12d. Further, the controller 8c supplies a second switch control signal to the second optical switch element 4b to output the first signal light from the third output port 12c. Further, the controller 8c supplies a fourth switch control signal to the fourth optical switch element 4d to output the second signal light from the sixth output port 12f (S72).

Next, the controller 8c makes the first optical switch element 4a maximize output light (the first signal light) from the first output port 12a, and makes the second optical gate element 6b intercept crosstalk light (leakage light) from the second output port 12b (S74). The above steps are substantially identical to steps S4-S8 in the first 1×2 connection mode of Embodiment 1 (refer to FIG. 8).

Similarly, the controller 8c makes the third optical switch element 4c maximize output light (the second signal light) from the fourth output port 12d, and makes the fifth optical gate element 6e intercept crosstalk light (leakage light) from the fifth output port 12e (S76).

Further, the controller 8c makes the second optical switch element 4b maximize the output light thereof (the first signal light) (S78). This step is substantially identical to the maximization steps S24, S26 of the signal light 62a in the first 2×1 connection mode of Embodiment 2 (refer to FIG. 15). Similarly, the controller 8c makes the fourth optical switch element 4d maximize the output light thereof (the second signal light) (S80).

Thus, the first signal light and the second signal light are output without exchange (intersection) of the paths thereof, and also the first signal light and the second signal light which are output from the optical switching apparatus 2c are maximized.

—First Path Selection Mode—

Figure 32:
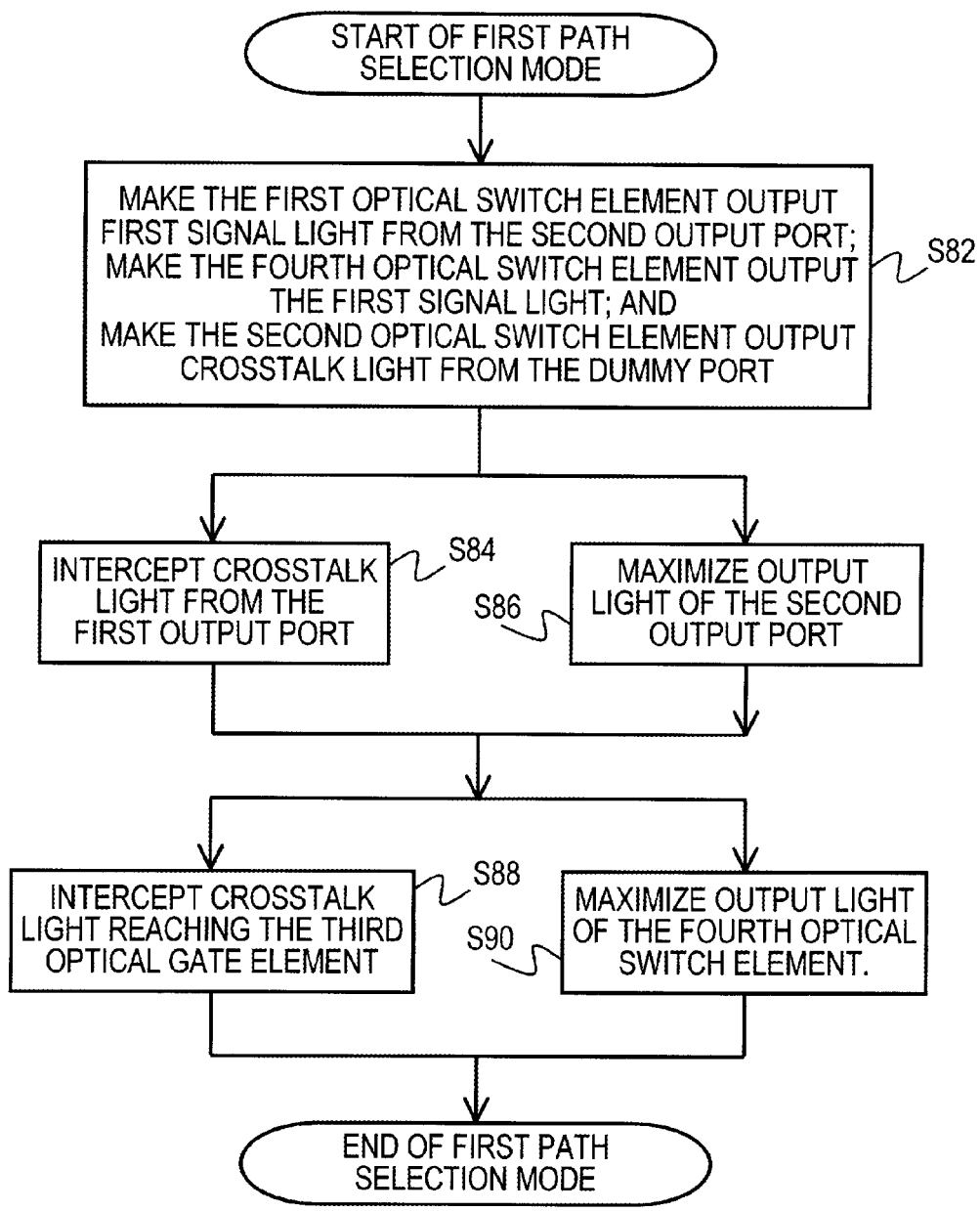
FIG. 32 is a flowchart of a first path selection mode.

FIG. 32 is a flowchart of a first path selection mode.

Now, it is assumed that first signal light propagates through the first input waveguide 14c and enters the first optical switch element 4a.

In this state, the controller 8c supplies a first switch control signal to the first optical switch element 4a to output the first signal light from the second output port 12b. Also, the controller 8c supplies a fourth switch control signal to the fourth optical switch element 4d to output the first signal light from the sixth output port 12f (the first half portion of S82).

At this time, crosstalk light is output from the first output port 12a. The controller 8c supplies a second switch control signal to the second optical switch element 4b to output the crosstalk light from a dummy port 86 (the second half portion of S82).

Next, the controller 8c makes the first optical gate element 6a intercept the crosstalk light from the first output port 12a (S84), and makes the first optical switch element 4a maximize output light (the first signal light) from the second output port 12b (S86). The above steps are substantially identical to steps S14-S18 in the second 1×2 connection mode of Embodiment 1 (refer to FIG. 10).

Next, the controller 8c makes the third optical gate element 6c intercept crosstalk light reaching the third optical gate element 6c (S88). This step is substantially identical to the case of the first 2×1 interception mode in Embodiment 2 (excluding the initial value set step of the switch control signal) (refer to FIG. 18).

Further, the controller 8c makes the fourth optical switch element 4d maximize the output light thereof (the first signal light) (S90). This step is substantially identical to the case of the second 2×1 connection mode in Embodiment 2 (excluding the initial value set step of the switch control signal) (refer to FIG. 17).

Thus, the first signal light entering the first input port 10a is output from the fourth output waveguide 14l. Further, the intensity of the output light (the first signal light) from the fourth output waveguide 14l is maximized, and the crosstalk light output from the third output waveguide 14j is remarkably reduced.

—Second Path Selection Mode—

Figure 33:
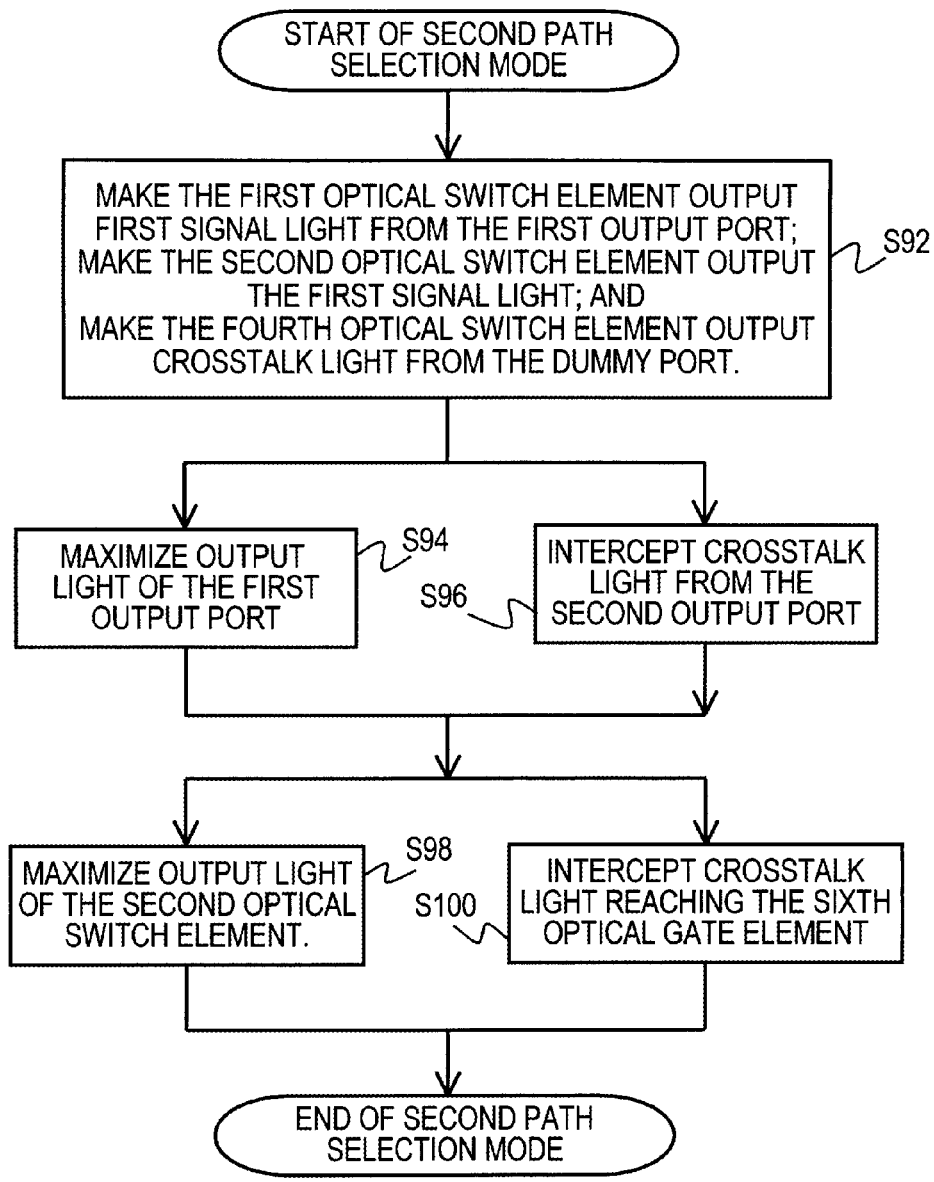
FIG. 33 is a flowchart of a second path selection mode.

FIG. 33 is a flowchart of a second path selection mode.

Now, it is assumed that first signal light propagates through the first input waveguide 14c and enters the first optical switch element 4a.

In this state, the controller 8c supplies a first switch control signal to the first optical switch element 4a to output the first signal light from the first output port 12a. Also, the controller 8c supplies a second switch control signal to the second optical switch element 4b to output the first signal light from the third output port 12c (the first half portion of S92).

At this time, crosstalk light is output from the second output port 12b. The controller 8c supplies a fourth switch control signal to the fourth optical switch element 4d to output the above crosstalk light from a dummy port 86a (the second half portion of S92).

Next, the controller 8c makes the first optical switch element 4a maximize output light (the first signal light) from the first output port 12a (S94), and makes the second gate element 6b intercept the crosstalk light from the second output port 12b (S96). The above steps are substantially identical to steps S4-S8 in the first 1×2 connection mode of Embodiment 1 (refer to FIG. 8)

Next, the controller 8c makes the second optical switch element 4b maximize the output light thereof (the first signal light) (S98). This step is substantially identical to steps S24 and S26 in the first 2×1 connection mode of Embodiment 2 (refer to FIG. 15).

Also, the controller 8c makes the sixth optical gate element 6f intercept crosstalk light reaching the sixth optical gate element 6f (S100). This step is substantially identical to the case of the second 2×1 interception mode in Embodiment 2 (excluding the initial value set step of the switch control signal) (refer to FIG. 19).

Thus, the first signal light entering the first input port 10a is output from the third output waveguide 14j. Further, the intensity of the output light (the first signal light) from the third output waveguide 14j is maximized, and the crosstalk light output from the fourth output waveguide 14l is remarkably reduced.

—Third Path Selection Mode—

Figure 34:
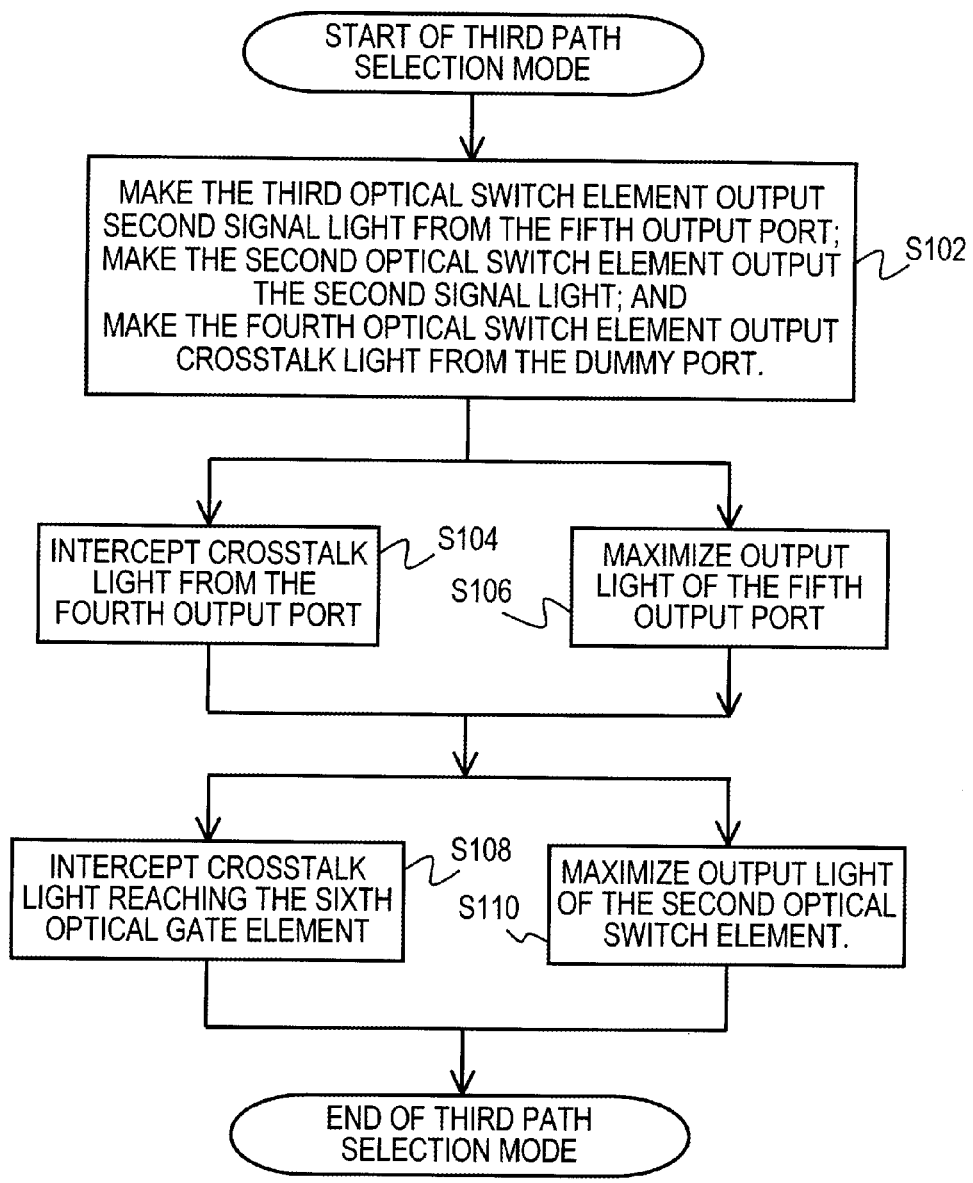
FIG. 34 is a flowchart of a third path selection mode.

FIG. 34 is a flowchart of a third path selection mode.

Now, it is assumed that second signal light propagates through the fourth input waveguide 14k and enters the third optical switch element 4c.

In this state, the controller 8c supplies a third switch control signal to the third optical switch element 4c to output the second signal light from the fifth output port 12e. Also, the controller 8c supplies a second switch control signal to the second optical switch element 4b to output the second signal light from the third output port 12c (the first half portion of S102).

At this time, crosstalk light is output from the fourth output port 12d. The controller 8c supplies a fourth switch control signal to the fourth optical switch element 4d to output the crosstalk light from the dummy port 86a (the second half portion of S102).

Next, the controller 8c makes the fourth gate element 6d intercept the crosstalk light from the fourth output port 12d (S104), and makes the third optical switch element 4c maximize output light (the second signal light) from the fifth output port 12e (S106). The above steps are substantially identical to steps S14-S18 in the second 1×2 connection mode of Embodiment 1 (refer to FIG. 10).

Next, the controller 8c makes the sixth optical gate element 6f intercept the crosstalk light reaching the sixth optical gate element 6f (S108). This step is substantially identical to the case of the first 2×1 interception mode (excluding the initial value set step of the switch control signal) of Embodiment 2 (refer to FIG. 18).

Further, the controller 8c makes the second optical switch element 4b maximize the output light thereof (the second signal light) (S110). This step is substantially identical to the maximization step of the signal light 62b in the second 2×1 connection mode of Embodiment 2 (refer to FIG. 17).

Thus, the second signal light entering the fourth input port 10d is output from the third output waveguide 14j. Further, the intensity of the output light (the second signal light) from the third output waveguide 14j is maximized, and the crosstalk light output from the fourth output waveguide 14l is remarkably reduced.

—Fourth Path Selection Mode—

Figure 35:
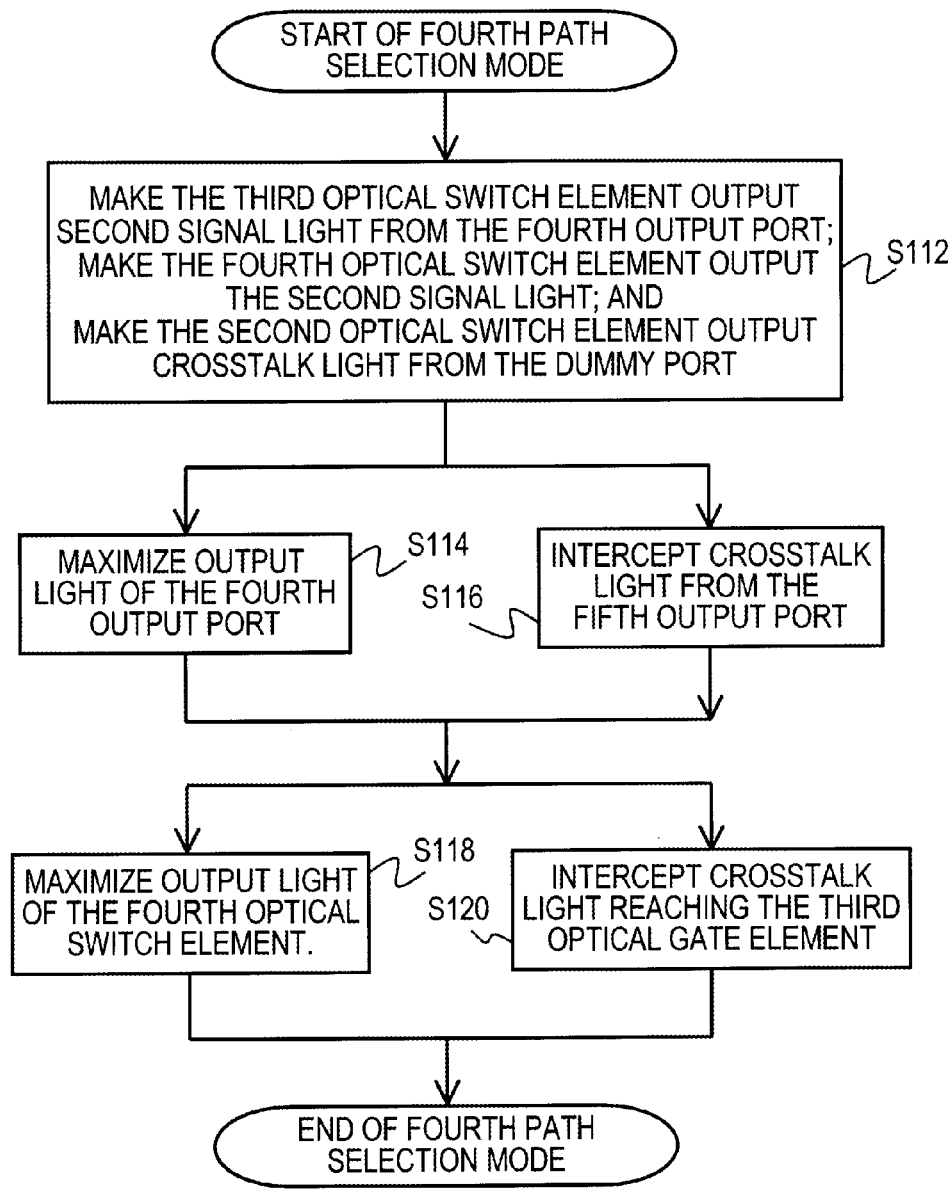
FIG. 35 is a flowchart of a fourth path selection mode.

FIG. 35 is a flowchart of a fourth path selection mode.

Now, it is assumed that second signal light propagates through the fourth input waveguide 14k and enters the third optical switch element 4c.

In this state, the controller 8c supplies a third switch control signal to the third optical switch element 4c to output the second signal light from the fourth output port 12d. Also, the controller 8c supplies a fourth switch control signal to the fourth optical switch element 4d to output the second signal light from the sixth output port 12f (the first half portion of S112). At this time, crosstalk light is output from the fifth output port 12e. The controller 8c supplies a second switch control signal to the second optical switch element 4b to output the crosstalk light from the dummy port 86 (the second half portion of S112).

Next, the controller 8c makes the third optical switch element 4c maximize output light (the second signal light) from the fourth output port 12d (S114), and makes the fifth gate element 6e intercept the crosstalk light from the fifth output port 12e (S116). The above steps are substantially identical to steps S4-S8 in the first 1×2 connection mode of Embodiment 1 (refer to FIG. 8)

Next, the controller 8c makes the fourth optical switch element 4d maximize the output light thereof (the second signal light) (S118). This step is substantially identical to steps S24 and S26 in the first 2×1 connection mode of Embodiment 2 (refer to FIG. 15).

Also, the controller 8c makes the third optical gate element 6c intercept crosstalk light reaching the third optical gate element 6c (S120). This step is substantially identical to the case of the second 2×1 interception mode in Embodiment 2 (excluding the initial value set step of the switch control signal) (refer to FIG. 19).

Thus, the second signal light entering the fourth input port 10d is output from the fourth output waveguide 14l. Further, the intensity of the output light (the second signal light) from the fourth output waveguide 14*l* is maximized, and the crosstalk light output from the third output waveguide 14*j* is remarkably reduced.

In each mode described above, the controller 8*c* adjusts the magnitude of some or all of the first to fourth switch control signals so as to increase the light intensity signal generated by each optical gate element which transmits the first or second signal light, among the first to sixth optical gate elements 6*a*-6*f*. Thus, the output light of the optical switching apparatus 2*c* is maximized, and the reduction of the output light of the first to fourth optical switch elements 4*a*-4*d* caused by a manufacturing error etc. is prevented.

(Embodiment 5)

Figure 36:
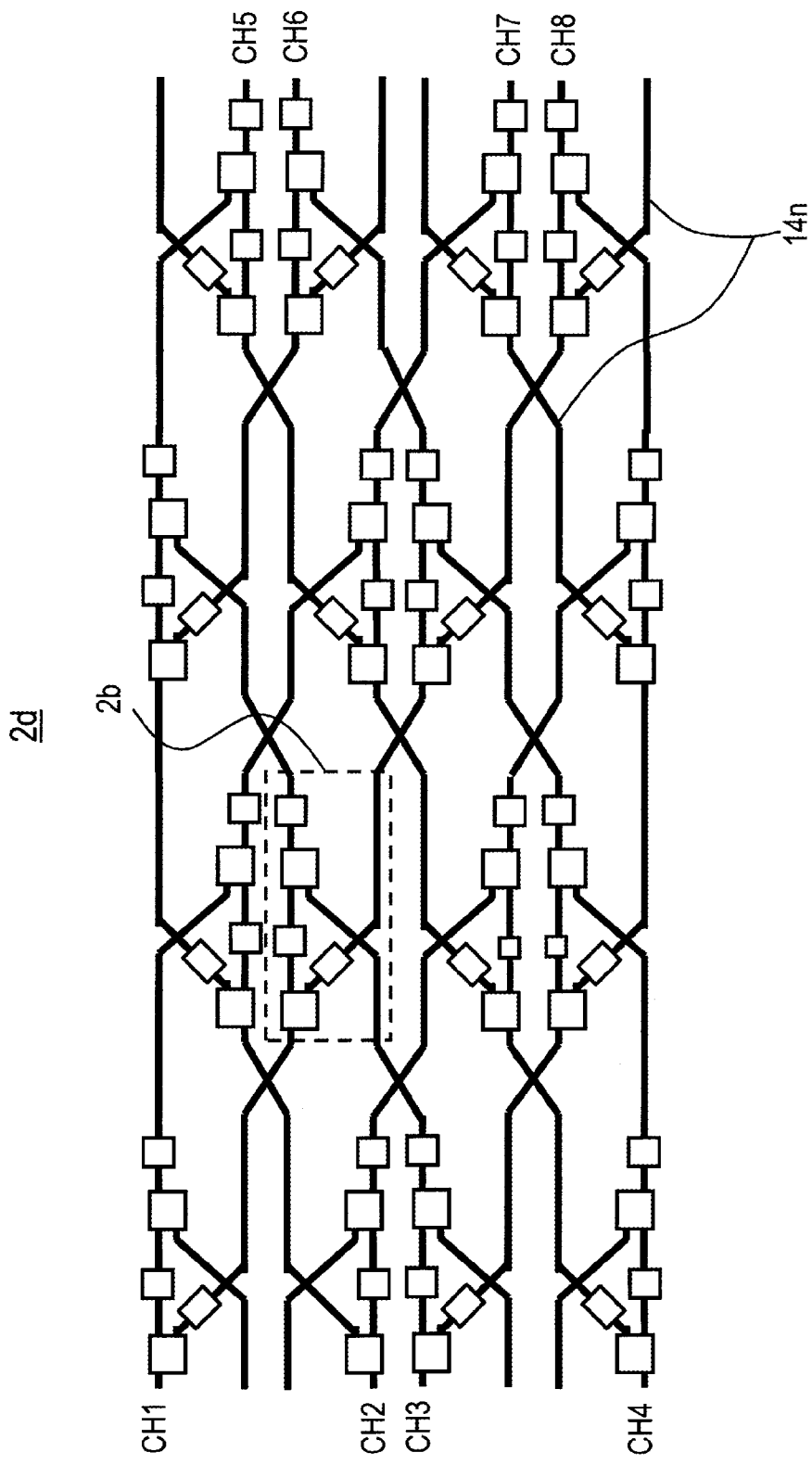
FIG. 36 is a configuration diagram of an optical switching apparatus according to the embodiment 5.

FIG. 36 is a configuration diagram of an optical switching apparatus 2*d* according to the present embodiment.

The optical switching apparatus 2*d* is a 4×4 PI-LOSS (path-independent insertion loss) optical switch in which input channels thereof are connected to output channels thereof by the optical switching apparatuses 2*b* depicted in FIG. 20.

The optical switching apparatus 2*d* includes input channels CH1-CH4 and output channels CH5-CH8. The optical switching apparatus 2*d* further includes a plurality of optical waveguides 14*n* and sixteen (16) optical switching apparatuses 2*b*. Therefore, by the maximization of the output light intensity of each optical switching apparatus 2*b*, the output light intensity of the optical switching apparatus 2*d* is maximized.

Figure 37:
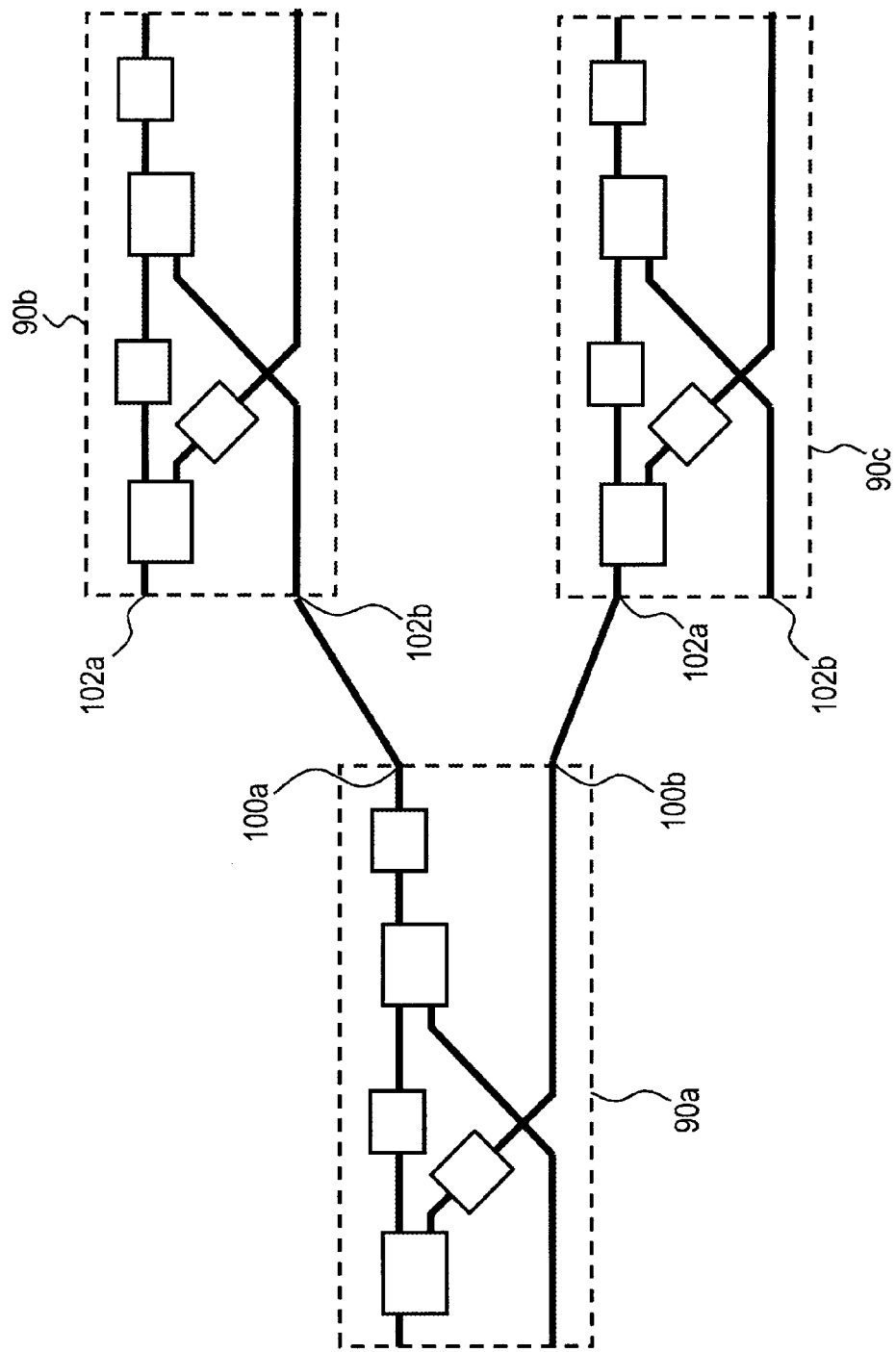
FIG. 37 is a diagram illustrating a configuration method of the PI-LOSS optical switching apparatus.

FIG. 37 is a diagram illustrating a configuration method of the PI-LOSS optical switching apparatus 2*d*. As depicted in FIG. 37, the PI-LOSS optical switching apparatus 2*d* includes at least three 2×2 optical switches 90*a*-90*c*. Each 2×2 optical switch 90*a*-90*c* is the optical switching apparatus 2*b* depicted in FIG. 20, for example.

First, a first output port 100*a* of the first 2×2 optical switch 90*a* is connected to a second input port 102*b* of the second 2×2 optical switch 90*b*. Further, a second output port 100*b* of the first 2×2 optical switch 90*a* is connected to a first input port 102*a* of the third 2×2 optical switch 90*c*. By the repetition of such connections, the PI-LOSS optical switching apparatus 2*d* is formed. The above method is also applied to the formation of a crossbar optical switch of Embodiment 6.

Additionally, in FIG. 36, the controller is omitted. Also, in FIG. 36, only one optical switching apparatus 2*b* is made to correspond to the symbol 2*b*. The same is applicable to FIG. 38 of Embodiment 6 described below.

(Embodiment 6)

Figure 38:
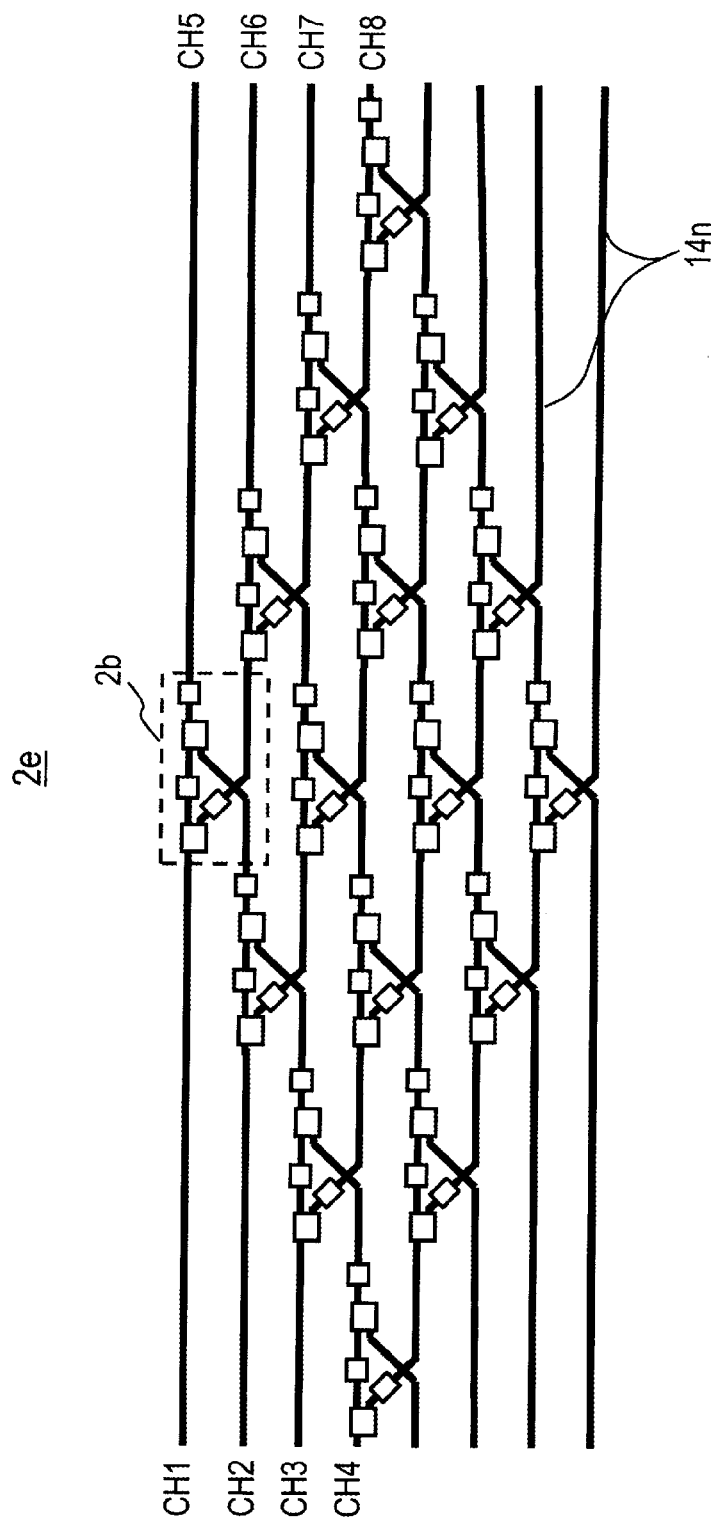
FIG. 38 is a configuration diagram of an optical switching apparatus according to the embodiment 6.

FIG. 38 is a configuration diagram of an optical switching apparatus 2*e* according to the present embodiment.

The optical switching apparatus 2*e* is a 4×4 crossbar optical switch in which input channels thereof are connected to output channels thereof by the optical switching apparatus 2*b* depicted in FIG. 20.

The optical switching apparatus 2*e* includes input channels CH1-CH4 and output channels CH5-CH8. The optical switching apparatus 2*e* further includes a plurality of optical waveguide 14*n* and sixteen (16) optical switching apparatuses 2*b*. Therefore, by the maximization of the output light intensity of each optical switching apparatus 2*b*, the output light intensity of the optical switching apparatus 2*e* is also maximized.

In Embodiments 5 and 6, the input channels and the output channels are connected by the optical switching apparatus 2*b* depicted in FIG. 20. However, it may be possible to connect the input channels to the output channels by the optical switching apparatus 2*c* depicted in FIG. 29.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical switching apparatus comprising:
   an optical switch element which includes an input port and an output port and to which a switch control signal is supplied to modulate and output signal light which enters the input port depending on a level of the switch control signal;
   an optical gate element which is connected to the output port of the optical switch element, to which a gate control signal is supplied to switch an output of the signal light depending on a level of the gate control signal, and which generates a light intensity signal corresponding to the signal light while transmitting the signal light; and
   a controller which includes a detector that detects the light intensity signal and a circuit that generates the switch control signal adjusted so that the light intensity signal increases.

2. The optical switching apparatus according to claim 1, wherein the controller which supplies the switch control signal to the optical switch element and supplies the gate control signal to the optical gate element, is operated in:
   an output mode in which the controller makes the optical switch element output the signal light from the output port, while making the optical gate element transmit the signal light which is output from the output port;
   an interception mode in which, without making the optical switch element output the signal light from the output port, the controller makes the optical gate element intercept the signal light leaked out of the output port; and
   wherein, in the output mode, the controller adjusts magnitude of the switch control signal in a manner to increase the light intensity signal generated by the optical gate element.

3. The optical switching apparatus according to claim 1, wherein the optical gate element includes:
   a semiconductor layer including an i-type ridge portion extending to one direction, through which the signal light propagates, an n-type region disposed on one side of the ridge portion, and a p-type region disposed on the other side of the ridge portion, and
   wherein the gate control signal is a current injected into a p-i-n junction including the p-type region, the n-type region and the i-type ridge portion, and
   the light intensity signal is an photocurrent generated by the p-i-n junction in response to the signal light.

4. The optical switching apparatus according to claim 1, wherein the optical switch element is a Mach-Zehnder optical switch element, and
   the Mach-Zehnder optical switch element includes a semiconductor layer including an i-type ridge portion extending to one direction, through which branch light of the signal light propagates, a p-type region disposed on one side of the ridge portion, and an n-type region disposed on the other side of the ridge portion, and the switch control signal is a current injected into a p-i-n junction including the p-type region, the n-type region and the i-type ridge portion.

5. The optical switching apparatus according to claim 1, wherein the switch control signal is controlled based on a timing at which a dither signal, which is superposed on the switch control signal and periodically fluctuates, fluctuates and a timing at which the light intensity signal generated by the optical gate element fluctuates.

6. A method for controlling an optical switching apparatus, the method comprising:
an output mode and an interception mode, wherein
the optical switching apparatus includes an optical switch element and an optical gate element which transmits an input signal light while generating a light intensity signal corresponding thereto,
the output mode includes inputting to the optical gate element a first signal light output from the optical switch element and controlling the optical switch element in a manner to increase the light intensity signal corresponding to the first signal light input thereto, and
the interception mode includes inputting to the optical gate element a second signal light leaked out of the optical switch element and making the optical gate element intercept the second signal light input thereto.

7. The optical switching apparatus according to claim 1, wherein the optical switch element includes a first output port and a second output port, and
each of the first output port and the second output port is connected to each the optical gate element.

8. The optical switching apparatus according to claim 7, wherein the controller supplies the switch control signal to the optical switch element and supplies the gate control signal to the optical gate element,
wherein the optical switch element is an optical element which outputs or does not output the signal light from the first output port depending on a level of the switch control signal, and when not outputting the signal light from the first output port, the optical switch element outputs the signal light from the second output port, and
wherein the controller is operated in:
a first mode in which the controller makes the optical switch element output the signal light from the first output port, while making the optical gate element, which is connected to the first output port, transmit the signal light which is output from the first port and making the optical gate element, which is connected to the second output port, intercept the signal light leaked out of the second output port; and
a second mode in which the controller makes the optical switch element output the signal light from the second output port, while making the optical gate element, which is connected to the second output port, transmit the signal light which is output from the second port and making the optical gate element, which is connected to the first output port, intercept the signal light leaked out of the first output port, and
wherein in the first connection mode, the controller adjusts magnitude of the switch control signal in a manner to increase the light intensity signal generated by the optical gate element connected to the first output port, and
in the second connection mode, the controller adjusts magnitude of the switch control signal in a manner to increase the light intensity signal generated by the optical gate element connected to the second output port.

9. An optical switching apparatus comprising:
a first optical switch element which includes a first input port, a first output port and a second output port, and to which a first switch control signal is supplied, and which outputs input light entering the first input port to the first output port or the second output port depending on a level of the first switch control signal;
a first optical gate element whose input end is connected to the first output port, and to which a first gate control signal is supplied, and which transmits or intercepts first incident light depending on a level of the first gate control signal;
a second optical gate element whose input end is connected to the second output port, and to which a second gate control signal is supplied, and which transmits or intercepts second incident light depending on a level of the second gate control signal;
a second optical switch element which includes a second input port connected to an output end of the first optical gate element, a third input port and a third output port and, to which a second switch control signal is supplied, and which outputs, from the third output port, input light entering the second input port or input light entering the third input port depending on a level of the second switch control signal; and
a third optical gate element which is connected to the third output port, and to which a third gate control signal is supplied, and which transmits or intercepts third incident light depending on a level of the third gate control signal,
wherein, when outputting input light entering the first input port, the first optical switch element varies intensity of output light which is output from the first output port or the second output port, depending on magnitude of the first switch control signal, and
when outputting input light entering the second input port or the third input port to the third output port, the second optical switch element varies intensity of output light which outputs from the third output port depending on magnitude of the second switch control signal, and
wherein, when transmitting the first to the third incident light, the first to the third optical gate elements generate light intensity signals corresponding to intensity of the first to the third incident light transmitting, respectively.

10. The optical switching apparatus according to claim 9, further comprising a controller,
wherein first signal light is externally supplied to the first input port, and second signal light is externally supplied to the third input port, and
wherein the controller adjusts magnitude of one or both of the first switch control signal and the second switch control signal in a manner to increase the light intensity signal generated by each optical gate element transmitting the first signal light or the second signal light, among the first to the third optical gate elements.

11. The optical switching apparatus according to claim 9, further comprising:
a third optical switch element which includes a fourth input port, a fourth output port and a fifth output port, and to which a third switch control signal is supplied, and which outputs input light entering the fourth input port to the fourth output port or the fifth output port depending on a level of the third switch control signal;
a fourth optical gate element whose input end is connected to the fourth output port, and to which a fourth gate control signal is supplied, and which transmits or intercepts fourth incident light depending on a level of the fourth gate control signal;

a fifth optical gate element whose input end is connected to the fifth output port, and whose output end is connected to the third input port, and to which a fifth gate control signal is supplied, which transmits or intercepts fifth incident light depending on a level of the fifth gate control signal;

a fourth optical switch element which includes a fifth input port connected to an output end of the fourth optical gate element, a sixth input port connected to an output end of the second optical gate element and a sixth output port, and to which a fourth switch control signal is supplied, which outputs input light entering the fifth input port or input light entering the sixth input port, to the sixth output port depending on a level of the fourth switch control signal; and a sixth optical gate element connected to the sixth output port, and to which a sixth gate control signal is supplied, and which transmits or intercepts sixth incident light depending on a level of the sixth gate control signal;

wherein, when outputting input light entering the fourth input port, the third optical switch element varies intensity of output light which is output from the fourth output port or the fifth output port depending on magnitude of the third switch control signal, and when outputting input light entering the fifth input port or the sixth input port from the sixth output port, the fourth optical switch element varies intensity of output light which is output from the sixth output port depending on magnitude of the fourth switch control signal, and wherein, when transmitting the fourth to the sixth incident light, the fourth to the sixth optical gate elements generate light intensity signals corresponding to intensity of the fourth to the sixth incident light transmitting, respectively.

12. The optical switching apparatus according to claim 11,
wherein first signal light is externally supplied to the first input port, and second signal light is externally supplied to the fourth input port, and wherein the optical switching apparatus includes a controller which adjusts part or all of the first to the fourth switch control signals in a manner to increase the light intensity signal generated by each optical gate element transmitting the first signal light or the second signal light, among the first to the sixth optical gate elements.

13. The optical switching apparatus according to claim 1,
wherein the controller supplies the switch control signal to the optical switch element and supplies the gate control signal to the optical gate element, wherein the optical switch element includes a first input port and a second input port, and outputs or does not output first signal light entering the first input port to the output port depending on a level of the switch control signal, and when not outputting the first signal light entering the first input port, the optical switch element outputs, from the output port, second signal light entering the second input port, and wherein the controller makes the optical switch element output the first signal light or the second signal light from the output port, while making the optical gate element transmit the first signal light or the second signal light, and the controller adjusts magnitude of the switch control signal in a manner to increase the light intensity signal generated by the optical gate element.

14. The optical switching apparatus according to claim 1, wherein
the light intensity signal is photocurrent generated by the optical gate element, and the detector is a current monitor.

\* \* \* \* \*